(12) United States Patent (10) Patent No.: US 8,793,160 B2
Sorem (45) Date of Patent: Jul. 29, 2014

(54) SYSTEM AND METHOD FOR PROCESSING TRANSACTIONS

(76) Inventor: Steve Sorem, Mechanicsburg, PA (US)

( * ) Notice: Subject to any disclaimer, the term of this patent is extended or adjusted under 35 U.S.C. 154(b) by 1948 days.

(21) Appl. No.: 10/665,250

(22) Filed: Sep. 15, 2003

(65) Prior Publication Data

US 2004/0128195 A1 Jul. 1, 2004

Related U.S. Application Data

(63) Continuation-in-part of application No. 09/456,114, filed on Dec. 7, 1999, now abandoned.

(60) Provisional application No. 60/410,381, filed on Sep. 13, 2002.

(51) Int. Cl.
*G06Q 30/02* (2012.01)

(52) U.S. Cl.
USPC ........................................................ 705/14.53

(58) Field of Classification Search
USPC .................... 705/14, 27, 14.26, 68; 283/81
See application file for complete search history.

(56) References Cited

U.S. PATENT DOCUMENTS

| | | |
|---|---|---|
| 2,005,003 A | 6/1935 | Patton et al. |
| 3,230,650 A | 1/1966 | Orkin |
| 3,634,669 A | 1/1972 | Soumas et al. |
| 3,713,235 A | 1/1973 | Roberts |
| 3,855,033 A | 12/1974 | Staats |
| 3,938,090 A | 2/1976 | Borison et al. |
| 3,946,206 A | 3/1976 | Darjany |
| 4,022,943 A | 5/1977 | Erb et al. |
| 4,047,033 A | 9/1977 | Malmberg et al. |
| 4,058,220 A | 11/1977 | Torongo |
| D248,203 S | 6/1978 | Morse |

(Continued)

FOREIGN PATENT DOCUMENTS

| | | |
|---|---|---|
| CA | 2293321 | 6/1998 |
| DE | 19702532 | 3/1998 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Saba Dagnew
(74) *Attorney, Agent, or Firm* — Hunton & Williams LLP

(57) ABSTRACT

A remote station for tracking promotion of at least one group of products each of which bears a code that uniquely identifies each product in the group, wherein the remote station may be communicatively coupled to at least one user station is disclosed. The station includes a database resident at the remote station, wherein the database stores ones of the uniquely identifying codes that have been previously received from one or more user stations, and a database server, coupled to the database, that compares each new candidate code received from a given user station against the previously received codes stored in the database. The database server credits an account of a user associated with the given user station with a non-zero promotional credit only if such new candidate code received from the given user station was not previously stored in the database. The database server stores such new candidate code in the database as a previously received code if such new candidate code was not previously stored in the database.

14 Claims, 37 Drawing Sheets

(56) References Cited

U.S. PATENT DOCUMENTS

| | | | |
|---|---|---|---|
| 4,123,747 A | 10/1978 | Lancto et al. | |
| 4,130,881 A | 12/1978 | Haessler et al. | |
| 4,205,780 A | 6/1980 | Burns et al. | |
| 4,223,403 A | 9/1980 | Konheim et al. | |
| D259,048 S | 4/1981 | Peterson | |
| 4,264,808 A | 4/1981 | Owens et al. | |
| 4,319,336 A | 3/1982 | Andersen et al. | |
| 4,321,672 A | 3/1982 | Braun et al. | |
| 4,338,587 A | 7/1982 | Chiappetti | |
| 4,380,699 A | 4/1983 | Monnier et al. | |
| 4,453,074 A | 6/1984 | Weinstein | |
| 4,454,414 A | 6/1984 | Benton | |
| 4,465,206 A | 8/1984 | Sorel et al. | |
| 4,479,995 A | 10/1984 | Suzuki et al. | |
| 4,545,838 A | 10/1985 | Minkus et al. | |
| 4,575,127 A | 3/1986 | Michel | |
| 4,575,621 A | 3/1986 | Dreifus | |
| 4,582,985 A | 4/1986 | Lofberg | |
| 4,605,820 A | 8/1986 | Campbell, Jr. | |
| 4,605,844 A | 8/1986 | Haggan | |
| 4,614,861 A | 9/1986 | Pavlov et al. | |
| 4,634,845 A | 1/1987 | Hale et al. | |
| 4,641,239 A | 2/1987 | Takesako | |
| 4,643,452 A | 2/1987 | Chang et al. | |
| 4,645,701 A | 2/1987 | Zarrow | |
| 4,647,714 A | 3/1987 | Goto | |
| 4,648,189 A | 3/1987 | Michel | |
| 4,650,981 A | 3/1987 | Foletta | |
| 4,661,658 A | 4/1987 | Matyas | |
| 4,669,730 A | 6/1987 | Small | |
| 4,689,478 A | 8/1987 | Riley | |
| 4,697,072 A | 9/1987 | Kawana | |
| 4,700,055 A | 10/1987 | Kashkashian, Jr. | |
| 4,701,601 A | 10/1987 | Francini et al. | |
| 4,707,594 A | 11/1987 | Roth | |
| 4,713,760 A | 12/1987 | Yamada et al. | |
| 4,723,212 A | 2/1988 | O'Brien et al. | |
| 4,736,094 A | 4/1988 | Yoshida | |
| 4,746,787 A | 5/1988 | Okada et al. | |
| 4,747,620 A | 5/1988 | Kay et al. | |
| 4,750,119 A | 6/1988 | Robertson | |
| 4,752,676 A | 6/1988 | Leonard et al. | |
| 4,754,418 A | 6/1988 | Hara | |
| 4,755,661 A | 7/1988 | Ruebsam | |
| 4,766,293 A | 8/1988 | Boston | |
| 4,766,539 A | 8/1988 | Fox | |
| 4,777,563 A | 10/1988 | Teraoka et al. | |
| 4,789,928 A | 12/1988 | Fujisaki | |
| 4,817,949 A | 4/1989 | Bachman et al. | |
| 4,822,985 A | 4/1989 | Boggan et al. | |
| 4,831,242 A | 5/1989 | Englehardt | |
| 4,831,526 A | 5/1989 | Luchs | |
| 4,837,422 A | 6/1989 | Dethloff et al. | |
| 4,839,504 A | 6/1989 | Nakano | |
| 4,845,347 A | 7/1989 | McCrindle | |
| 4,851,650 A | 7/1989 | Kitade | |
| 4,856,857 A | 8/1989 | Takeuchi et al. | |
| 4,859,837 A | 8/1989 | Halpern | |
| 4,866,545 A | 9/1989 | LaManna et al. | |
| 4,868,376 A | 9/1989 | Lessin et al. | |
| 4,870,259 A | 9/1989 | Boggan et al. | |
| 4,877,947 A | 10/1989 | Mori | |
| 4,882,675 A | 11/1989 | Nichtberger et al. | |
| 4,891,503 A | 1/1990 | Jewell | |
| 4,897,533 A | 1/1990 | Lyszczarz | |
| D305,887 S | 2/1990 | Nishimura | |
| 4,906,826 A | 3/1990 | Spencer | |
| 4,908,521 A | 3/1990 | Boggan et al. | |
| 4,910,672 A | 3/1990 | Off | |
| 4,923,288 A | 5/1990 | Allen et al. | |
| 4,928,001 A | 5/1990 | Masada | |
| 4,931,623 A | 6/1990 | Nakamura et al. | |
| 4,938,830 A | 7/1990 | Cannistra | |
| 4,941,090 A | 7/1990 | McCarthy | |
| 4,943,707 A | 7/1990 | Boggan | |
| 4,948,174 A | 8/1990 | Thomson et al. | |
| 4,949,256 A * | 8/1990 | Humble | 705/14 |
| 4,953,085 A | 8/1990 | Atkins | |
| D310,386 S | 9/1990 | Michels et al. | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,977,501 A | 12/1990 | Lefevre | |
| 4,978,401 A | 12/1990 | Bonomi | |
| 4,986,868 A | 1/1991 | Schmidt | |
| 4,992,940 A | 2/1991 | Dworkin | |
| 5,023,782 A | 6/1991 | Lutz et al. | |
| 5,025,139 A | 6/1991 | Halliburton, Jr. | |
| 5,025,372 A | 6/1991 | Burton et al. | |
| 5,049,728 A | 9/1991 | Rovin | |
| 5,054,096 A | 10/1991 | Beizer | |
| 5,055,662 A | 10/1991 | Hasegawa | |
| 5,056,019 A | 10/1991 | Schultz et al. | |
| 5,072,380 A | 12/1991 | Randelman et al. | |
| 5,080,748 A | 1/1992 | Bonomi | |
| 5,095,194 A | 3/1992 | Barbanell | |
| 5,097,115 A | 3/1992 | Ogasawara et al. | |
| 5,117,355 A | 5/1992 | McCarthy | |
| 5,121,945 A | 6/1992 | Thomson et al. | |
| 5,122,950 A | 6/1992 | Mee | |
| 5,140,517 A | 8/1992 | Nagata et al. | |
| 5,146,068 A | 9/1992 | Ugawa et al. | |
| 5,163,098 A | 11/1992 | Dahbura | |
| 5,173,851 A | 12/1992 | Off et al. | |
| 5,175,416 A | 12/1992 | Mansvelt | |
| 5,175,682 A | 12/1992 | Higashiyama | |
| 5,177,342 A | 1/1993 | Adams | |
| 5,180,901 A | 1/1993 | Hiramatsu | |
| 5,185,697 A | 2/1993 | Jacobs et al. | |
| 5,187,750 A | 2/1993 | Behera | |
| 5,191,522 A | 3/1993 | Bosco et al. | |
| 5,192,947 A | 3/1993 | Neustein | |
| 5,201,010 A | 4/1993 | Gabriel | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,231,569 A | 7/1993 | Myatt et al. | |
| 5,237,620 A | 8/1993 | Deaton | |
| 5,239,462 A | 8/1993 | Jones | |
| 5,247,190 A | 9/1993 | Friend et al. | |
| 5,257,486 A | 11/1993 | Holmwall | |
| 5,265,008 A | 11/1993 | Benton et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,305,196 A | 4/1994 | Deaton et al. | |
| 5,311,594 A | 5/1994 | Penzias | |
| 5,326,959 A | 7/1994 | Perazza | |
| 5,326,960 A | 7/1994 | Tannenbaum | |
| 5,327,508 A | 7/1994 | Deaton et al. | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,351,187 A | 9/1994 | Hassett | |
| 5,352,877 A | 10/1994 | Morley | |
| 5,359,183 A | 10/1994 | Skodlar | |
| 5,361,062 A | 11/1994 | Weiss et al. | |
| 5,365,575 A | 11/1994 | Katz | |
| 5,380,046 A | 1/1995 | Stephens | |
| 5,382,784 A | 1/1995 | Eberhardt | |
| 5,383,113 A | 1/1995 | Kight | |
| 5,383,687 A | 1/1995 | Suess et al. | |
| 5,388,165 A | 2/1995 | Gabriel | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,409,092 A | 4/1995 | Itako et al. | |

(56) References Cited

U.S. PATENT DOCUMENTS

| | | | |
|---|---|---|---|
| 5,412,190 A | 5/1995 | Kopesec |
| 5,412,192 A | 5/1995 | Hoss |
| 5,413,341 A | 5/1995 | Lieberman |
| 5,424,524 A | 6/1995 | Ruppert et al. |
| 5,428,684 A | 6/1995 | Akiyama et al. |
| 5,430,644 A | 7/1995 | Deaton et al. |
| 5,432,326 A | 7/1995 | Noblett et al. |
| 5,440,108 A | 8/1995 | Tran et al. |
| 5,444,794 A | 8/1995 | Uhland |
| 5,448,471 A | 9/1995 | Deaton et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Malark |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |
| 5,539,825 A | 7/1996 | Akiyama et al. |
| 5,541,583 A | 7/1996 | Mandelbaum |
| 5,544,086 A | 8/1996 | Davis et al. |
| 5,544,246 A | 8/1996 | Mandelbaum et al. |
| 5,546,446 A | 8/1996 | Tsunokawa et al. |
| 5,553,120 A | 9/1996 | Katz |
| 5,557,092 A | 9/1996 | Ackley et al. |
| 5,557,516 A | 9/1996 | Hogan |
| 5,563,934 A | 10/1996 | Eda |
| 5,572,004 A | 11/1996 | Raimann |
| 5,577,109 A | 11/1996 | Stimson et al. |
| 5,578,808 A | 11/1996 | Taylor |
| 5,581,064 A | 12/1996 | Riley et al. |
| 5,583,933 A | 12/1996 | Mark |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,609,253 A | 3/1997 | Goade, Sr. |
| 5,612,868 A | 3/1997 | Off |
| 5,617,474 A | 4/1997 | Ditzig et al. |
| 5,619,558 A | 4/1997 | Jheeta |
| 5,621,787 A | 4/1997 | McKoy et al. |
| 5,621,812 A | 4/1997 | Deaton et al. |
| 5,623,547 A * | 4/1997 | Jones et al. .................... 705/68 |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,650,604 A | 7/1997 | Marcous et al. |
| 5,652,786 A | 7/1997 | Rogers |
| 5,653,914 A | 8/1997 | Holmes et al. |
| 5,659,469 A | 8/1997 | Deaton et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,732,136 A | 3/1998 | Murphree et al. |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,744,787 A * | 4/1998 | Teicher .................... 235/380 |
| 5,745,049 A | 4/1998 | Akiyama et al. |
| 5,745,555 A | 4/1998 | Mark |
| 5,745,706 A | 4/1998 | Wolfberg et al. |
| 5,748,737 A | 5/1998 | Daggar |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,774,882 A | 6/1998 | Keen |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,403 A | 7/1998 | Randle |
| 5,787,404 A | 7/1998 | Fernandez-Holmann |
| 5,789,732 A | 8/1998 | McMahon et al. |
| 5,789,733 A | 8/1998 | Jachimowicz et al. |
| 5,790,636 A | 8/1998 | Marshall |
| 5,794,207 A | 8/1998 | Walker |
| 5,796,827 A | 8/1998 | Coppersmith et al. |
| 5,797,133 A | 8/1998 | Jones |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |

(56) References Cited

U.S. PATENT DOCUMENTS

| | | |
|---|---|---|
| 5,806,045 A | 9/1998 | Biorge |
| 5,806,047 A | 9/1998 | Hackel et al. |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,825,871 A | 10/1998 | Mark |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,842,421 A | 12/1998 | Desilets et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,456 A | 2/1999 | Rogers |
| 5,870,718 A | 2/1999 | Spector |
| 5,870,721 A | 2/1999 | Norris |
| 5,875,437 A | 2/1999 | Atkins |
| 5,877,975 A | 3/1999 | Jigour et al. |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| D408,054 S | 4/1999 | Leedy, Jr. |
| 5,895,075 A * | 4/1999 | Edwards ................... 283/81 |
| 5,897,620 A | 4/1999 | Walker et al. |
| 5,897,621 A | 4/1999 | Boesch et al. |
| 5,901,303 A | 5/1999 | Chew |
| 5,903,879 A | 5/1999 | Mitchell |
| 5,905,246 A | 5/1999 | Fajkowski |
| 5,907,142 A | 5/1999 | Kelsey |
| 5,907,350 A | 5/1999 | Nemirofsky |
| 5,907,831 A | 5/1999 | Lotvin et al. |
| 5,911,135 A | 6/1999 | Atkins |
| 5,911,136 A | 6/1999 | Atkins |
| 5,914,472 A | 6/1999 | Foladare et al. |
| 5,918,211 A | 6/1999 | Sloane |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,792 A | 7/1999 | Koppes et al. |
| 5,926,800 A | 7/1999 | Baronowski et al. |
| 5,928,082 A | 7/1999 | Clapper, Jr. |
| 5,930,217 A | 7/1999 | Kayanuma |
| 5,931,764 A | 8/1999 | Freeman et al. |
| 5,933,812 A | 8/1999 | Meyer et al. |
| 5,933,817 A | 8/1999 | Hucal |
| 5,936,221 A | 8/1999 | Corder et al. |
| 5,937,068 A | 8/1999 | Audebert |
| 5,940,811 A | 8/1999 | Norris |
| 5,946,669 A | 8/1999 | Polk |
| 5,949,044 A | 9/1999 | Walker et al. |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,956,711 A | 9/1999 | Sullivan et al. |
| 5,960,411 A | 9/1999 | Hartman et al. |
| 5,963,648 A | 10/1999 | Rosen |
| 5,963,925 A | 10/1999 | Kolling et al. |
| 5,970,469 A | 10/1999 | Scroggie et al. |
| 5,970,478 A | 10/1999 | Walker et al. |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,979,757 A | 11/1999 | Tracy |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,736 A | 11/1999 | Ferguson et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 5,999,624 A | 12/1999 | Hopkins |
| 5,999,917 A | 12/1999 | Facciani et al. |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,205 A | 12/1999 | Loeb et al. |
| 6,006,988 A | 12/1999 | Behrmann et al. |
| 6,009,411 A | 12/1999 | Kepecs |
| 6,009,415 A | 12/1999 | Shurling et al. |
| 6,012,049 A | 1/2000 | Kawan |
| 6,014,634 A | 1/2000 | Scroggie et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,018,718 A | 1/2000 | Walker et al. |
| 6,019,284 A | 2/2000 | Freeman et al. |
| 6,021,189 A | 2/2000 | Vu |
| 6,024,286 A | 2/2000 | Bradley et al. |
| 6,025,283 A | 2/2000 | Roberts |
| 6,026,370 A | 2/2000 | Jermyn |
| 6,029,139 A | 2/2000 | Cunningham et al. |
| 6,029,144 A | 2/2000 | Barrett et al. |
| 6,029,153 A | 2/2000 | Bauchner et al. |
| 6,029,890 A | 2/2000 | Austin |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,360 A | 3/2000 | Picciallo |
| 6,045,042 A | 4/2000 | Ohno |
| 6,045,050 A | 4/2000 | Ippolito et al. |
| 6,047,067 A | 4/2000 | Rosen |
| 6,047,268 A | 4/2000 | Bartoli et al. |
| 6,048,271 A | 4/2000 | Barcelou |
| 6,049,463 A | 4/2000 | O'Malley et al. |
| 6,049,773 A | 4/2000 | McCormack et al. |
| 6,049,782 A | 4/2000 | Gottesman et al. |
| 6,055,573 A | 4/2000 | Gardenswartz et al. |
| 6,058,378 A | 5/2000 | Clark et al. |
| 6,061,660 A | 5/2000 | Eggleston et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| D427,167 S | 6/2000 | Iwasaki |

(56) References Cited

U.S. PATENT DOCUMENTS

| | | |
|---|---|---|
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,085,976 A | 7/2000 | Sehr |
| 6,089,284 A | 7/2000 | Kaehler et al. |
| 6,091,817 A | 7/2000 | Bertina et al. |
| 6,092,056 A | 7/2000 | Tull, Jr. et al. |
| 6,092,057 A | 7/2000 | Zimmerman et al. |
| 6,095,412 A | 8/2000 | Bertina et al. |
| 6,095,416 A | 8/2000 | Grant et al. |
| 6,098,053 A | 8/2000 | Slater |
| 6,105,006 A | 8/2000 | Davis et al. |
| 6,105,007 A | 8/2000 | Norris |
| 6,105,008 A | 8/2000 | Davis et al. |
| 6,105,009 A | 8/2000 | Cuervo |
| 6,105,011 A | 8/2000 | Morrison, Jr. |
| 6,105,865 A | 8/2000 | Hardesty |
| 6,108,642 A | 8/2000 | Findley |
| 6,109,525 A | 8/2000 | Blomqvist et al. |
| 6,112,190 A | 8/2000 | Fletcher et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,119,933 A | 9/2000 | Wong et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,106 A * | 10/2000 | Walker et al. ................... 705/14 |
| 6,138,911 A | 10/2000 | Fredregill et al. |
| 6,138,917 A | 10/2000 | Chapin, Jr. |
| 6,141,666 A | 10/2000 | Tobin |
| 6,142,640 A | 11/2000 | Schofield |
| 6,144,848 A | 11/2000 | Walsh et al. |
| 6,145,741 A | 11/2000 | Wisdom et al. |
| 6,148,293 A | 11/2000 | King |
| 6,148,297 A | 11/2000 | Swor et al. |
| 6,161,096 A | 12/2000 | Bell |
| 6,163,770 A | 12/2000 | Gamble et al. |
| 6,163,771 A | 12/2000 | Walker et al. |
| 6,164,533 A | 12/2000 | Barton |
| 6,164,548 A | 12/2000 | Curiel |
| 6,167,385 A | 12/2000 | Hartley-Urquhart |
| 6,169,974 B1 | 1/2001 | Baumgartner et al. |
| 6,169,975 B1 | 1/2001 | White et al. |
| 6,173,267 B1 | 1/2001 | Cairns |
| 6,179,211 B1 | 1/2001 | Green et al. |
| 6,182,048 B1 | 1/2001 | Osborn et al. |
| 6,182,059 B1 | 1/2001 | Angotti et al. |
| D437,882 S | 2/2001 | Creighton |
| 6,182,894 B1 | 2/2001 | Hackett et al. |
| 6,185,541 B1 | 2/2001 | Scroggie et al. |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,192,142 B1 | 2/2001 | Pare, Jr. et al. |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppichich |
| 6,222,914 B1 | 4/2001 | McMullin |
| 6,223,143 B1 | 4/2001 | Weinstock et al. |
| D442,627 S | 5/2001 | Webb et al. |
| 6,227,445 B1 | 5/2001 | Brookner |
| 6,227,447 B1 | 5/2001 | Campisano |
| 6,227,972 B1 | 5/2001 | Walker et al. |
| 6,243,688 B1 | 6/2001 | Kalina |
| 6,243,689 B1 | 6/2001 | Norton |
| 6,260,758 B1 | 7/2001 | Blumberg |
| 6,263,316 B1 | 7/2001 | Khan et al. |
| 6,265,977 B1 | 7/2001 | Vega et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,282,516 B1 | 8/2001 | Giullani |
| 6,282,522 B1 | 8/2001 | Davis et al. |
| 6,289,322 B1 | 9/2001 | Kitchen et al. |
| 6,289,324 B1 | 9/2001 | Kawan |
| 6,292,786 B1 | 9/2001 | Deaton et al. |
| 6,295,344 B1 | 9/2001 | Marshall |
| 6,295,522 B1 | 9/2001 | Boesch |
| D449,336 S | 10/2001 | Webb et al. |
| 6,298,336 B1 | 10/2001 | Davis et al. |
| 6,302,444 B1 | 10/2001 | Cobben |
| 6,308,268 B1 | 10/2001 | Audebert |
| 6,308,887 B1 | 10/2001 | Korman et al. |
| 6,315,193 B1 | 11/2001 | Hogan |
| 6,315,195 B1 | 11/2001 | Ramachandran |
| 6,315,196 B1 | 11/2001 | Bachman |
| 6,321,211 B1 * | 11/2001 | Dodd ................... 705/26 |
| 6,324,524 B1 | 11/2001 | Lent et al. |
| 6,324,526 B1 | 11/2001 | Dagostino |
| 6,327,573 B1 | 12/2001 | Walker et al. |
| 6,327,575 B1 | 12/2001 | Katz |
| 6,330,543 B1 | 12/2001 | Kepecs |
| 6,330,546 B1 | 12/2001 | Gopinathan et al. |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,344,108 B1 | 2/2002 | Von Medvey et al. |
| 6,345,261 B1 | 2/2002 | Feidelson |
| 6,345,766 B1 | 2/2002 | Taskett et al. |
| 6,349,290 B1 | 2/2002 | Horowitz et al. |
| 6,349,291 B1 | 2/2002 | Varma |
| 6,349,972 B1 | 2/2002 | Geiger et al. |
| 6,351,735 B1 | 2/2002 | Deaton et al. |
| 6,356,881 B1 | 3/2002 | Milch et al. |
| 6,360,209 B1 | 3/2002 | Loeb et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,404,866 B1 | 6/2002 | Hopper et al. |
| 6,405,175 B1 * | 6/2002 | Ng ................... 705/14.26 |
| 6,405,181 B2 | 6/2002 | Lent et al. |
| 6,405,182 B1 | 6/2002 | Cuervo |
| 6,409,080 B2 | 6/2002 | Kawagishi |
| 6,409,593 B1 | 6/2002 | Petrecca |
| 6,411,939 B1 | 6/2002 | Parsons |
| 6,411,947 B1 | 6/2002 | Rice et al. |
| 6,419,161 B1 | 7/2002 | Haddad et al. |
| 6,422,459 B1 | 7/2002 | Kawan |
| 6,422,462 B1 | 7/2002 | Cohen |
| 6,424,029 B1 | 7/2002 | Giesler |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,429,927 B1 | 8/2002 | Borza |
| 6,434,259 B1 | 8/2002 | Hamid et al. |
| 6,434,534 B1 | 8/2002 | Walker et al. |
| D462,477 S | 9/2002 | Osborne |
| 6,446,210 B1 | 9/2002 | Borza |
| 6,450,407 B1 | 9/2002 | Freeman et al. |
| 6,454,647 B1 | 9/2002 | Woodbury, Jr. |

(56) References Cited

U.S. PATENT DOCUMENTS

| | | |
|---|---|---|
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,470,306 B1 | 10/2002 | Pringle et al. |
| 6,471,128 B1 | 10/2002 | Corcoran et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,488,206 B1 | 12/2002 | Flaig et al. |
| 6,490,568 B1 | 12/2002 | Omara et al. |
| 6,491,782 B1 | 12/2002 | Jaynes |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson et al. |
| 6,513,019 B2 | 1/2003 | Lewis |
| 6,516,302 B1 | 2/2003 | Deaton et al. |
| 6,529,880 B1 | 3/2003 | McKeen et al. |
| 6,553,113 B1 | 4/2003 | Dhir et al. |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,564,189 B1 | 5/2003 | Nycz |
| 6,567,786 B1 | 5/2003 | Bibelnieks et al. |
| 6,567,791 B2 | 5/2003 | Lent et al. |
| 6,567,821 B1 | 5/2003 | Polk |
| 6,571,216 B1 | 5/2003 | Garg et al. |
| 6,574,603 B1 | 6/2003 | Dickson et al. |
| 6,575,361 B1 | 6/2003 | Graves et al. |
| 6,578,012 B1 | 6/2003 | Storey |
| 6,581,831 B2 | 6/2003 | Madani |
| 6,581,839 B1 | 6/2003 | Lasch et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| D477,634 S | 7/2003 | Malone |
| 6,592,044 B1 | 7/2003 | Wong et al. |
| 6,594,640 B1 | 7/2003 | Postrel |
| 6,595,342 B1 | 7/2003 | Maritzen et al. |
| 6,601,040 B1 | 7/2003 | Kolls |
| 6,601,761 B1 | 8/2003 | Katis |
| 6,607,127 B2 | 8/2003 | Wong |
| 6,609,104 B1 | 8/2003 | Deaton et al. |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| 6,611,811 B1 | 8/2003 | Deaton et al. |
| 6,611,819 B1 | 8/2003 | Oneda |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,067 S | 10/2003 | Haas |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,647,376 B1 | 11/2003 | Farrar et al. |
| D483,407 S | 12/2003 | Ramnarine |
| 6,655,587 B2 | 12/2003 | Andrews et al. |
| 6,655,598 B1 | 12/2003 | Curiel |
| 6,659,259 B2 | 12/2003 | Knox et al. |
| 6,662,215 B1 | 12/2003 | Moskowitz et al. |
| 6,665,687 B1 | 12/2003 | Burke |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,684,195 B1 | 1/2004 | Deaton et al. |
| 6,687,222 B1 | 2/2004 | Albert et al. |
| 6,693,544 B1 | 2/2004 | Hebbecker |
| 6,697,799 B1 | 2/2004 | Neal et al. |
| 6,705,518 B2 | 3/2004 | Park et al. |
| 6,714,919 B1 | 3/2004 | Findley |
| 6,715,797 B2 | 4/2004 | Curiel |
| 6,718,313 B1 | 4/2004 | Lent et al. |
| 6,721,743 B1 | 4/2004 | Sakakibara |
| 6,726,813 B2 | 4/2004 | Kaule et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,754,640 B2 | 6/2004 | Bozeman |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,795,809 B2 | 9/2004 | O'Brien et al. |
| 6,795,812 B1 | 9/2004 | Lent et al. |
| 6,802,008 B1 | 10/2004 | Ikefuji et al. |
| 6,804,786 B1 | 10/2004 | Chamley et al. |
| 6,805,287 B2 | 10/2004 | Bishop |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,817,008 B2 | 11/2004 | Ledford et al. |
| 6,819,748 B2 | 11/2004 | Weiss et al. |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| D501,875 S | 2/2005 | Dean |
| 6,856,973 B1 | 2/2005 | Bott |
| 6,857,566 B2 | 2/2005 | Wankmueller |
| RE38,717 E | 3/2005 | Bothwell |
| 6,865,547 B1 | 3/2005 | Brake, Jr. et al. |
| 6,868,426 B1 | 3/2005 | Mankoff |
| 6,871,174 B1 | 3/2005 | Dolan et al. |
| 6,874,139 B2 | 3/2005 | Krueger et al. |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,889,198 B2 | 5/2005 | Kawan |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,901,375 B2 | 5/2005 | Fernandez |
| 6,901,406 B2 | 5/2005 | Nabe et al. |
| 6,912,502 B1 | 6/2005 | Buddle et al. |
| 6,913,193 B1 | 7/2005 | Kawan |
| 6,915,271 B1 | 7/2005 | Meyer et al. |
| 6,920,611 B1 | 7/2005 | Spaeth et al. |
| 6,924,026 B2 | 8/2005 | Jaynes |

(56) References Cited

U.S. PATENT DOCUMENTS

| | | |
|---|---|---|
| 6,931,382 B2 | 8/2005 | Laage et al. |
| 6,938,156 B2 | 8/2005 | Wheeler et al. |
| RE38,801 E | 9/2005 | Rogers |
| 6,942,156 B2 | 9/2005 | Ohta et al. |
| 6,942,569 B2 | 9/2005 | Petrecca |
| 6,945,453 B1 | 9/2005 | Schwarz, Jr. |
| 6,947,898 B2 | 9/2005 | Postrel |
| 6,950,940 B2 | 9/2005 | Wheeler et al. |
| 6,954,741 B1 | 10/2005 | Burchetta et al. |
| 6,961,710 B1 | 11/2005 | Yanagisawa et al. |
| 6,963,857 B1 | 11/2005 | Johnson |
| 6,968,348 B1 | 11/2005 | Carone et al. |
| 6,970,830 B1 | 11/2005 | Samra et al. |
| 6,978,369 B2 | 12/2005 | Wheeler et al. |
| 6,985,873 B2 | 1/2006 | Sullivan |
| 6,985,879 B2 | 1/2006 | Walker et al. |
| 6,999,569 B2 | 2/2006 | Risafi et al. |
| 6,999,938 B1 | 2/2006 | Libman |
| 6,999,943 B1 | 2/2006 | Johnson et al. |
| 7,003,476 B1 | 2/2006 | Samra et al. |
| 7,006,979 B1 | 2/2006 | Samra et al. |
| 7,006,992 B1 | 2/2006 | Packwood |
| 7,010,495 B1 | 3/2006 | Samra et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,908 B1 | 4/2006 | Huang et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,063,924 B1 | 6/2006 | Kaminsky et al. |
| 7,066,382 B2 | 6/2006 | Kaplan |
| 7,069,244 B2 | 6/2006 | Strayer et al. |
| D524,859 S | 7/2006 | Graves et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,458 B2 | 7/2006 | Lawlor et al. |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,090,138 B2 | 8/2006 | Rettenmyer et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D530,741 S | 10/2006 | Blossom |
| 7,120,601 B2 | 10/2006 | Chen et al. |
| 7,128,272 B2 | 10/2006 | Doublet |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,171,385 B1 | 1/2007 | Dembo et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |
| 7,228,155 B2 | 6/2007 | Saunders |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,097 B2 | 7/2007 | Hutchison et al. |
| 7,249,099 B2 | 7/2007 | Ling |
| 7,249,112 B2 | 7/2007 | Berardi et al. |
| 7,252,223 B2 | 8/2007 | Schofield |
| 7,252,226 B2 | 8/2007 | Risafi et al. |
| 7,254,560 B2 | 8/2007 | Singhal |
| 7,260,549 B2 | 8/2007 | Spielmann et al. |
| D551,705 S | 9/2007 | Mershon |
| 7,266,524 B1 | 9/2007 | Butcher, III |
| 7,269,737 B2 | 9/2007 | Robinson |
| 7,275,160 B2 | 9/2007 | Pearson et al. |
| 7,295,999 B1 | 11/2007 | Simon et al. |
| 7,306,141 B1 | 12/2007 | Schwarz, Jr. |
| 7,306,163 B2 | 12/2007 | Scholz et al. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,318,049 B2 | 1/2008 | Iannacci |
| D562,888 S | 2/2008 | Brown |
| 7,333,948 B2 | 2/2008 | Bell et al. |
| 7,340,431 B1 | 3/2008 | McManus et al. |
| 7,346,562 B2 | 3/2008 | Inoue et al. |
| 7,346,567 B2 | 3/2008 | Weeks |
| 7,349,866 B2 | 3/2008 | Schwarz, Jr. |
| 7,357,331 B2 | 4/2008 | Blossom |
| 7,359,880 B2 | 4/2008 | Abel et al. |
| 7,360,693 B1 | 4/2008 | Sullivan |
| 7,370,004 B1 | 5/2008 | Patel et al. |
| 7,392,221 B2 | 6/2008 | Nabe |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,401,731 B1 | 7/2008 | Pletz et al. |
| D576,671 S | 9/2008 | Field et al. |
| D582,476 S | 12/2008 | Field et al. |
| D582,977 S | 12/2008 | Field et al. |
| 7,461,028 B2 | 12/2008 | Wronski, Jr. |
| 7,467,096 B2 | 12/2008 | Antonucci et al. |
| 7,479,320 B2 | 1/2009 | Keller et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |
| 7,506,804 B2 | 3/2009 | Zajkowski et al. |
| 7,506,806 B2 | 3/2009 | Bonalle et al. |
| 7,512,551 B2 | 3/2009 | Postrel |
| 7,530,491 B2 | 5/2009 | Lasch et al. |
| 7,580,857 B2 | 8/2009 | VanFleet et al. |
| 7,588,184 B2 | 9/2009 | Gandel et al. |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 7,630,935 B2 | 12/2009 | Loeger et al. |
| 7,660,763 B1 | 2/2010 | Brake, Jr. et al. |
| 7,676,425 B1 | 3/2010 | Noles |
| 7,676,459 B2 | 3/2010 | Carone et al. |
| 7,686,218 B2 | 3/2010 | Hessburg et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,742,970 B2 | 6/2010 | Thierer et al. |
| 7,747,463 B1 | 6/2010 | Phillips et al. |
| 7,753,259 B1 | 7/2010 | Taylor et al. |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0014868 A1 | 8/2001 | Herz et al. |
| 2001/0023407 A1 | 9/2001 | Liyanearachchi et al. |
| 2001/0025253 A1 | 9/2001 | Heintz et al. |
| 2001/0027389 A1 | 10/2001 | Beverina et al. |
| 2001/0027441 A1 | 10/2001 | Wankmueller |
| 2001/0029490 A1 | 10/2001 | Inamochi |
| 2001/0032312 A1 | 10/2001 | Runje et al. |
| 2001/0034647 A1 | 10/2001 | Marks et al. |
| 2001/0034651 A1 | 10/2001 | Marks et al. |

(56) References Cited

U.S. PATENT DOCUMENTS

| | | |
|---|---|---|
| 2001/0034663 A1 | 10/2001 | Teveler et al. |
| 2001/0034682 A1 | 10/2001 | Knight et al. |
| 2001/0034684 A1 | 10/2001 | Cushing et al. |
| 2001/0034718 A1 | 10/2001 | Shaked et al. |
| 2001/0037243 A1 | 11/2001 | Rouston et al. |
| 2001/0037276 A1 | 11/2001 | Kelly et al. |
| 2001/0037299 A1 | 11/2001 | Nichols et al. |
| 2001/0037315 A1 | 11/2001 | Saliba et al. |
| 2001/0038033 A1 | 11/2001 | Habib |
| 2001/0039511 A1 | 11/2001 | Duckworth et al. |
| 2001/0044293 A1 | 11/2001 | Morgan |
| 2001/0044733 A1 | 11/2001 | Lee et al. |
| 2001/0044764 A1 | 11/2001 | Arnold |
| 2001/0047332 A1 | 11/2001 | Gonen-Friedman et al. |
| 2001/0047342 A1 | 11/2001 | Cuervo |
| 2001/0049628 A1 | 12/2001 | Icho |
| 2001/0051917 A1 | 12/2001 | Bissonette et al. |
| 2001/0054003 A1 | 12/2001 | Chien et al. |
| 2001/0056398 A1 | 12/2001 | Scheirer |
| 2002/0002485 A1 | 1/2002 | O'Brien et al. |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010591 A1 | 1/2002 | Pomerance |
| 2002/0010621 A1 | 1/2002 | Bell et al. |
| 2002/0011517 A1 | 1/2002 | Namekawa et al. |
| 2002/0013751 A1 | 1/2002 | Facciani et al. |
| 2002/0019793 A1 | 2/2002 | Frattalone |
| 2002/0019803 A1 | 2/2002 | Muller |
| 2002/0026365 A1 | 2/2002 | Natanzon |
| 2002/0026416 A1 | 2/2002 | Provinse |
| 2002/0026418 A1 | 2/2002 | Koppel et al. |
| 2002/0029191 A1 | 3/2002 | Ishibashi et al. |
| 2002/0032609 A1 | 3/2002 | Wilkman |
| 2002/0032622 A1 | 3/2002 | Petit et al. |
| 2002/0035527 A1 | 3/2002 | Corrin |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046089 A1 | 4/2002 | Zorn |
| 2002/0046106 A1 | 4/2002 | Ishibashi et al. |
| 2002/0046110 A1 | 4/2002 | Gallagher |
| 2002/0046116 A1 | 4/2002 | Hohle et al. |
| 2002/0046255 A1 | 4/2002 | Moore et al. |
| 2002/0049605 A1 | 4/2002 | Hagi |
| 2002/0052778 A1 | 5/2002 | Murphy et al. |
| 2002/0052852 A1 | 5/2002 | Bozeman |
| 2002/0055874 A1 | 5/2002 | Cohen |
| 2002/0059103 A1 | 5/2002 | Anderson et al. |
| 2002/0059139 A1 | 5/2002 | Evans |
| 2002/0062235 A1 | 5/2002 | Wahlbin et al. |
| 2002/0062249 A1 | 5/2002 | Iannacci |
| 2002/0062253 A1 | 5/2002 | Dosh et al. |
| 2002/0062257 A1 | 5/2002 | Minamishin et al. |
| 2002/0062279 A1 | 5/2002 | Behrenbrinker et al. |
| 2002/0065712 A1 | 5/2002 | Kawan et al. |
| 2002/0065720 A1 | 5/2002 | Carswell et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069122 A1 | 6/2002 | Yun et al. |
| 2002/0069158 A1 | 6/2002 | Larkin et al. |
| 2002/0070270 A1 | 6/2002 | Narita et al. |
| 2002/0070976 A1 | 6/2002 | Tanner et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0073030 A1 | 6/2002 | Offer |
| 2002/0073042 A1 | 6/2002 | Maritzen et al. |
| 2002/0077890 A1 | 6/2002 | LaPointe et al. |
| 2002/0077895 A1 | 6/2002 | Howell |
| 2002/0077904 A1 | 6/2002 | Ali |
| 2002/0077964 A1 | 6/2002 | Brody et al. |
| 2002/0077966 A1 | 6/2002 | Harycki et al. |
| 2002/0077978 A1 | 6/2002 | O'Leary et al. |
| 2002/0082920 A1 | 6/2002 | Austin et al. |
| 2002/0082962 A1 | 6/2002 | Farris et al. |
| 2002/0082990 A1 | 6/2002 | Jones |
| 2002/0087349 A1 | 7/2002 | Wong |
| 2002/0087373 A1 | 7/2002 | Dickstein et al. |
| 2002/0091567 A1 | 7/2002 | Royston |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0099586 A1 | 7/2002 | Bladen et al. |
| 2002/0099601 A1 | 7/2002 | Farrell |
| 2002/0099649 A1 | 7/2002 | Lee et al. |
| 2002/0099667 A1 | 7/2002 | Diamandis et al. |
| 2002/0103852 A1 | 8/2002 | Pushka |
| 2002/0104878 A1 | 8/2002 | Seifert et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111886 A1 | 8/2002 | Chenevich et al. |
| 2002/0111891 A1 | 8/2002 | Hoffman et al. |
| 2002/0111916 A1 | 8/2002 | Coronna et al. |
| 2002/0116266 A1 | 8/2002 | Marshall |
| 2002/0116271 A1 | 8/2002 | Mankoff |
| 2002/0116330 A1 | 8/2002 | Hed et al. |
| 2002/0116331 A1 | 8/2002 | Cataline et al. |
| 2002/0117541 A1 | 8/2002 | Biggar et al. |
| 2002/0120497 A1 | 8/2002 | King |
| 2002/0120571 A1 | 8/2002 | Maung et al. |
| 2002/0120627 A1 | 8/2002 | Mankoff |
| 2002/0120642 A1 | 8/2002 | Fetherston |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0129221 A1 | 9/2002 | Borgia et al. |
| 2002/0133401 A1 | 9/2002 | Mount et al. |
| 2002/0133461 A1 | 9/2002 | Ramachandran |
| 2002/0138409 A1 | 9/2002 | Bass |
| 2002/0138418 A1 | 9/2002 | Zarin et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0143703 A1 | 10/2002 | Razvan et al. |
| 2002/0145039 A1 | 10/2002 | Carroll |
| 2002/0147633 A1 | 10/2002 | Rafizadeh |
| 2002/0147662 A1 | 10/2002 | Anderson |
| 2002/0147683 A1 | 10/2002 | Capobianco et al. |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152168 A1 | 10/2002 | Neofytides et al. |
| 2002/0152179 A1 | 10/2002 | Racov |
| 2002/0156723 A1 | 10/2002 | Lilly et al. |
| 2002/0161630 A1 | 10/2002 | Kern et al. |
| 2002/0161641 A1 | 10/2002 | Quinlan et al. |
| 2002/0161699 A1 | 10/2002 | Okamoto et al. |
| 2002/0161702 A1 | 10/2002 | Milberger et al. |
| 2002/0165771 A1 | 11/2002 | Walker et al. |
| 2002/0165808 A1 | 11/2002 | Zamsky et al. |
| 2002/0165820 A1 | 11/2002 | Anvekar et al. |
| 2002/0165829 A1 | 11/2002 | Jones et al. |
| 2002/0169671 A1 | 11/2002 | Junger |
| 2002/0169719 A1 | 11/2002 | Dively et al. |
| 2002/0174011 A1 | 11/2002 | Sanchez et al. |
| 2002/0174016 A1 | 11/2002 | Cuervo |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178056 A1 | 11/2002 | Lim |
| 2002/0178063 A1 | 11/2002 | Gravelle et al. |
| 2002/0178112 A1 | 11/2002 | Goeller et al. |
| 2002/0187825 A1 | 12/2002 | Tracy et al. |
| 2002/0188478 A1 | 12/2002 | Breeland et al. |
| 2002/0188509 A1 | 12/2002 | Ariff et al. |

(56) References Cited

U.S. PATENT DOCUMENTS

| | | |
|---|---|---|
| 2002/0188511 A1 | 12/2002 | Johnson et al. |
| 2002/0188565 A1 | 12/2002 | Nakamura et al. |
| 2002/0190123 A1 | 12/2002 | Anvekar et al. |
| 2002/0194071 A1 | 12/2002 | Yoshizaki et al. |
| 2002/0194081 A1 | 12/2002 | Perkowski |
| 2002/0194098 A1 | 12/2002 | Stiff et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2002/0198848 A1 | 12/2002 | Michener |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0004828 A1 | 1/2003 | Epstein |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0010831 A1 | 1/2003 | Ye |
| 2003/0018523 A1 | 1/2003 | Rappaport et al. |
| 2003/0018549 A1 | 1/2003 | Fei et al. |
| 2003/0018613 A1 | 1/2003 | Oytac |
| 2003/0023549 A1 | 1/2003 | Armes et al. |
| 2003/0023557 A1 | 1/2003 | Moore |
| 2003/0028483 A1 | 2/2003 | Sanders et al. |
| 2003/0028518 A1 | 2/2003 | Mankoff |
| 2003/0031321 A1 | 2/2003 | Mages |
| 2003/0033211 A1 | 2/2003 | Haines et al. |
| 2003/0033246 A1 | 2/2003 | Slater |
| 2003/0033252 A1 | 2/2003 | Buttridge et al. |
| 2003/0034388 A1 | 2/2003 | Routhenstein et al. |
| 2003/0036952 A1 | 2/2003 | Panttaja et al. |
| 2003/0040927 A1 | 2/2003 | Sato et al. |
| 2003/0040959 A1 | 2/2003 | Fei et al. |
| 2003/0040964 A1 | 2/2003 | Lacek |
| 2003/0046249 A1 | 3/2003 | Wu |
| 2003/0046542 A1 | 3/2003 | Chen et al. |
| 2003/0048888 A1 | 3/2003 | Hopper et al. |
| 2003/0050831 A1 | 3/2003 | Klayh |
| 2003/0053609 A1 | 3/2003 | Risafi et al. |
| 2003/0055780 A1 | 3/2003 | Hansen et al. |
| 2003/0055782 A1 | 3/2003 | Slater |
| 2003/0055783 A1 | 3/2003 | Cataline et al. |
| 2003/0061093 A1 | 3/2003 | Todd |
| 2003/0061097 A1 | 3/2003 | Walker et al. |
| 2003/0061098 A1 | 3/2003 | Meyer |
| 2003/0061157 A1 | 3/2003 | Hirka et al. |
| 2003/0061168 A1 | 3/2003 | Routhenstein |
| 2003/0065618 A1 | 4/2003 | VanDeBoe, Jr. |
| 2003/0065624 A1 | 4/2003 | James et al. |
| 2003/0069808 A1 | 4/2003 | Cardno |
| 2003/0074167 A1 | 4/2003 | Browne et al. |
| 2003/0074290 A1 | 4/2003 | Clore |
| 2003/0078815 A1 | 4/2003 | Parsons |
| 2003/0078881 A1 | 4/2003 | Elliott et al. |
| 2003/0083933 A1 | 5/2003 | McAlear |
| 2003/0085272 A1 | 5/2003 | Andrews et al. |
| 2003/0085286 A1 | 5/2003 | Kelley et al. |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0101119 A1 | 5/2003 | Parsons et al. |
| 2003/0101131 A1 | 5/2003 | Warren et al. |
| 2003/0105672 A1 | 6/2003 | Epstein et al. |
| 2003/0105688 A1 | 6/2003 | Brown et al. |
| 2003/0105689 A1 | 6/2003 | Chandak et al. |
| 2003/0105714 A1 | 6/2003 | Alarcon Luther et al. |
| 2003/0110111 A1 | 6/2003 | Nalebuff et al. |
| 2003/0115100 A1 | 6/2003 | Teicher |
| 2003/0120544 A1 | 6/2003 | Gritzbach et al. |
| 2003/0120571 A1 | 6/2003 | Blagg |
| 2003/0125969 A1 | 7/2003 | Kizer et al. |
| 2003/0126011 A1 | 7/2003 | Bryman et al. |
| 2003/0130895 A1 | 7/2003 | Antonucci et al. |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0135462 A1 | 7/2003 | Brake, Jr. et al. |
| 2003/0140004 A1 | 7/2003 | O'Leary et al. |
| 2003/0144902 A1 | 7/2003 | Bowie |
| 2003/0144935 A1 | 7/2003 | Sobek |
| 2003/0149629 A1 | 8/2003 | Claridge et al. |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0163403 A1 | 8/2003 | Chen et al. |
| 2003/0163416 A1 | 8/2003 | Kitajima |
| 2003/0167218 A1 | 9/2003 | Field et al. |
| 2003/0167220 A1 | 9/2003 | Schoen et al. |
| 2003/0171992 A1 | 9/2003 | Blagg et al. |
| 2003/0172040 A1 | 9/2003 | Kemper et al. |
| 2003/0182218 A1 | 9/2003 | Blagg |
| 2003/0182246 A1 | 9/2003 | Johnson et al. |
| 2003/0182247 A1 | 9/2003 | Mobed et al. |
| 2003/0187787 A1 | 10/2003 | Freund |
| 2003/0195805 A1 | 10/2003 | Storey |
| 2003/0195808 A1 | 10/2003 | Brown et al. |
| 2003/0195842 A1 | 10/2003 | Reece |
| 2003/0200141 A1 | 10/2003 | Robison |
| 2003/0200142 A1 | 10/2003 | Hicks et al. |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0213843 A1 | 11/2003 | Jackson |
| 2003/0216964 A1 | 11/2003 | MacLean et al. |
| 2003/0216965 A1 | 11/2003 | Libman |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0220834 A1 | 11/2003 | Leung et al. |
| 2003/0222136 A1 | 12/2003 | Bolle et al. |
| 2003/0225618 A1 | 12/2003 | Hessburg et al. |
| 2003/0225619 A1 | 12/2003 | Dokken et al. |
| 2003/0229525 A1 | 12/2003 | Callahan et al. |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233292 A1 | 12/2003 | Richey et al. |
| 2003/0236704 A1 | 12/2003 | Antonucci |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0024672 A1 | 2/2004 | Brake, Jr. et al. |
| 2004/0024693 A1 | 2/2004 | Lawrence |
| 2004/0029569 A1 | 2/2004 | Khan et al. |
| 2004/0030626 A1 | 2/2004 | Libman |
| 2004/0039588 A1 | 2/2004 | Libman |
| 2004/0039686 A1 | 2/2004 | Klebanoff |
| 2004/0039687 A1 | 2/2004 | Lent et al. |
| 2004/0044606 A1 | 3/2004 | Buttridge et al. |
| 2004/0049451 A1 | 3/2004 | Berardi et al. |
| 2004/0049452 A1 | 3/2004 | Blagg |
| 2004/0059952 A1 | 3/2004 | Newport et al. |
| 2004/0064332 A1 | 4/2004 | Zou et al. |
| 2004/0064401 A1 | 4/2004 | Palaghita et al. |
| 2004/0064402 A1 | 4/2004 | Dreyer et al. |
| 2004/0078324 A1 | 4/2004 | Lonnberg et al. |

(56) References Cited

U.S. PATENT DOCUMENTS

| | | |
|---|---|---|
| 2004/0078328 A1 | 4/2004 | Talbert et al. |
| 2004/0078332 A1 | 4/2004 | Ferguson et al. |
| 2004/0088236 A1 | 5/2004 | Manning |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0107161 A1 | 6/2004 | Tanaka et al. |
| 2004/0111363 A1 | 6/2004 | Trench et al. |
| 2004/0111371 A1 | 6/2004 | Friedman |
| 2004/0117202 A1 | 6/2004 | Winklevoss et al. |
| 2004/0118914 A1 | 6/2004 | Smith et al. |
| 2004/0122736 A1 | 6/2004 | Strock et al. |
| 2004/0128186 A1 | 7/2004 | Breslin et al. |
| 2004/0128195 A1 | 7/2004 | Sorem |
| 2004/0128217 A1 | 7/2004 | Friedman et al. |
| 2004/0128248 A1 | 7/2004 | Fujihara et al. |
| 2004/0133787 A1 | 7/2004 | Doughty et al. |
| 2004/0138991 A1 | 7/2004 | Song et al. |
| 2004/0143526 A1 | 7/2004 | Monasterio et al. |
| 2004/0149544 A1 | 8/2004 | Dal Ferro |
| 2004/0155101 A1 | 8/2004 | Royer et al. |
| 2004/0158517 A1 | 8/2004 | Mahaney et al. |
| 2004/0159700 A1 | 8/2004 | Khan et al. |
| 2004/0172350 A1 | 9/2004 | Atkinson et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186773 A1 | 9/2004 | George et al. |
| 2004/0193539 A1 | 9/2004 | Sullivan |
| 2004/0193540 A1 | 9/2004 | Brown et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0232223 A1 | 11/2004 | Beenau et al. |
| 2004/0236688 A1 | 11/2004 | Bozeman |
| 2004/0239481 A1 | 12/2004 | Beenau et al. |
| 2004/0242308 A1 | 12/2004 | Gray |
| 2004/0243468 A1 | 12/2004 | Cohagan et al. |
| 2004/0243498 A1 | 12/2004 | Duke |
| 2004/0243506 A1 | 12/2004 | Das |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252012 A1 | 12/2004 | Beenau et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0021353 A1 | 1/2005 | Aviles et al. |
| 2005/0021363 A1 | 1/2005 | Stimson et al. |
| 2005/0021400 A1 | 1/2005 | Postrel |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0027649 A1 | 2/2005 | Cech |
| 2005/0033619 A1 | 2/2005 | Barnes et al. |
| 2005/0033637 A1 | 2/2005 | Underwood |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0049965 A1 | 3/2005 | Jen |
| 2005/0055270 A1 | 3/2005 | Broe |
| 2005/0060260 A1 | 3/2005 | Masuda et al. |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071230 A1 | 3/2005 | Mankoff |
| 2005/0075889 A1 | 4/2005 | Gomes et al. |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0080672 A1 | 4/2005 | Courtion et al. |
| 2005/0086103 A1 | 4/2005 | Agura et al. |
| 2005/0086160 A1 | 4/2005 | Wong et al. |
| 2005/0086166 A1 | 4/2005 | Monk et al. |
| 2005/0086167 A1 | 4/2005 | Brake, Jr. et al. |
| 2005/0091104 A1 | 4/2005 | Abraham |
| 2005/0091138 A1 | 4/2005 | Awatsu |
| 2005/0091492 A1 | 4/2005 | Benson et al. |
| 2005/0096976 A1 | 5/2005 | Nelms |
| 2005/0097033 A1 | 5/2005 | Pretell et al. |
| 2005/0102178 A1 | 5/2005 | Phillips et al. |
| 2005/0102228 A1 | 5/2005 | Srinivasan et al. |
| 2005/0108064 A1 | 5/2005 | Castleman et al. |
| 2005/0108090 A1 | 5/2005 | Takeda et al. |
| 2005/0108102 A1 | 5/2005 | York |
| 2005/0108151 A1 | 5/2005 | York |
| 2005/0108152 A1 | 5/2005 | Tsoa Lee et al. |
| 2005/0114883 A1 | 5/2005 | Nagai et al. |
| 2005/0116024 A1 | 6/2005 | Beenau et al. |
| 2005/0119938 A1 | 6/2005 | Smith et al. |
| 2005/0119979 A1 | 6/2005 | Murashita et al. |
| 2005/0125292 A1 | 6/2005 | Kassab et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131761 A1 | 6/2005 | Trika et al. |
| 2005/0131792 A1 | 6/2005 | Rowe |
| 2005/0137951 A1 | 6/2005 | Michelassi et al. |
| 2005/0137982 A1 | 6/2005 | Michelassi et al. |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177508 A1 | 8/2005 | Pembroke |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209914 A1 | 9/2005 | Nguyen et al. |
| 2005/0209917 A1 | 9/2005 | Anderson et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |

(56) References Cited

U.S. PATENT DOCUMENTS

| | | |
|---|---|---|
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289044 A1 | 12/2005 | Breslin et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020542 A1 | 1/2006 | Litle |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0036543 A1 | 2/2006 | Blagg et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0047573 A1 | 3/2006 | Mitchell et al. |
| 2006/0047589 A1 | 3/2006 | Grau |
| 2006/0053056 A1 | 3/2006 | Alspach-Goss et al. |
| 2006/0064329 A1 | 3/2006 | Abolfathi et al. |
| 2006/0074794 A1 | 4/2006 | Nespola, Jr. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0085334 A1 | 4/2006 | Murphy |
| 2006/0095350 A1 | 5/2006 | Hall et al. |
| 2006/0106696 A1 | 5/2006 | Carlson et al. |
| 2006/0116903 A1 | 6/2006 | Becerra |
| 2006/0116955 A1 | 6/2006 | Strayer et al. |
| 2006/0122918 A1 | 6/2006 | Graboske et al. |
| 2006/0131869 A1 | 6/2006 | Brignull |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0157557 A1 | 7/2006 | Lee et al. |
| 2006/0161478 A1 | 7/2006 | Turner et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0259390 A1 | 11/2006 | Rosenberger |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0038515 A1 | 2/2007 | Postrel |
| 2007/0063025 A1 | 3/2007 | Blossom |
| 2007/0078719 A1 | 4/2007 | Schmitt et al. |
| 2007/0118470 A1 | 5/2007 | Warren et al. |
| 2007/0124227 A1 | 5/2007 | Dembo |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0226097 A1 | 9/2007 | Keechle |
| 2007/0265924 A1 | 11/2007 | Schwarz |
| 2008/0005018 A1 | 1/2008 | Powell |
| 2008/0010202 A1 | 1/2008 | Schwarz |
| 2008/0019281 A1 | 1/2008 | Liger et al. |
| 2008/0027841 A1 | 1/2008 | Eder |
| 2008/0133350 A1 | 6/2008 | White et al. |
| 2008/0177659 A1 | 7/2008 | Lacey et al. |
| 2008/0187770 A1 | 8/2008 | Funicelli et al. |
| 2008/0215470 A1 | 9/2008 | Sengupta et al. |
| 2008/0230600 A1 | 9/2008 | Black et al. |
| 2008/0245865 A1 | 10/2008 | Mosteller |
| 2008/0262915 A1 | 10/2008 | Gojkovic et al. |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0112639 A1 | 4/2009 | Robinson Beaver |
| 2009/0150370 A1 | 6/2009 | Christensen et al. |
| 2009/0171778 A1 | 7/2009 | Powell |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2009/0313106 A1 | 12/2009 | Taylor et al. |
| 2009/0313110 A1 | 12/2009 | Asai et al. |
| 2010/0030675 A1 | 2/2010 | Hanan et al. |
| 2010/0030697 A1 | 2/2010 | Goodrich et al. |
| 2010/0057551 A1 | 3/2010 | Blaisdell |
| 2010/0057553 A1 | 3/2010 | Ameiss et al. |
| 2010/0114779 A1 | 5/2010 | Noles |

FOREIGN PATENT DOCUMENTS

| | | |
|---|---|---|
| DE | 102006015818 | 10/2007 |
| EP | 0843292 A2 | 5/1998 |
| EP | 0855659 | 7/1998 |
| EP | 959440 | 11/1999 |
| EP | 0590861 | 1/2001 |
| GB | 2275654 A | 9/1994 |
| GB | 2376787 | 12/2002 |
| GB | 2377071 | 12/2002 |
| GB | 2377314 | 1/2003 |
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 94/29112 | 12/1994 |
| WO | WO 97/20692 | 6/1997 |
| WO | WO 97/41673 | 11/1997 |
| WO | WO 98/10368 | 3/1998 |
| WO | WO 98/58345 | 12/1998 |
| WO | WO 98/59307 | 12/1998 |
| WO | WO 99/05633 | 2/1999 |
| WO | WO 99/54841 | 10/1999 |
| WO | WO 01/11532 | 2/2001 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 01/88659 | 11/2001 |
| WO | WO 2005/043277 A3 | 5/2005 |
| WO | WO 2005/101975 | 11/2005 |
| WO | WO 2006/060370 | 6/2006 |
| WO | WO 2006/105092 | 10/2006 |
| WO | WO 2006/116772 | 11/2006 |

(56) References Cited

FOREIGN PATENT DOCUMENTS

| WO | WO 2007/115725 | 10/2007 |
|---|---|---|
| WO | WO 2008/021381 | 2/2008 |
| WO | WO 2008/021382 | 2/2008 |
| WO | WO 2009/023817 | 2/2009 |

OTHER PUBLICATIONS

Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.

E-Z Pass, Web page, http://www.ezpass.com-Disc__portNewYork.html, Nov. 12, 2001.
E-Z Pass, Web page, http:\\www.ezpass.com-Disc__ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp—Company Report.
Machlis, Have it the smart way: Burger King program drives smartcard use, Computerworld, printed Feb. 23, 2001, 1 page.
Here's the calling convenience you asked for: 1-800-call-Att . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Incentive Firms Find Debit Cards A Rewarding Experience (Off-line debit card issuers converge efforts with companies looking for effective incentives to boost employee productivity and to motivate individuals to buy their products), Debit Card News, vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Meridian Award Cards, JA8251.
Meridian Interoffice Memo, MeridiCard Enhancement—Floating Credit Limit, JA8354-JA8355, Aug. 2, 1989.
Meridian—the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.

(56) References Cited

OTHER PUBLICATIONS

New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways For a better Total Return For Your Money; Schwat 1, The Inventor's Asset Management Account, Charles R. Schwab, Charles Schwab & Co., Inc., 16 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.
"In Time of Need: A National Strategy for Disaster Relief Cards," prepared by JPMorgan Chase Treasury Services—Public Sector, Jan. 26, 2007.
Abstract to 2007 JPMorgan Chase Disaster Response Card National Strategy Plan Abstract, Jan. 26, 2007.
Alaska Housing Finance Corporation Quarterly Unaudited Financial Statements with Summarized Financial Information for Jun. 30, 2004, and Request for Information Banking Services, Mar. 31, 2005, Bates Nos. ACS-00000143-ACS-00000231.
Allen et al., Overview of Smart Cards and the Industry, Smart Cards Seizing Strategic Business Opportunities, Chapter 1, p. 2-20, Irwin Professional Publishing, 1997.
American Bankers Association, The Bank Credit Card Business, (1996).
AMOCO article; Associates-Corp/AMOCO, Business Wire; Aug. 29, 1985.
Anonymous, Association of Inventive Gift Certificate Suppliers, vol. 169, No. 8, Aug. 1, 1995.
Anonymous, Coca-Cola ATM Money Cards, Retrieved from the Internet at: http:--www.cardweb.com-cardtrak-news-cf4_4a_97.html, Apr. 4, 1997, ACS 012.
Anonymous, Two Chips Can Be Better Than One, May 2001.
Authorization of Financial Agent and Terms of Performance, Debit Card Application for Houston, Texas, Sep. 1991, acs00277412.
Block, First Data Subsidiary Creates Payroll Card for the Bankless, LexisNexis Academic, Credit/Debit/ATMs, p. 10, Mar. 21, 1997.
Board of Governors of the Federal Reserve System—Report to the Congress on the Application of the Electronic Fund Transfer Act to Electronic Stored-Value Products, May 1997, acs00098020.
Boatmen's Floats Stored Value into the Employee Incentive Waters, Debit Card News, vol. 2, Issue 2, Jul. 16, 1996, 3 pages.
Bowen, Cathy, Welfare Agencies Seek Aid From Smart Cards, p. 74, Oct. 2002.
Business Editors and Real Estate Writers, Business Editors and Real Estate Automotive Writers, Consumers Now Can Know What Loan Rate Offers to Expect Based on Their FICO Credit Score at MyFICO.com, Business Wire, New York, Mar. 6, 2002, p. 1.
cardweb.com, Daily Payment Card News (2004).
Cheney, How Effective Were the Financial Saftey Nets in the Aftermath of Katrina, HurricaneKatrinaJan06, Jan. 2006.
Claessens, et al., A Tangled World Wide Web of Security Issues, First Monday, retrieved from the internet at http//www.firstmonday.org/issues/issue7_3/claessens, retrieved from the internet on Oct. 6, 2006.
D. O'Mahony, Electronic Payment System, Artech House, XP002137255, p. 7-11 (1997).
Debit and Stored Value Cards for Government: A Growing Trend but States Could Do More, A Survey and White paper of The EBT Industry Council, Nov. 2006.
Debit Card News—Paperless Trail Leads Debit to a Check-Free Payroll Program, vol. 3, No. 12, Dec. 16, 1997.
Debit Card Services—Invitation for Expressions of Interest, acs00277422, Jul. 1991.
Definition of Store-Value Card, Wikipedia, retrieved from the internet at http//en.wikipedia.org/wiki/Stored-value_card, retrieved from the internet on Apr. 16, 2007.

(56) References Cited

OTHER PUBLICATIONS

Direct Payment Card, International EBT Pilot Evaluation Pilot Evaluation—Argentina, Jan. 1996, acs00277456.
Eight Keys to Making the Right Choice, Incentive, Dec. 1996, 9 pages.
E-LOAN, Auto Loan Rates, retrieved from the Internet on Sep. 30, 2008.
E-LOAN, Frequently Asked Questions (2001).
Exclusively Yours From Maritz . . . The MasterCard Card Ultimate Incentive, Incentive, Oct. 1995, 3 pages.
Feldman, Judy, Pay by Check Over the Phone or Net, Oct. 1999.
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
Haddad, Charles, et. al., Congratulations, Grads—You're Bankrupt; A Marketing Blitz Buries Kids in Plastic and Debt, May 21, 2001.
Hamey, Home Asset Management Accounts Link Mortgages Equity Lines [Final Edition], The Washington Post, Oct. 5, 2002.
Hargreaves, The Evaluation of the Expanded EBT Demonstration in Maryland, Final Report, May 1994, acs00092018.
Hight, Jim, Consulting Services, www.strategies-tactics.com (2002).
Incentive Firms Find Debit Cards a Rewarding Experience (Off-line debit card issuers converge efforts with companies looking for effective incentives to boost employee productivity and to motivate individuals to buy their products), Debit Card News, Nov. 28, 1997.
Incentive gift Card Another way to give the gift of choice!, Incentive, Aug. 1995, 2 pages.
Quinn, Incentive Cards Explained, Incentive, Dec. 1995, 5 pages.
Kenneth Hein, What's the Deal?, Incentive, Jul. 1998, 7 pages.
Kilian-Kehr, Roger, Kilian-Kerb, Mobile Security with Smartcards, Dissertation, Apr. 8, 2002.
Kleege, Stephen, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).
Lennox, Graeme, Don't Be Tempted by the Urge to Splurge: Zero Rates Sound Great But You'll Pay Dearly in the End, Jul. 2001.
Lewis, David, Lewis, Mortgage Lending Optimized, InternetWeek, Issue 858, Apr. 23, 2001.
LexisNexis Academic, Debit Card Innovation, vol. XXXV, No. 5, p. 2, May 1997.
LexisNexis Academic, Debit Cards Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
Maritz, Incentive, Jun. 1996, p. 111.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
NCNB article; NCNB to become biggest bank in visa debit card program; The American Banker; Mar. 8, 1979.
Nilson, H. Spencer, The Nilson Report, Nov. 1998.
None, Smart Cards Forging Into Credit Card Market, Apr. 3, 1995.
Nora Wood, Corporate Spotlight, Incentive, Dec. 1997, 4 pages.
Ostroff, Jeff, Guide to Buying New Cars, Used Cars, Dealer Scams, Feb. 2001, p. 1-7.
Paper or Plastic? With these three incentives, The Choice is Yours, Incentive, Feb. 1996, 2 pages.
Plotnick, Jennifer, Bakersfield California Investors Explore Buying Rental Property Apr. 11, 2004.
Power, Denise, Loehmann's Compiles Shopper Data Via Credit Card (2005).
Quinn, Jane Bryan; For many college youths, credit cards east to get; American Express article; St. Louise Post-Dispatch; Feb. 3, 1989.
Request for Information submitted to Department of Health and Human Services by JPMorgan Electronic Financial Services, Request for Information for EBT Services, Aug. 10, 2006.
Roberts, Leigh, Fnb and Nedcor Launch Into the New Era of Smart Card Banking Nov. 15, 1998.
Rossman, Kenneth, Summary Appraisal of Real Property (2002).
Sessums, Unbanked Citizens Draw Government Attention, vol. 9, No. 4, (1997) acs00280762.
Sherer, Paul M., Deals & Deal Makers: Web Ventures Seek to Facilitate Business Credit, Private Equity, Nov. 8, 1999.
Siegel, Joel G., et. al., Accounting Handbook, Second Edition (1995).
Statement of Brian Kibble-Smith, House Committee on Ways and Means, Apr. 5, 2006.
The State of Arkansas, Arkansas Code of 1987 Annotated (1999).
Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997.
Vincent Alonzo, Incentive Marketing . . . Three If by Smart Card, Incentive Sep. 1995, p. 11.
Vivo Tech, ViVOTech, Inc. RF-Based Contactless Payment: A more convenient way to pay, White Paper—Version 2.0, Apr. 2004.
Ward, New Debit Card is Introduced to Serve Unbanked Workers; Jun. 23, 1999; News & Business.
Wells Fargo Blazes New Trail for Homeowners, Oct. 2002.
Wenninger et al., The Electronic Purse, Current Issues in Economics and Finance, vol. 1, No. 1, Apr. 1995, acs00098037.
Wolf, Harold A., Personal Finance, Sixth Edition, (1981).
Wood, John et. al., Wood, et al., Electronic Transfer of Government Benefits, Federal Reserve Bulletin, pp. 203-217, Apr. 1997.
Yee, Bennet, Using Secure Coprocessors, May 1994.
Youll, James, Peer to Peer Transactions in Agent Mediated Electronic Commerce, Aug. 2001.
American Banker Inc, American Banker, Inc., NCNB to Become Biggest Bank in Visa Debit Card Program, The American Banker, Mar. 8, 1979.
American Express Incentive Services, Incentive, Sep. 1996, p. 126.
Davis, D., Merchants Unbound, Card Technology, Jun. 2004, vol. 9, No. 7, p. 36 (8 pages).
E-LOAN, A Better Way to Get a Loan—Frequently Asked Questions (FAQ), Apr. 7, 2001, eloan.com (web.archive.org/web/20010407063242/www.wheels.eloan.com/cgibin/show/autofa . . . ).
Federal Transit Administration, TCRP Report 32 Multipurpose Transit Payment Media, Chapter 2 Multipurpose Fare Payment Overview, p. 10-20, 1998.
Kibble-Smith, House Committee on Ways and Means, Statement of Brian Kibble-Smith, JPMorgan Chase Treasury Services, Apr. 5, 2006.
Kiley, Branded!, Catalog Age, Jun. 1996, vol. 3, No. 6, p. 77 (4 pages).
LexisNexis Academic, On the Way, vol. 1997, No. 74, p. 2, Mar. 31, 1997.
McMonagle, Chapter VII—Cash Balance Plans in a Traditional Defined Benefit World, as found on google.scholar (dev.soa.org, Jan. 2002), www.soa.org/.../monographs/retirement-systems/cashbalance-symposium/2002/january/m-rs 02-3-07.pdf—May 7, 2009.
National Automated Clearing House Association (NACHA), Business-to-Business EIPP Presentment Models and Payment Options Part One—Presentment Models, Jan. 2001, Counsel for Electronic Billing and Payment, (cebp.nacha.org).
PR Newswire, American Express and Starwood Launch The New Starwood Preferred Guest (SM) Credit Card from American Express, Jun. 19, 2001, PR Newswire, p. 1.
PR Newswire, Delta and American Express Introduce, Always Double Miles Feature on Delta SkyMiles® Cards, Oct. 2, 2000, PR Newswire, p. 1.

(56) References Cited

OTHER PUBLICATIONS

Press Release, Mar. 5, 2004, Payment Data Systems Files Patent on Debit Card Payment Solution, American City Business Journals, Inc., Mar. 5, 2004.

Pullar-Strecker; 'Kiwi card converts unlikely to lead smart revolution; Little support for changes to risk allocation' (2 Edition) Dominion. Wellington, New Zealand; Apr. 25, 2000, p. IT.6.

Ramsaran, Co-Branded Cards Take Flight, Bank Systems & Technology, May 1, 2005, 52 (1 page).

Rolfe, Europes Cobranding Boom, Credit Card Management, Jan. 2003, vol. 15, No. 11, p. 16 (4 pages).

Tah et al., Information Modelling for a Construction Project Risk Management System, Engineering Construction and Architectural Management, 2000, vol. 7, No. 2, pp. 107-119.

Wood, The Power of the Card, Incentive, Jul. 1997, 6 pages.

\* cited by examiner

Systems Architecture

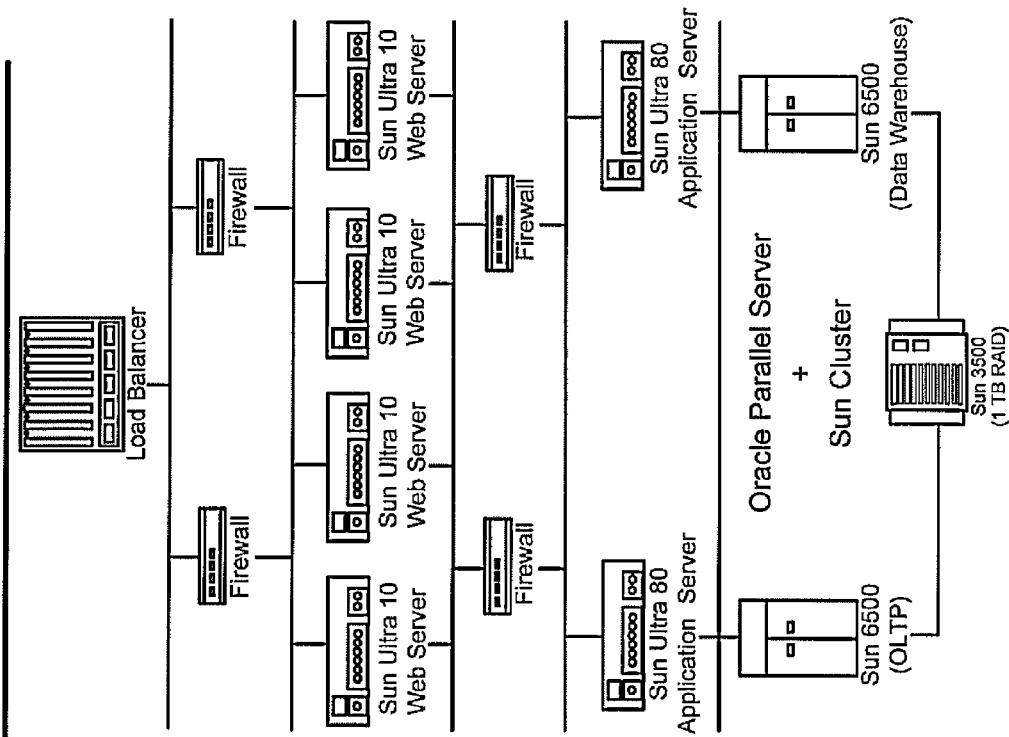

VALEXIA employs an N-tier Web architecture.

- Dedicated hardware IP load balancers
- Sun Web Servers (Apache) / Linux Web Servers (Apache)
- Sun Application Servers (pure Java application on multiple servers)
- Dual Clustered Sun Enterprise Server 6500 Database Servers (running Oracle 8i with Parallel Server for load sharing and failover)
- Sun E3500 1TB transaction database
- Redundant firewalls between each tier.

Fig. 2

Example of a Single Request-Response Transaction

*Community Value Network with Single Shared Value System*

*Community Value Network with Multiple Shared Value System and Two Networks*

*Community Value Exchange: External Value Systems*

Secure Web Based Reporting

User and Group Management:
- ☐ Report / Folder Level
- ☐ Calendar Restrict / Management
- ☐ Scheduling Management

Password Management:
- ☐ Disable after "x" failed logons
- ☐ Auto re-enable after "x" minutes
- ☐ Change after "x" days
- ☐ Password reuse limits
- ☐ Format enforcement, length, mixed case, number and not like user-id.

Chase Merchant Services – Logon – Microsoft Internet Explorer

File  Edit  View  Favorites  Tools  Help

Payment Technologies, Inc.
Evolutionary knowledge. Revolutionary solutions.™

Welcome!
Cancel | Help

Log On

Existing User

APS Name: NT ADMIN
User Name: dsmith
Password:
Authentication: Enterprise

[Log On]

Payment Technologies, Inc.

Fig. 13

Customizable Report Categories (Folders)

PTI DEMO Reporting – Microsoft Internet Explorer
File  Edit  View  Favorites  Tools  Help
Back  Forward  Stop  Refresh  Home  Search  Favorites  History  Mail  Print  Edit  Discuss  Copernic
Address | Links WELCOME TO PTI DEMO REPORTING
LOGGED-ON AS : dsmith Payment Technologies, Inc.
Evolutionary knowledge. Revolutionary solutions.™

Alerts | Favorites | Organize | Settings | Logoff | Help

Look for: [ report name ▼ ] [ Search ]   = = = View last five reports = = = ▼
NTADMIN : Rel-2.0-Stage : Valexia : ACCOUNTS

Folders  Type: [ All ▼ ]

No reports.

| | Account Balance Distribution 9/27/01 4:01:17 AM rptadmin Instances: 6 | | Account Balances Average 9/27/01 4:03:15 AM rptadmin Instances: 6 | Preview |
| | Account Balances Top N 9/1/01 8:29:19 AM rptadmin Instances: 1 | | Account Referred by Another Member rptadmin Instances: 0 | xxxxxxxxxxxxx   Valexia™ |
| | Balance by Status 9/27/01 4:04:25 AM rptadmin Instances: 6 | | Enrollments by day 9/27/01 4:05:17 AM rptadmin Instances: 6 | Schedule View Schedule History View Latest Instance  [ ▼ ] [ Go ] |

Pages: PREVIOUS  1  2  NEXT

© 2001 Payment Technologies, Inc. All rights reserved

Local Intranet

Fig. 15

Transaction Detail Report

Transaction Detail Report

Run date: 7/3/02 8:23:38AM
Date Range  Jul 02, 2002 00:00 to Jul 03, 2002 00:00

CLIENT OF SALENAME                                                                                      Issuer: Loyalty

| TXNDATETIME TXNID | ACCTREF PROMONAME | LOYALTY ACCT# | TRIGGER COUNT TRANS AMOUNT | AVAILABLE REWARD COUNT | AVAILABLE REWARD AMT | TRANSTYPE | ACCUMULATED REWARD VALUE | TOTAL RUNNING REWARD VALUE | REWARD? |
|---|---|---|---|---|---|---|---|---|---|
| Loyalty Merchant 3 | | | | | | | | | |
| 02-Jul-2002 9:00 5872583 | 8416012500004002 TDP | 1821528190003 46035 | 1  1.00 | 0 | 0.00 | DEBIT | 0.00 | 1.00 | Y |
| 02-Jul-2002 9:05 5872801 | 8416012500004002 TDP | 1821528190004 46035 | 1  0.00 | 1 | 0.00 | CREDIT | 10.00 | 0.00 | |
| 02-Jul-2002 9:05 5872802 | 8416012500004002 TDP | 1821528190004 46037 | 1  10.00 | 1 | 0.00 | ACCUMULATION TOWARDS REWARD | 0.00 | 0.00 | |
| 02-Jul-2002 9:05 5872803 | 8416012500004002 TDP | 1821528190004 46037 | 1  1.00 | 0 | 0.00 | DEBIT | 0.00 | 1.00 | Y |
| 02-Jul-2002 9:08 5872807 | 8416012500004002 TDP | 1821528190005 46038 | 1  0.00 | 1 | 0.00 | CREDIT | 10.00 | 0.00 | |
| 02-Jul-2002 9:08 5872808 | 8416012500004002 TDP | 1821528190005 46038 | 1  10.00 | 1 | 0.00 | ACCUMULATION TOWARDS REWARD | 0.00 | 0.00 | |
| 02-Jul-2002 9:08 5872809 | 8416012500004002 TDP | 1821528190006 46038 | 1  1.00 | 0 | 0.00 | DEBIT | 0.00 | 1.00 | Y |
| 02-Jul-2002 9:36 5873053 | 8416012500004002 TDP | 1821528190006 46039 | 1  0.00 | 1 | 0.00 | CREDIT | 10.00 | 0.00 | |
| 02-Jul-2002 9:38 5873054 | 8416012500004002 TDP | 1821528190006 46039 | 1  10.00 | 1 | 0.00 | ACCUMULATION TOWARDS REWARD | 0.00 | 0.00 | |
| 02-Jul-2002 9:38 5873055 | 8416012500004002 TDP | 1830937570000 46040 | 1  1.00 | 0 | 0.00 | DEBIT | 0.00 | 1.00 | Y |
| 02-Jul-2002 9:40 5873142 | 8416012502561102 TDP | 1830937570000 46040 | 1  0.00 | 1 | 0.00 | CREDIT | 10.00 | 0.00 | |
| 02-Jul-2002 9:40 5873143 | 8416012502561102 TDP | 1830937570000 46040 | 1  0.00 | 1 | 0.00 | ACCUMULATION TOWARDS REWARD | 0.00 | 0.00 | |
| 02-Jul-2002 9:40 5873144 | 8416012502561102 TDP | 1830937570000 46041 | 0  1.00 | 0 | 0.00 | DEBIT | 1.23 | 1.00 | Y |
| 02-Jul-2002 10:51 5875442 | 8416012502561102 TDP | 1830937570001 46041 | 1  1.23 | 1 | 0.00 | ACCUMULATION TOWARDS REWARD | 0.00 | 0.00 | |
| 02-Jul-2002 10:53 5875445 | 8416012502561102 TDP | 1830937570001 46041 | 1  0.00 | 1 | 0.00 | CREDIT | 10.23 | 0.00 | |

© 2001 Payment Technologies, Inc. All Rights reserved                            2

Fig. 22

Sample – Daily Financial Batch Summary

Crystal Report Viewer – Microsoft Internet Explorer 2 of 5    100%

Preview

Cash Purse
GoBirds Cash Purse
GoBirds Issuer Funded Purse
GoBirds Payout Wallet
GoBirds Promotional Purse
GoBirds Reloadable Purse
Issuer Funded Purse
Promo Purse Run date: 9/27/01 12:23:05PM

Daily Financial Summary by Batch

Specified Date Range: 9/25/01 to 9/25/01

Batch status: CLOSED
Issuer: GoBirds

| WALLET NAME | FIN CODE | FIN SUBCODE | PRODUCT CODE | DAILY QUANTITY | DAILY AMOUNT | MTD QUANTITY | MTD AMOUNT |
|---|---|---|---|---|---|---|---|
| Cash Purse | 30 | 10 | | 0 | $0.00 | 6 | $0.00 |
| | 30 | 20 | | 0 | $0.00 | 1 | $1.23 |
| Cash Purse Totals: | | | | 0 | $0.00 | 7 | $1.23 |
| GoBirds Cash Purse | 10 | | | 2 | $2.00 | 46 | $46.00 |
| | 20 | 75 | | 3 | $15.00 | 101 | $302.00 |
| | 20 | 85 | | 1 | $1.00 | 41 | $43.00 |
| | 30 | 10 | | 2 | $0.00 | 76 | $0.00 |
| | 30 | 20 | | 7 | $20.00 | 200 | $628.00 |
| GoBirds Cash Purse Totals: | | | | 15 | $38.00 | 464 | $1,019.00 |
| GoBirds Issuer Funded Purse | 10 | | | 2 | $3.00 | 79 | $122.00 |
| | 20 | 85 | | 1 | $0.00 | 40 | $120.00 |
| | 30 | 10 | | 2 | $0.00 | 76 | $0.00 |
| | 30 | 20 | | 3 | $16.00 | 63 | $387.00 |
| GoBirds Issuer Funded Purse Totals: | | | | 8 | $22.00 | 258 | $629.00 |
| GoBirds Payout Wallet | 30 | 10 | | 1 | $0.00 | 42 | $0.00 |
| | 30 | 20 | | 1 | $2.00 | 40 | $79.00 |
| GoBirds Payout Wallet Totals: | | | | 2 | $2.00 | 82 | $79.00 |
| GoBirds Promotional Purse | 10 | | | 1 | $1.00 | 37 | $39.00 |
| | 20 | 85 | | 1 | $4.00 | 40 | $135.00 |
| | 30 | 10 | | 2 | $10.00 | 76 | $380.00 |
| | 30 | 20 | | 1 | $1.00 | 44 | $46.00 |
| GoBirds Promotional Purse Totals: | | | | 5 | $16.00 | 197 | $600.00 |
| GoBirds Reloaded Purse | 10 | | | 2 | $4.50 | 66 | $262.50 |
| | 30 | 10 | | 2 | $0.00 | 76 | $0.00 |
| | 30 | 20 | | 2 | $9.50 | 94 | $454.50 |
| GoBirds Reloadable Purse Totals | | | | 6 | $14.00 | 236 | $717.00 |
| Issuer Funded Purse | 30 | 10 | | 0 | $0.00 | 6 | $0.00 |

© 2001 Payment Technologies, Inc. All Rights reserved

Page 2 of 5

Fig. 23

Campaign Manager: Manage Multiple Promotions

Merchant Manager – CM001 – Microsoft Internet Explorer

File  Edit  View  Favorites  Tools  Help

Back  Forward  Stop  Refresh  Home  Search  Favorites  History  Mail  Print  Address  Links View Promos ◈ Valexia℠

Promotions percentage discount
This promotion is 5% discount on $30.00
The status is   Active
edit

Day of the Week Reward
This promotion is reward for purchase on specific day of the week
The status is   Active
edit

Beta 5%
This promotion is Every $25 get 5% discount on current purchase.
The status is   Active
edit

Printed Promo
This promotion is Print receipt to come back every 2 transactions
The status is   Active
edit

Friday Reward
This promotion is printed receipt on given day of week
The status is   Active
edit

901
This promotion is Single purchase of $25 earn 5 points

Local Intranet

Fig. 28

Campaign Manager: Modify Promotion Info.

Merchant Manager – CM001 – Microsoft Internet Explorer

File  Edit  View  Favorites  Tools  Help

Back  Forward  Stop  Refresh  Home  Search  Favorites  History  Mail  Print

◈◈ Valexia℠

Promotion

| Modify Promotion Options | | |
|---|---|---|
| Modify Promotion Info | Name: | percentage discount |
| Modify Reward Promotion Info | Description: | 5% discount on $30.00 |
| Modify Reward Bin Ranges | Activation Date: | August ▼  16 ▼  2002 |
| Modify POS Receipt | Expiration Date: | August ▼  17 ▼  2002 |
| Modify Reward Received | Promotion Type | Triggered Reward Promo |
| Modify Reward Timing | Promotion Status | Active ▼ |
| Modify Triggered Reward Info | | |
| Modify Trigger By Purchase Amount | OK  Reset  Cancel | |

Campaign Manager: Modify Trigger Amount

Merchant Manager – CM001 – Microsoft Internet Explorer

File   Edit   View   Favorites   Tools   Help

Back   Forward   Stop   Refresh   Home   Search   Favorites   History   Mail   Print Address          Links ◇ Valexia℠

Triggered Reward Promotion

Modify Promotion Options

Modify Promotion Info

Modify Reward Promotion Info

Modify Reward Bin Ranges

Modify POS Receipt

Modify Reward Received

Modify Reward Timing

Modify Triggered Reward Info

Modify Trigger By Purchase Amount

Reward Occurs:  ○ When the single Purchase Amount is greater than or equal to [   ] [U.S. Dollars ▼]
              ● When the accumulated Purchase Amount is greater than or equal to [30.0] [U.S. Dollars ▼]

Reset Accumulated Value:  ☐ Every [   ] [Day ▼]
                          ☑ When the reward is triggered Reset Accumulated Value To: [0.0] [U.S. Dollars ▼]

[OK]  [Reset]  [Cancel]

Local Intranet

Fig. 31

Campaign Manager: Modify Reward Received

◆ Valexia℠

Reward Promotion

Modify Promotion Options
Modify Promotion Info
Modify Reward Promotion Info
Modify Reward Bin Ranges
Modify POS Receipt
Modify Reward Received
Modify Reward Timing
Modify Triggered Reward Info
Modify Trigger By Purchase Amount Reward Received By Consumer:
○
◉
○

Amount Reward: 0.0 [Points ▼]

Percentage Discount Reward: 5.0 %

Maximum Single Reward Amount: 30.0 [U.S. Dollars ▼]

Printed Reward:

[OK] [Reset] [Cancel]

Fig. 32

Customer Care – Transaction List

The customer's loyalty account transactions display.

Payment Technologies, Inc.
Evolutionary knowledge. Revolutionary solutions.™

Customer Service

| Session Status | Account Info | Balances | Manual Adjustment | Transaction Info |
|---|---|---|---|---|
| User extcustserv1 Log Out | << Back | | | |

Valexia Customer Service – Account Transactions

| | Issuer | |
|---|---|---|
| | Loyalty | |
| | Merchant Loyalty Default Client | |
| | Acct Ref 0025871755502 58 Another Account | |

Start Date = 07/01/2002  End Date = 07/10/2002

| Transaction Date | Transaction Id | Transaction Type | Transaction Description | Amount | JOW Id | Reverse |
|---|---|---|---|---|---|---|
| 07/10/2002 11:30:52 | 5898318 | FINANCIALBUSINESSTRANSACTION | The transaction type is for financial business transactions. | 0.00 | 5898317 | Not Reversible |
| 07/10/2002 11:31:43 | 5898323 | FINANCIALBUSINESSTRANSACTION | The transaction type is for financial business transactions. | 0.00 | 5898322 | Not Reversible |
| 07/10/2002 11:31:43 | 5898324 | REWARD Default loyalty promo for Demo Merchant Location | The transaction type is for Rewards. | 25.00 | 5898322 | RevTxn: 5896322 |
| 07/10/2002 11:31:43 | 5898325 | REWARD Default loyalty promo for Demo Merchant Location | The transaction type is for Rewards. | 500.00 | 5898322 | Not Reversible |

<< Back

Fig. 34

SYSTEM AND METHOD FOR PROCESSING TRANSACTIONS

This application is a continuation-in-part of and claims priority, pursuant to 35 U.S.C. 120, to U.S. patent application Ser. No. 09/456,114, filed Dec. 7, 1999, now abandoned entitled PROMOTION AND GIFT CERTIFICATE PROCESSING SYSTEM AND METHOD, which application is incorporated herein by reference as if set forth in its entirety. This application also claims priority, pursuant to 35 U.S.C. 119, to U.S. Patent Application Ser. No. 60/410,381, filed Sep. 13, 2002, entitled VALUE EXCHANGE PROCESSING SYSTEM AND METHOD, which application is incorporated herein by reference as if set forth in its entirety.

BACKGROUND OF THE INVENTION

1. Field of the Invention

The present invention may be directed generally to a system and method for processing transactions and, more particularly, to a value exchange processing system and method.

2. Description of the Background

Prompt, accurate, and efficient processing of payments may be critical to the success of modern consumer transactions. Sellers, such as merchants, commonly employ known systems and methods to facilitate electronic payments via credit card and debit card, for example, and also employ known systems and methods for payment using cash, check, and other financial instruments.

Promotional systems are a frequent avenue for sellers of products and services to garner new and repeat business. Historically, such systems have been implemented using paper coupons, mail in refunds, and rewards for repeat customers. These coupons, refunds, or rewards, and the overwhelming number of records, data, and correspondence that correspond thereto, are generally handled by the same entity that sells the products, thus necessitating additional man-power and expense for the seller. This additional man-power and expense may be spent outside of the selling process, and thus outside of the core goals of the seller.

Furthermore, the customer who receives the benefits of such promotions is, in the prior art, inconvenienced in order to actually come into possession of the is promotional benefit. Generally, the customer has to physically go to the seller's location, or spend time and money to send items, such as a registration card, to the seller to obtain the corresponding benefits. Even in cases where the benefits may be possessed via telephone, the customer frequently has to deal with being placed repeatedly on hold, or transferred between numerous divisions of the seller, because the promotion may be outside the core business of the seller, and, as such, may be normally a secondary consideration of the seller.

Therefore, the need exists for a promotional system and method that eliminates the need for inconvenience and expense on the part of a consumer to gain the promoted benefit, while also limiting the time and expense spent on the part of the seller outside of the seller's core business.

Gift certificates are regularly used either in addition to, or in place of, physical gifts. The use of a gift certificate may be help consumers avoid the difficulties of additional shopping for gifts, such as for a birthday, holiday, or anniversary. Gift certificate systems have generally been implemented using paper coupons, which coupons may be easily forged or counterfeited, thereby leading to loss on the part of the retailer. These coupons often require, for large retail issuers of gift certificates, an overwhelming number of records, data, and correspondence that correspond to the gift certificate issuance and redemption process. Even the keeping of such complex records often fails to prevent counterfeiting.

Gift certificate issuance and redemption are generally handled by the same entity that sells the products for which the certificate coupons may be redeemed, thus necessitating additional man-power and expense for the seller. This additional man-power and expense may be spent outside of the selling process, and thus outside of the core goals of the seller.

Therefore, the need exists for a gift certificate system and method that eliminates the use of coupons that may be easily counterfeited, which counterfeiting cannot be tracked, while also limiting the time and expense spent on the part of the seller outside of the seller's core business.

With the increasing use of computers by consumers, new forms of non-cash value are available to sellers as promotional tools. For example, many sellers provide reward points, as well as coupons and certificates, in connection with the seller's internet web site. Unfortunately, the accumulation, aggregation, tracking, and redemption of such value by consumers remains cumbersome. Many sellers still require the consumer to print the coupon or certificate and mail it or redeem it at the merchant's retail location. Still other sellers, such as airlines and credit card issuers, provide loyalty points which may be exchanged by the individual consumer, but which are non-negotiable and non-transferable with respect to other sellers and consumers. For example, an airline may offer frequent flyer miles as a promotional value product, and may credit the individual is consumer's individual airline mileage account. However, the credit cannot be applied to goods or services offered by other sellers, and cannot be transferred to other consumers.

Therefore, to simplify use of promotional value, there exists the need for an automated system and method for accumulation, aggregation, tracking, redemption, and exchange of non-cash value products. Additionally, there exists the need to aggregate all value available to an individual consumer from various sellers, whether cash or non-cash in nature, to allow the consumer to select any and all possible combinations of accumulated value to facilitate a particular transaction.

SUMMARY OF THE INVENTION

A remote station for tracking promotion of at least one group of products each of which bears a code that uniquely identifies each product in the group, wherein the remote station may be communicatively coupled to at least one user station is disclosed. The station includes a database resident at the remote station, wherein the database stores ones of the uniquely identifying codes that have been previously received from one or more user stations; a database server, coupled to the database, that compares each new candidate code received from a given user station against the previously received codes stored in the database; wherein the database server credits an account of a user associated with the given user station with a non-zero promotional credit only if such new candidate code received from the given user station was not previously stored in the database; and wherein the database server stores such new candidate code in the database as a previously received code if such new candidate code was not previously stored in the database.

BRIEF DESCRIPTION OF THE SEVERAL VIEWS OF THE DRAWING

Understanding of the present invention will be facilitated by consideration of the following detailed description of the preferred embodiments of the present invention taken in conjunction with the accompanying drawings, in which like numerals refer to like parts, and wherein:

FIG. 2 illustrates additional hardware architecture detail for the system components of the embodiment shown in FIG. 1;

FIGS. 12-23 illustrate screen prints in accordance with one embodiment of the reporting system function of the present invention;

FIGS. 26-33 illustrate screen prints in accordance with one embodiment of the promotional campaign management function of the present invention; and, FIG. 34 illustrates a screen print in accordance with one embodiment of the customer care function of the present invention.

DETAILED DESCRIPTION OF THE INVENTION

Figure 1:
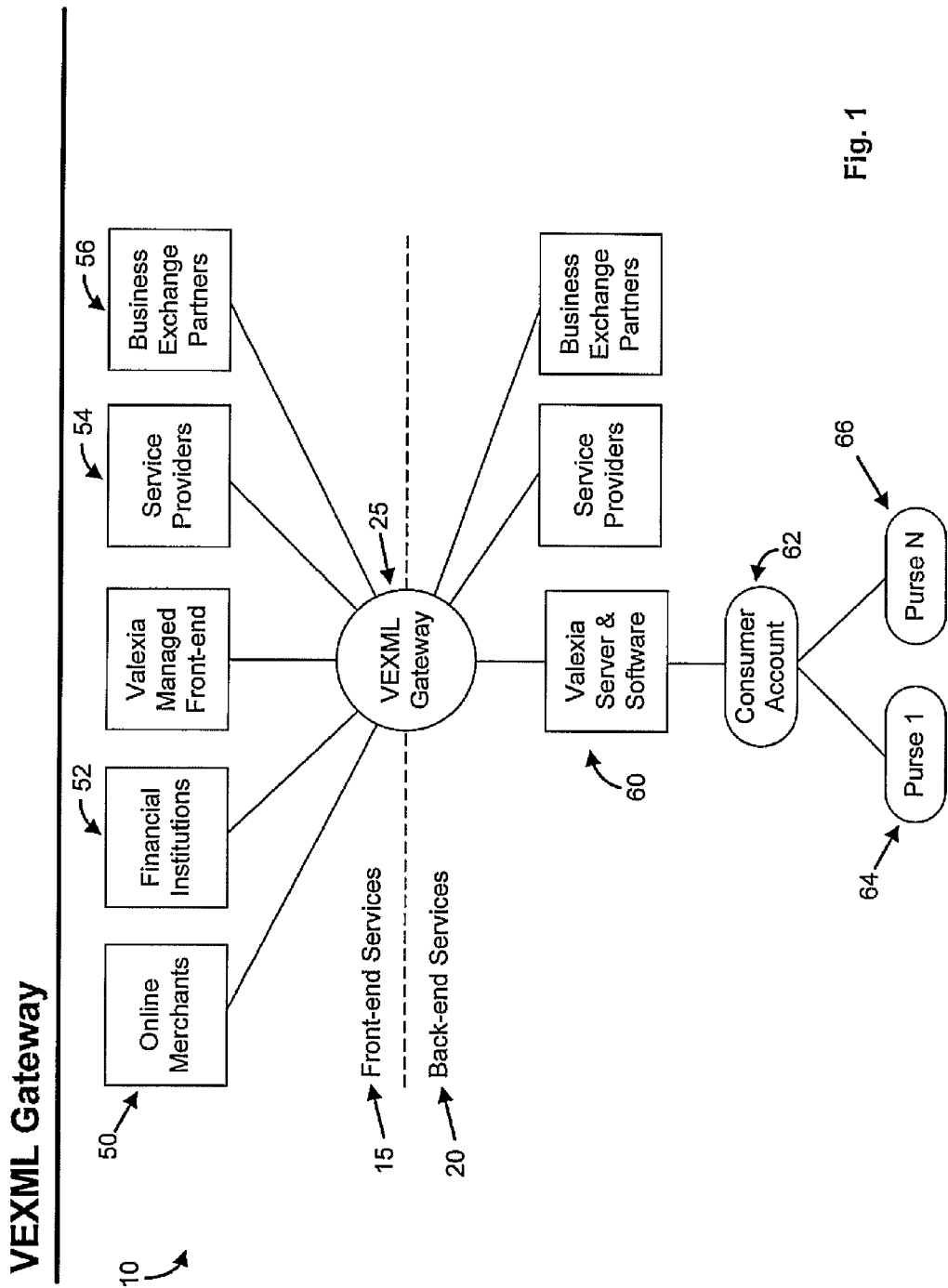
FIG. 1 illustrates the system and components comprising one embodiment of the present invention.

It is to be understood that the figures and descriptions of the present invention have been simplified to illustrate elements that are relevant for a clear understanding of the present invention, while eliminating, for the purpose of clarity, many other elements found in a typical computing-based transaction system. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The system and method of the present invention may provide a highly scaleable payment processing service that may integrate and interact with a seller's web site and transaction processing system, such as to provide account-based services, such as credit card processing, consumer-to-consumer payments, electronic gift certificates, stored value and micropayments, digital coupons, order fulfillment, and subscription services. The system and method of the present invention may enable sellers to offer an innovative range of value creation, accumulation, tracking, aggregation, redemption, transfer, exchange and trading services, using traditional value or currencies as well as web currencies and other promotional non-cash value products. The integrated systems and methods of the present invention may thereby permit sellers, consumers, and consumer account holders to manage on-line and point-of-sale electronic transaction processing and financial settlement using traditional value, promotional non-cash value, and combinations thereof.

Using the present invention, sellers, financial institutions, and commerce service providers may offer customers payment and payment-related transactional services. Unlike traditional payment gateways, the present invention provides account-centric services suitable to tie transactional services to customer accounts. Additionally, the present invention may provide product modules which enhance account relationships with marketing and promotional services.

The present invention may be provided as a subscription or member-based service to provide value exchange services to businesses that do not themselves wish to develop or manage the complexity associated with value-based promotions and transaction processing. The invention described herein may meet the needs of various businesses, including on-line retailers, point-of-sale retailers, financial institutions, and portals. The system and method may be implemented as a hosted solution or as enterprise software. As further described herein, the hosted solution embodiment may provide sellers and businesses with an easy to implement gateway, such as XML-based gateway, for example, to interface to a myriad of payment and payment-related features. The enterprise software embodiment offers robust server-side management of a business's interaction with a consumer.

FIG. 1 illustrates a block diagram according to an aspect of the present invention. As may be seen in FIG. 1, there is shown a transaction processing and tracking system 10. System 10 may include interconnections and access to front-end 15 and back-end 20 services. System 10 may utilize any known communications network, including but not limited to networks using the Internet, intranet, LAN, WAN, or wireless communication. Front-end services 15 may include merchants 50, financial resources 52, service providers 54, and business partners 56. Back-end services 20 may include server and software resources 60 and consumer accounts 62.

Front-end services 15 and back-end services may interface to system 10 using any communication protocol, including but not limited to Value Exchange Markup Language API, Java RMI API, PERL API, or any like language that may be apparent to those possessing an ordinary skill in the pertinent arts, for example. Consumer accounts may include a number of defined purses shown as purse 1 64 and purse N 66. Each of front-end services 15 and back-end services 20 may be interconnected by a gateway 25. Gateway 25, as may be apparent to those possessing an ordinary skill in the pertinent arts, may include both hardware and software.

Figure 3:
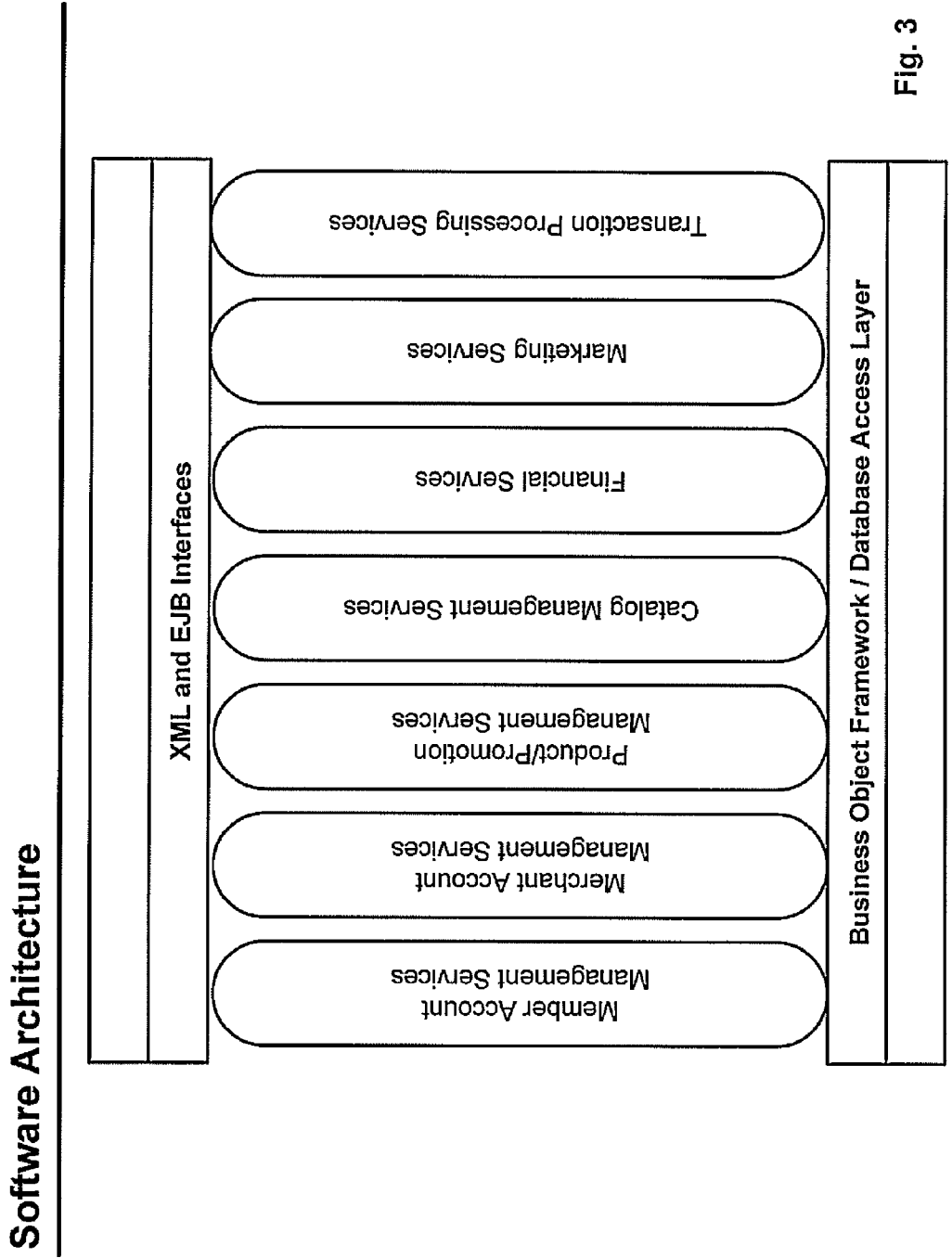
FIG. 3 illustrates software architecture in accordance with one embodiment of the present invention.

Referring now also to FIGS. 2 and 3, further aspects of gateway 25 are shown. In FIG. 2, there is shown an exemplary system architecture that may be employed to create system 10. Transactions within system may be controlled and monitored by gateway 25 and server and software resources 60. Transactions may include value based transactions such as sales or purchase. Transactions may also include shipping of inventory or other type of transaction. Also as shown in FIG. 2, an exemplary embodiment of a system 10 in accordance with the present invention may include security and firewalling, such as a cascaded firewall and sun servers, culminating with a dual clustered Sun Enterprises Server running software for land sharing and failover.

As may be seen in FIG. 3, there is shown exemplary software architecture that may be employed to create system 10. The software of the present invention may provide back-end services including, for example, client management; member account management; merchant account management; purse (product and promotion) management; on-line transaction processing and messaging; payment authorization (credit card, ACH, E-check); financial system, settlement system, and general ledger; and customer care, by way of non-limiting example only. The software and application of the present invention, in addition to authorizing the consumer/member payment, may provide for total financial processing, from capture of the data to clearing and settlement, and processing for a client's general ledger system. A financial transaction log may be included and may provide information to databases on each and every transaction, or selected transactions, and transactions may be summarized and passed to a financial system, such as an Oracle financial system, which settles or awaits the financials and funds appropriate parties. The system may include modules for financial and accounting services, such as transaction processing suitable for managing live financial and non-financial transactions for clients, merchants and members, financials suitable for performing client settlement and funding, data warehousing suitable for dimensioning and processing data and for supporting the processing and reporting of financial transactions, transaction logging suitable for logging financial and non-financial transaction processed by the system, and financial transaction logging suitable for integrating with financials and for automating and enhancing the management of financial transactions.

System may be configured to process 120 transactions per second ("TPS"), with an average response time of less than one second as measured from the interface to the application tier. Each interconnection may be rated for 400 TPS (24,000 TPM; 1,440,000 TPH; 34 million TPD), and additional interconnections may be added as required.

Figure 4A:
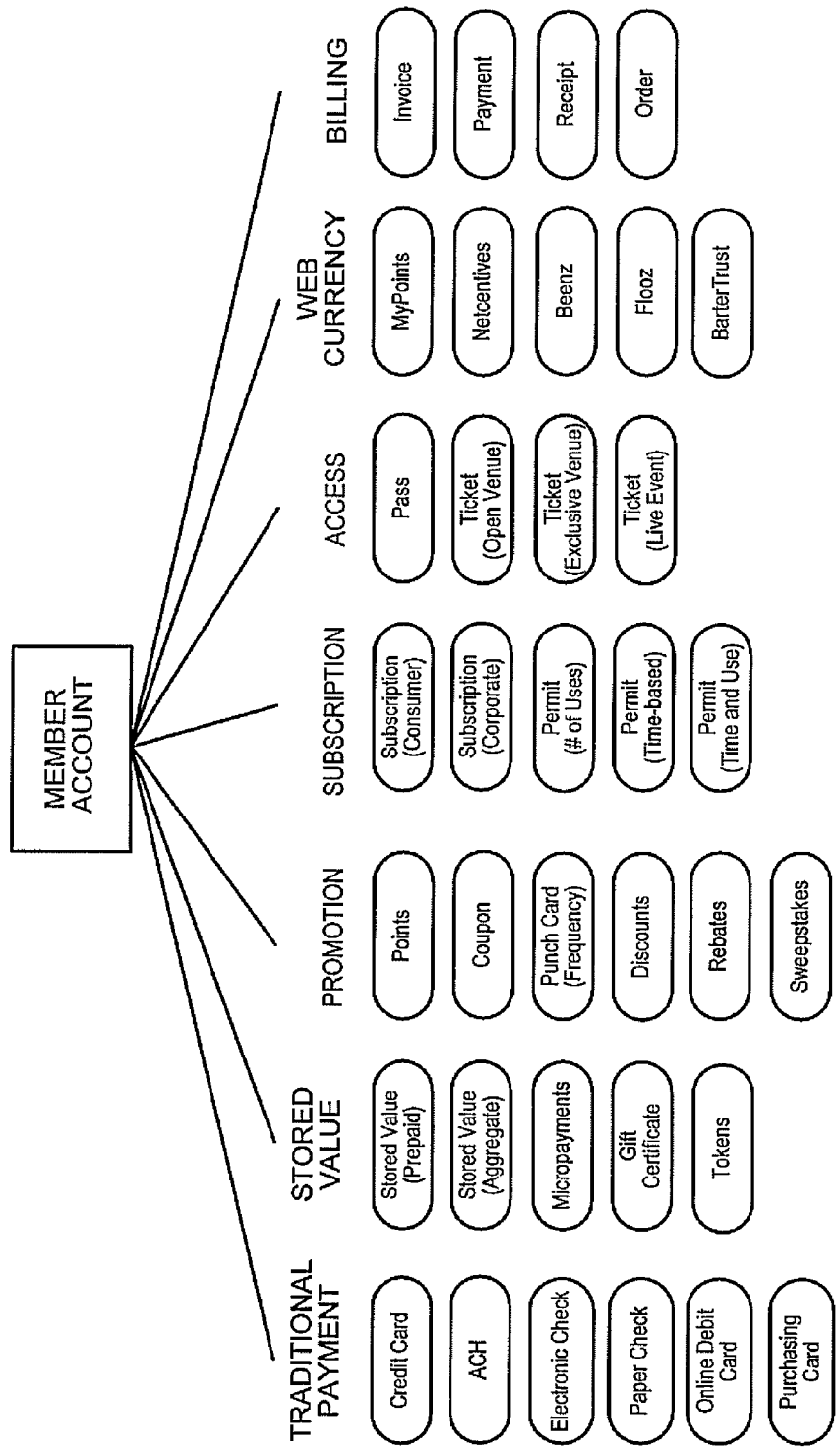
FIG. 4A illustrates the types of value creation and redemption products available to members in accordance with one embodiment of the present invention.

Referring now to FIG. 4A, there is shown a hierarchy of value creation and redemption mechanisms. Value creation and redemption may include payment or currency, stored values, promotion, subscription, access, substituted currency, and/or billing. Value creation and redemption products may provide consumer account issuers with the ability to create and issue or install value products on a member's or individual's account. Value products may be tracked as financial products in the system and method of the present invention. The tracking and crediting/purchasing may be tracked based on groups of products, or individual products. Tracking and crediting/purchasing may also be performed on any subset of the system, or on the system as a whole. Businesses, including warehouses, wholesalers, retailers, and consumers tracking and crediting/purchasing may be tracked. While any one or more of the mechanisms depicted in FIG. 4A may be described, for the sake of clarity, a promotional system and a gift certificate system will be described as representative examples. This promotional system and gift certificate system are representative of the other systems and therefore each of the other types will not be described in detail.

Figure 4B:
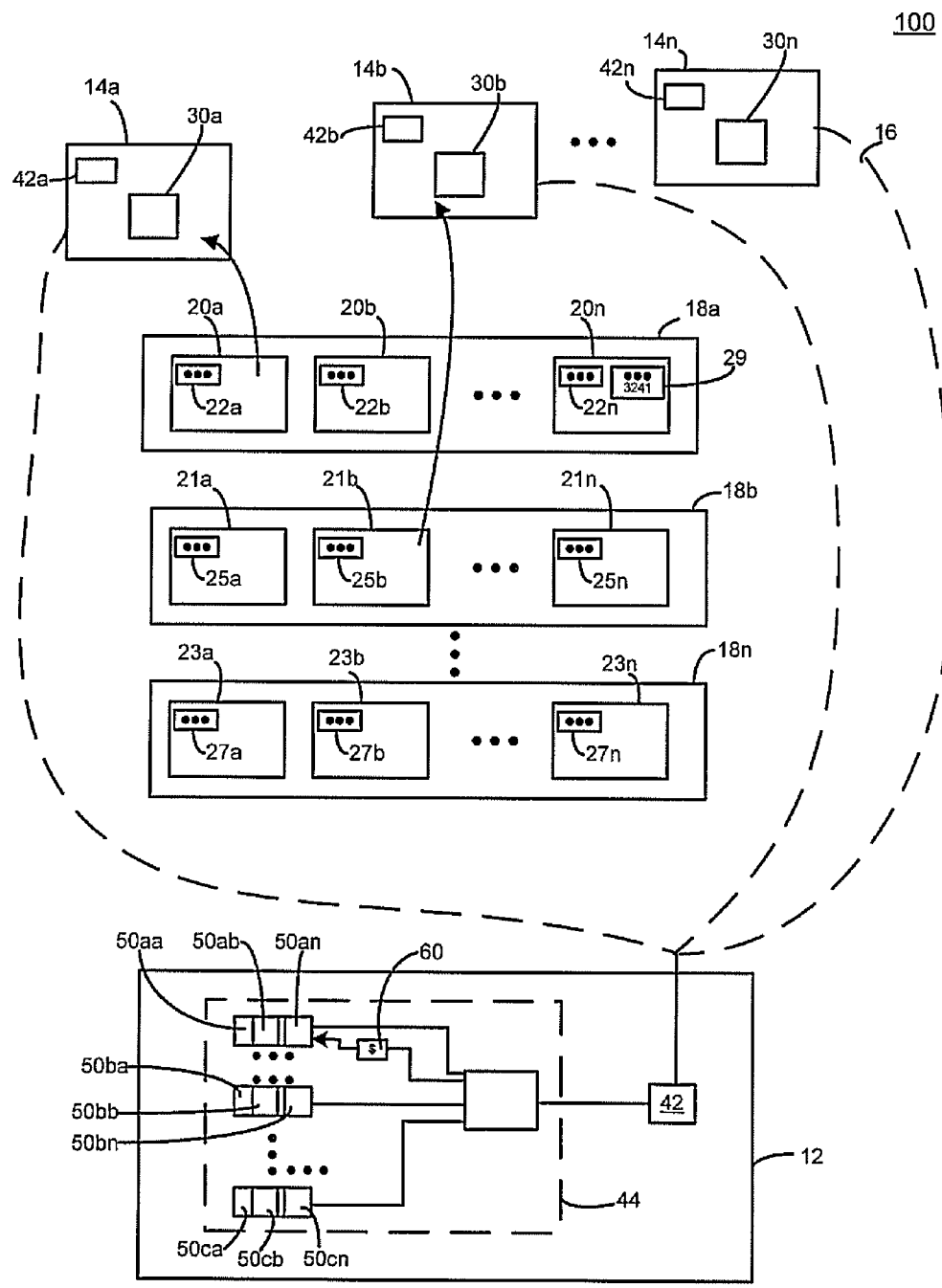
FIG. 4B illustrates a block diagram of a promotional system.

FIG. 4B is a block diagram illustrating an exemplary promotional system 100. The promotional system 100 may include a remote station 120, a user station 14 communicatively connected 16 to the remote station 12, and a product group 18a, wherein each product 20a, 20b . . . 20n in the group bears a unique code 22a, 22b . . . 22n.

The product group 18a may be a group of products 20a, 20b . . . 20n sold in a retail environment, such as a type of cola, for example. Each product in the group 18a may be substantially identical. The product group 18a may be provided to one or more retail outlets by a seller or manufacturer, such as Coke®, for the above cola example. Each retail outlet which sells the products 20a, 20b . . . 20n to users 30a, 30b . . . 30n may be a virtual outlet that sells products using the internet, telephone, or mail, or a physical outlet that sells products in a physical store environment.

Each product 20a, 20b . . . 20n in the group 18a may have a corresponding unique code 22a, 22b . . . 22n placed thereon. The codes 22a, 22b . . . 22n may be affixed to the corresponding product by the manufacturer or seller of the product, or by the retailer of the product. The codes 22a, 22b . . . 22n may be numeric, alphabetic, or alpha-numeric. Each code 22a, 22b . . . 22n may be, for example, a SPIF code or a bar-coded value, and may be printed on the corresponding product 20a, 20b . . . 20n using methods known in the art, or placed under a peel-off cover, which, when peeled, reveals the codes 22a, 22b . . . 22n. Each unique code 22a, 22b . . . 22n may be different and separate from any UPC code affixed to the product 18a. For purposes of the present invention, each code 22a, 22b . . . 22n may be considered a "new candidate code" before it may be accepted by the database server 40 at the remote station 12, as described more fully hereinbelow. As used herein, a new candidate code may be, for example, a unique inventory item code.

The system of the present invention may further track unique codes associated with further product groups 18b . . . 18n. Each further product group 18b . . . 18n may correspond to an identical group of products, such as soda, software, or toys, or services, such as airline tickets, entertainment tickets, or food service, sold or marketed by a particular manufacturer or distributor in a geographic area. It will be understood by those skilled in the art that each product group may be defined to meet the requirements set by each product manufacturer or distributor using the system.

The product group 18b may be a group of products 21a, 21b . . . 21n sold in a retail environment. Each product in the group 18b may be substantially identical. The product group 18a may be provided to at least one retail outlet by a seller or manufacturer. Each retail outlet which sells the products 21a, 21b . . . 21n to users 30a, 30b . . . 30n may be a virtual outlet that sells products using the internet, telephone, or mail, or a physical outlet that sells products in a physical store environment.

Each product 21a, 21b . . . 21n in the group 18b may have a corresponding unique code 25a, 25b . . . 25n placed thereon. The codes 25a, 25b . . . 25n may be affixed to the corresponding product by the manufacturer or seller of the product, or by the retailer of the product. The codes 25a, 25b . . . 25n may be magnetic, numeric, alphabetic, or alpha-numeric. Each code 25a, 25b . . . 25n may be, for example, a SPIF code or a bar-coded value, and may be printed on the corresponding product 21a, 21b . . . 21n using methods known in the art, or placed under a peel-off cover, which, when peeled, reveals the codes 25a, 25b . . . 25n. Each unique code 25a, 25b . . . 25n may be different and separate from any UPC code affixed to the product 18b. For purposes of the present invention, each code 25a, 25b . . . 25n may be considered a "new candidate code" before it may be accepted by the database server 40 at the remote station 12, as described more fully hereinbelow.

The product group 18n may be the last in a series of product groups starting with group 18a. The product group 18n may be a group of products 23*a*, 23*b* . . . 23*n* sold in a retail environment. Each product in the group 18*n* may be substantially identical. The product group 18*n* may be provided to one or more retail outlets by a seller or manufacturer. Each retail outlet which sells the products 23*a*, 23*b* . . . 23*n* to users 30*a*, 30*b* . . . 30*n* may be a virtual outlet that sells products using the internet, telephone, or mail, or a physical outlet that sells products in a physical store environment.

Each product 23*a*, 23*b* . . . 23*n* in the group 18*n* may have a corresponding unique code 27*a*, 27*b* . . . 27*n* placed thereon. The codes 27*a*, 27*b* . . . 27*n* may be affixed to the corresponding product by the manufacturer or seller of the product, or by the retailer of the product. The codes 27*a*, 27*b* . . . 27*n* may be magnetic, numeric, alphabetic, or alpha-numeric. Each code 27*a*, 27*b* . . . 27*n* may be, for example, a SPIF code or a bar-coded value, and may be printed on the corresponding product 23*a*, 23*b* . . . 23*n* using methods known in the art, or placed under a peel-off cover, which, when peeled, reveals the codes 27*a*, 27*b* . . . 27*n*. Each unique code 27*a*, 27*b* . . . 27*n* may be different and separate from any UPC code affixed to the product 18*n*. For purposes of the present invention, each code 27*a*, 27*b* . . . 27*n* may be considered a "new candidate code" before it may be accepted by the database server 40 at the remote station 12, as described more fully hereinbelow.

The user station 14*a*, 14*b* . . . 14*n* may be a communication device at the geographical location of the user 30*a*, 30*b* . . . 30*n*. The user station 14 may be, for example, a telephone, a personal digital assistant, a personal computer, or a network server computer, for example. After purchase of a product 20, 21, 23 user 30 may then use user station 14 to send the new candidate code 22, 25, 27 associated with the product 20, 21, 23 to the remote station 12 through a communicative connection 16, as discussed hereinbelow. The new candidate code 22, 25, 27 may be read or entered into the user station 14 by a code reader 42 at the user station. The code reader 42 may be, for example, a bar code reader, as may be known in the art. The new candidate code 22, 25, 27 may, alternatively, be typed into the user station 14 by the user 30. In an embodiment wherein the new candidate code 22, 25, 27 may be typed in by the user 30, the new candidate code 22, 25, 27 may be typed into a computer interface program 42, such as an internet browser interface, present on the user station 14. For ease of interface, an internet interface may be resident on the remote station 12 in the embodiment wherein an internet browser may be resident on the user station 14. Alternatively, the new candidate code 22, 25, 27 may be scanned or entered at a checkout counter in a retail outlet along with the bar code scan presently known in the art. The new candidate code may be associated with the user 30 by, for example, a frequent customer card, and the identity of the user 30 along with code 22, 25, 27 may be sent to remote station 12.

The remote station 12 may be communicatively coupled 16 to the user station 14. This communicative coupling 16 may be, for example, via telephone or via internet. The remote station 12 may be used to track promotions of the at least one group 18 of products. The remote station 12 may include a database 44 and a database server 40. The database 44 may be resident at the remote station 12, and, in one embodiment, may be resident on a network at the remote station 12. The database 44 may store one of the uniquely identifying codes 22, 25, 27 upon receipt from user stations 14. Once a code 22, 25, 27 may be stored in the database 44, it may be a previously received code.

The database server 42 may be coupled to the database 44. The coupling may be generally a communicative electrical connection, such as those known in the art. The database server 42 may compare each new candidate code 22, 25, 27 received from a given user station 14 against the previously received codes stored in the database 44. The system may maintain a separate account for each user, and each product, and each combination thereof. For example, account 50*aa* may be preferably associated with user 30*a* and product 18*b*, while accounting 50*ab* may be associated with user 30*a* and product 18*b*, and so on. The database server 42 may credit the account 50*aa*, 50*ab*, 50*ac* . . . 50*an*, 50*ba*, 50*bb*, 50*bc* . . . 50*nn* of a user 30 associated with the given user station 14 with a non-zero promotional credit only if the new candidate code 22, 25, 27 received from the given user station 14 was not a previously stored code. The present invention may thus prevent fraud by preventing the crediting of a user 30 for consumption of a previously consumed product 20, 21, 23. The database server 42 may then store the new candidate code 22, 25, 27 in the database 44 as a previously received code if the new candidate code 22, 25, 27 was not previously stored in the database 44. In an embodiment, the database 44 may further include at least one permissible new candidate code. The permissible new candidate codes may be provided by a provider of the products 20, 21, 23 in the group 18, such as the manufacturer, seller, or retailer, and generally encompass the codes 22, 25, 27 for all products 20, 21, 23 in the group 18. The database server 42 may compare each new candidate code 22, 25, 27 against the at least one permissible new candidate code, and the non-zero promotional credit may not be credited if the new candidate code 22, 25, 27 doesn't match one of the permissible new candidate codes. This may serve as an additional fraud protection mechanism. Further, the present invention may include a codification scheme for the candidate codes that only the remote station may be capable of decoding. Consequently, in an embodiment, fraud may also be detectable due to the use of an improper encoding structure by a user station. Such encoding and decoding structures are known in the art.

In an embodiment, upon receipt of a new candidate code 22, 25, 27 and approval of the new candidate code 22, 25, 27 as a permissible candidate code and as a previously received code, the database server 42 may store the code 22, 25, 27 to the database 44 as a consumed code. Once the code 22, 25, 27 becomes a consumed code, it may not be accepted as a previously received code from a subsequent user 30*a*, and may not be used to credit the account of the subsequent user 30*a*. This consumption may be performed by the present invention for products which are capable only of a finite use, such as the cola in the above example.

Also in an embodiment, there are at least two groups 18*a*, 18*b* . . . 18*n* of products 20, 21, 23 and each group 18*a*, 18*b* . . . 18*n* may be provided by a different provider. In this embodiment, the database server 42 may maintain separate previously received codes and separate permissible new candidate codes for each provider, and for each different product 20, 21, 23 from the same provider. Further, the database server 42 may include one account 50*ab* associated with each user 30*a* to correspond to at least one product group 18*a*, and to only one product 22*a*, and the non-zero promotional credit may be credited to that account 50. In an embodiment, each product 22*a* may be associated with only one provider.

The non-zero promotional credits may accumulate in the unique user account 50 based on the product or products from a particular provider consumed by that user 30. In an embodiment, a credit certificate 60 may be issued to the user account 50 once a pre set value of non-zero promotional credits may be accumulated in the user account 50. This credit certificate 60 may be used, for example, as a coupon, rebate, or refund by the user, depending on the particular program entertained by the provider. For example, when a sufficient accumulation of non-zero credits may be accumulated in a user account 50, that user 30 may be notified, for example, by email or telephone, or the provider from whom the consumption has occurred may be notified, that the user 30 has reached a threshold. At that point, dependent upon to whom notification was sent, either the user 30 may request that the provider provide, or the provider may automatically provide, a certificate 60. The certificate 60 may be a gift certificate, partial refund, or coupon for future use, for example.

Figure 4C:
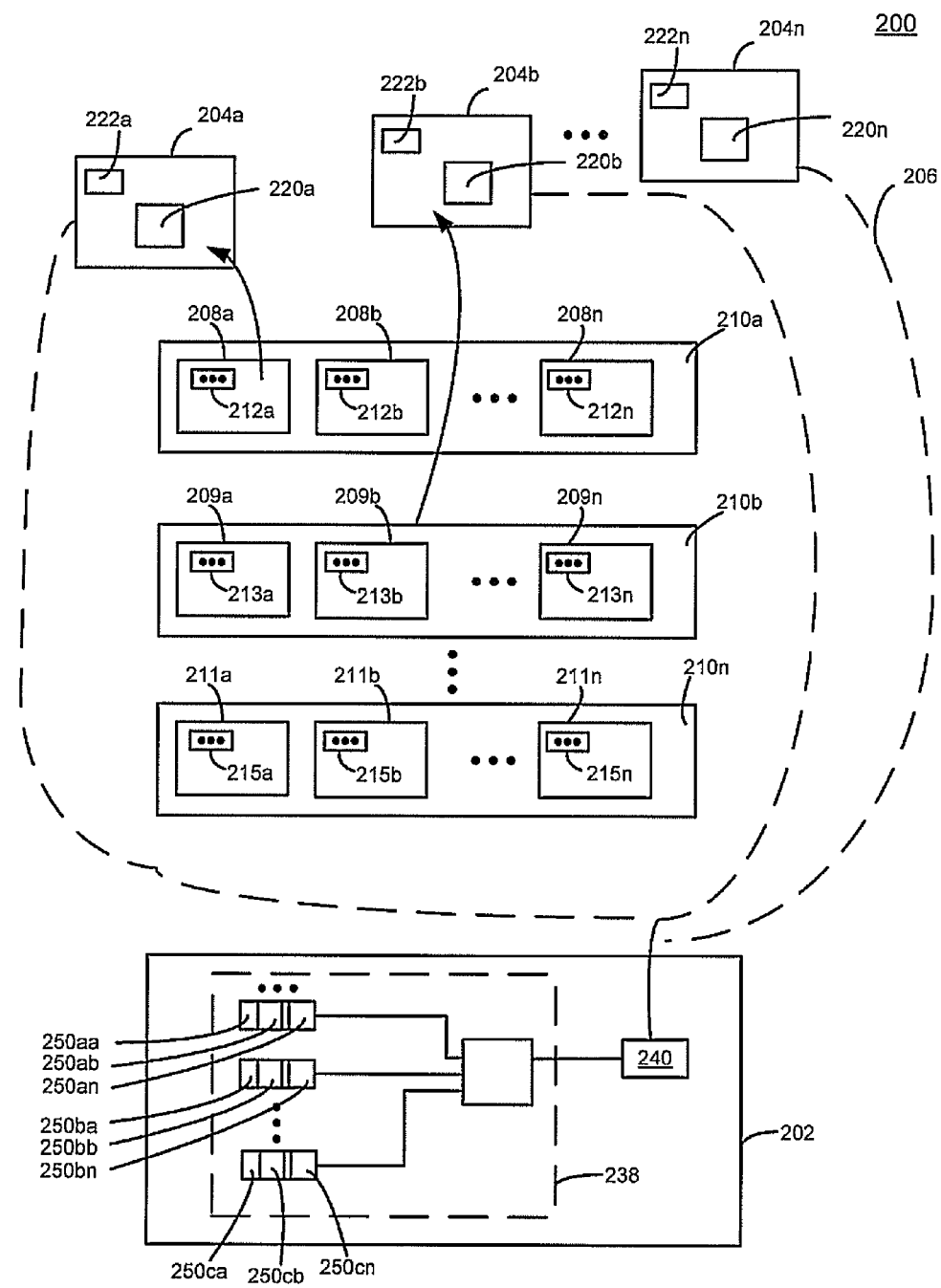
FIG. 4C illustrates a block diagram of a gift certificate system.

FIG. 4C is a block diagram illustrating a gift certificate system 200. The gift certificate system 200 may include a remote station 202, a user station 204a, 204b ... 204n communicatively connected 206 to the remote station 202, and at least one gift certificate 208a selected from at least one group 210a of gift certificates, wherein each gift certificate 208a in the group 210a bears a unique code 212a. The group of gift certificates 210a may be that group which may be issued by a particular provider. For example, group 210a may include all gift certificates issued by a particular restaurant, a particular department store, a particular golf course, or a particular specialty store.

The gift certificate group 210a may be preferably available for future purchase of at least one group of products sold in a retail environment. The gift certificate 208a, 208b ... 208n may be purchased by a third party from the group 210a of coded gift certificates held by the provider, which third party may give the gift certificate 208a, 208b ... 208n to the purchaser. The purchaser may use the gift certificate 208a, 208b ... 208n to make a purchase in a retail environment. The retail environment may be actual or virtual, as discussed hereinabove with respect to FIG. 1. The retailer may be then a user 220a, 220b ... 220n who, through a user station 204a, 204b ... 204n at the retail environment, enters in the gift certificate code 212a corresponding to the gift certificate 208a, for example, for sending to the remote station 202. The provider and the retailer need not be the same entity in the present invention. Further, as used herein, all gift certificates may be held by the provider on an electronic server, and may be delivered to or received by the third party or the purchaser in an electronic format only.

Each gift certificate 208a, 208b ... 208n in the group 210a has a corresponding unique code 212a, 212b ... 212n affixed thereon. The code 212a, 212b ... 212n may be placed by the maker or seller of the certificate, or by the provider of the gift certificate 208a, 208b ... 208n. The code 212a, 212b ... 212n may be numeric, alphabetic, or alpha-numeric. The code 212a, 212b ... 212n may be, for example, a SPIF code or a bar code, and may be printed on the gift certificate 208a, 208b ... 208n or attached to the gift certificate 208a, 208b ... 208n using methods known in the art. Each code 212a, 212b ... 212n may be a "new candidate code" 212a, 212b ... 212n before it may be accepted by the database server 240 at the remote station 202, as described more fully hereinbelow.

The system of the present invention may track unique codes associated with gift certificate groups 210b ... 210n. Each product group 210b ... 210n corresponds to an identical group of gift certificates sold or marketed by a particular provider in a geographic area.

The gift certificate group 210b may be available for future purchase of at least one group of products sold in a retail environment. The gift certificate 209a, 209b ... 209n may be purchased by a third party from the group 210b of coded gift certificates held by the provider, which third party then gives the gift certificate 209a, 209b ... 209n to the purchaser. The purchaser then uses the gift certificate 209a, 209b ... 209n to make a purchase in a retail environment. The retail environment may be actual or virtual, as discussed hereinabove with respect to FIG. 1. The retailer may be then a user 220a, 220b ... 220n who, through a user station 204a, 204b ... 204n at the retail environment, enters in the gift certificate code 213a corresponding to the gift certificate 209a, for example, for sending to the remote station 202.

Each gift certificate 209a, 209b ... 209n in the group 210b has a corresponding unique code 213a, 213b ... 213n affixed thereon. The code 213a, 213b ... 213n may be placed by the maker or seller of the certificate, or by the provider of the gift certificate 209a, 209b ... 209n. The code 213a, 213b ... 213n may be numeric, alphabetic, or alpha-numeric. The code 213a, 213b ... 213n may be, for example, a SPIF code or a bar code, and may be printed on the gift certificate 209a, 209b ... 209n or attached to the gift certificate 209a, 209b ... 209n using methods known in the art. Each code 213a, 213b ... 213n may be a new candidate code 213a, 213b ... 213n before it may be accepted by the database server 240 at the remote station 202, as described more fully hereinbelow.

The gift certificate group 210n may be the last in a series of gift certificate groups starting with group 210a. The gift certificate group 210n may be available for future purchase of at least one group of products sold in a retail environment. The gift certificate 211a, 211b ... 211n may be purchased by a third party from the group 210n of coded gift certificates held by a provider, which third party then gives the gift certificate 211a, 211b ... 211n to the purchaser. The purchaser may then use the gift certificate 211a, 211b ... 211n to make a purchase in a retail environment. The retail environment may be actual or virtual, as discussed hereinabove with respect to FIG. 1. The retailer may be then a user 220a, 220b ... 220n who, through a user station 204a, 204b ... 204n at the retail environment, enters in the gift certificate code 215a corresponding to the gift certificate 211a, for example, for sending to the remote station 202.

Each gift certificate 211a, 211b ... 211n in the group 210n has a corresponding unique code 215a, 215b ... 215n affixed thereon. The code 215a, 215b ... 215n may be placed by the maker or seller of the certificate, or by the provider of the gift certificate 211a, 211b ... 211n. The code 215a, 215b ... 215n may be numeric, alphabetic, or alpha-numeric. The code 215a, 215b ... 215n may be, for example, a SPIF code, and may be printed on the gift certificate 211a, 211b ... 211n or attached to the gift certificate 211a, 211b ... 211n using methods known in the art. Each code 215a, 215b ... 215n may be a new candidate code 215a, 215b ... 215n before it may be accepted by the database server 240 at the remote station 202, as described more fully hereinbelow.

The user station 204a, 204b ... 204n may be a communication device at the geographical location of the user 220a, 220b ... 220n, which may be the retailer. The user station 204a, 204b ... 204n may be, for example, a telephone, a personal computer, or a network server computer. After use of the gift certificate to make a purchase, user 220a, 220b ... 220n may then use his user station 204a, 204b ... 204n to send the new candidate code 212a, 212b ... 212n, 213a, 213b ... 213n, 215a, 215b ... 215n to the remote station 202 through a communicative connection 206, as discussed hereinbelow. The new candidate code 212a, 212b ... 212n, 213a, 213b ... 213n, 215a, 215b ... 215n may be read into the user station 204a, 204b ... 204n by a code reader 222 at the user station 204a, 204b ... 204n. The code reader 222 may be, for example, a bar code reader as may be known in the art. The new candidate code 212a, 212b ... 212n, 213a, 213b ... 213n, 215a, 215b ... 215n may, alternatively, be typed into the user station 204a, 204b ... 204n by the user 220a, 220b ... 220n. In an embodiment wherein the new candidate code 212a, 212b . . . 212n, 213a, 213b . . . 213n, 215a, 215b . . . 215n may be typed in by the user 220a, 220b . . . 220n, the new candidate code 212a, 212b . . . 212n, 213a, 213b . . . 213n, 215a, 215b . . . 215n may be typed into a computer interface program 222, such as an internet browser interface, present on the user station 204a, 204b . . . 204n. For ease of interface, an internet interface may also be resident on the remote station 202 in the embodiment wherein an internet browser may be resident on the user station 204a, 204b . . . 204n.

The remote station 202 may be communicatively coupled 206 to the user station 204a, 204b . . . 204n. This communicative coupling 206 may be, for example, via telephone or via internet. The remote station 202 may be used to track the use for purchase of at least one of the group 210a, 210b . . . 210n of gift certificates 208a, 208b . . . 208n. The remote station 202 may include a database 238 and a database server 240. The database 238 may be resident at the remote station 202, and, in one embodiment, may be resident on a network at the remote station 202. The database 238 may store one of the gift certificate codes 212a, 212b . . . 212n, 213a, 213b . . . 213n, 215a, 215b . . . 215n upon receipt from one of the user stations 204a, 204b . . . 204n. Once a code 212a, 212b . . . 212n, 213a, 213b . . . 213n, 215a, 215b . . . 215n may be stored in the database 238, it may be a previously received code.

The database server 240 may be coupled to the database 238. The coupling may be generally a communicative electrical connection, such as those known in the art. The database server 240 may compare each new candidate code 212a, 212b . . . 212n, 213a, 213b . . . 213n, 215a, 215b . . . 215n received from a given user station 204a, 204b . . . 204n against the previously received codes stored in the database 238. The database server 240 may then credit an account 250aa, 250ab . . . 250an, 250ba, 250bb . . . 250bn of a user 220a, 220b . . . 220n associated with the given user station 204a, 204b . . . 204n with a non-zero gift certificate credit only if the new candidate code 212a, 212b . . . 212n, 213a, 213b . . . 213n, 215a, 215b . . . 215n received from the given user station 204a, 204b . . . 204n was not a previously stored code. The database server 240 may then store the new candidate code 212a, 212b . . . 212n, 213a, 213b . . . 213n, 215a, 215b . . . 215n in the database 238 as a previously received code if the new candidate code 212a, 212b . . . 212n, 213a, 213b . . . 213n, 215a, 215b . . . 215n was not previously stored in the database 238. In an embodiment, the database 238 may include at least one permissible new candidate code. The permissible new candidate codes may be provided by, for example, the provider or retailer, and generally encompass the codes 212a, 212b . . . 212n, 213a, 213b . . . 213n, 215a, 215b . . . 215n for all gift certificates 208a, 208b . . . 208n in the group 210a, 210b . . . 210n. The database server 240 may compare each new candidate code 212a, 212b . . . 212n, 213a, 213b . . . 213n, 215a, 215b . . . 215n against the at least one permissible new candidate code, and the non-zero gift certificate credit may be not credited if the new candidate code 212a, 212b . . . 212n, 213a, 213b . . . 213n, 215a, 215b . . . 215n doesn't match one of the permissible new candidate codes.

In an embodiment of the present invention, upon receipt of a new candidate code 212a, 212b . . . 212n, 213a, 213b . . . 213n, 215a, 215b . . . 215n and approval of the new candidate code 212a, 212b . . . 212n, 213a, 213b . . . 213n, 215a, 215b . . . 215n as a permissible candidate code and as a previously received code, the database server 240 may store the code 212a, 212b . . . 212n, 213a, 213b . . . 213n, 215a, 215b . . . 215n to the database 238 as a consumed code. Once the code becomes a consumed code, it may not be accepted as a previously received code from a subsequent user, and may not be used to credit the account 250ca of the subsequent user. This consumption may be performed by the present invention for gift certificates because gift certificates are inherently capable only of a finite use.

Also in an embodiment, there are at least two groups 210a, 210b . . . 210n of gift certificates 208a, 208b . . . 208n, and each group 210a, 210b . . . 210n may be provided by a different provider. In this embodiment, the database server 240 may maintain separate previously received codes and separate permissible new candidate codes for each provider, and for each different group 210a, 210b . . . 210n from the same provider. Further, the database server 240 may include one account 250ab associated with each user 220a to correspond to at least one gift certificate group 210b, and, preferably, to only one gift certificate 208a, and the non-zero gift certificate credit may be credited to that account 250ab. Preferably, the system may maintain a separate account for each user, and each gift certificate, and each combination thereof. For example, account 250aa may be preferably associated with user 220aa and gift certificate group 210a, while account 250ab may be associated with user 220a and group 210b, and so on. In an embodiment, each gift certificate 208 may be associated with only one provider.

The non-zero gift certificate credits may accumulate in the unique user account 250, and represent a value equivalent to the purchase value by the third party from the provider. In an embodiment, a credit certificate may be issued to the user account 250 once a preset value of non-zero gift certificate credits may be accumulated in the user account 250. This credit certificate may be redeemed, for example, in exchange for cash value or as a credit toward future services. The credit certificate may be paid, in an embodiment, by the remote station 202. The remote station 202 may then obtain reimbursement, by methods known in the art, from the provider based on the payment received by the provider from the third party.

Figure 5A:
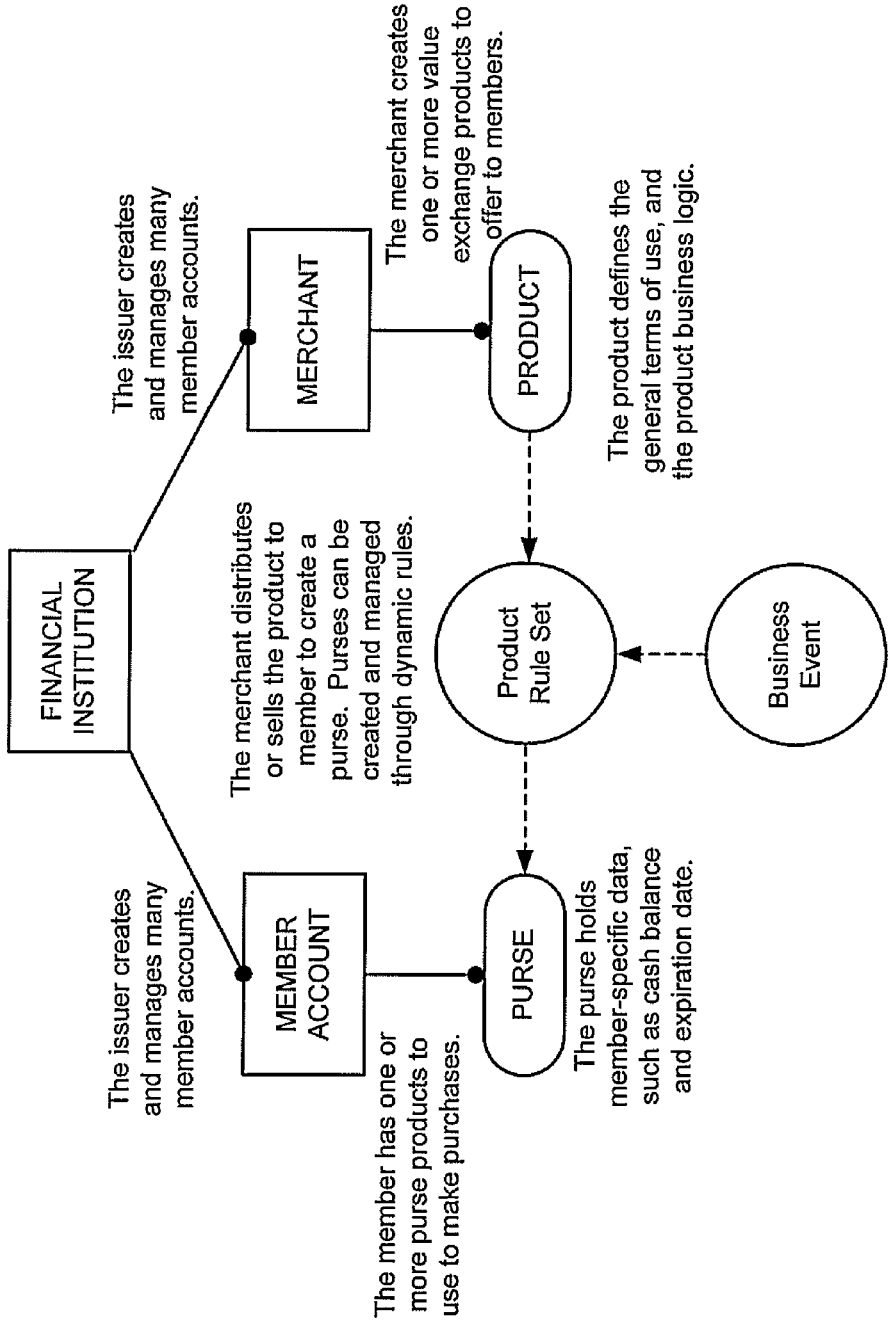
FIG. 5A illustrates product and purse relationships in accordance with one embodiment of the present invention.

Referring now to FIG. 5A, there is shown product and purse relationships according to an aspect of the present invention. A purchase and associated value exchange may initiate value exchange according to an aspect of the present invention. As described hereinabove, particularly with respect to the promotional and gift certificate systems set forth, the purses, such as user account 50 and user account 250, for example, of entity within system 10 may be accessed, debited, and credited by resources within or associated with system 10, such as remote station 202. A consumer request may be processed to identify the available value sources or purses, as well as the preferred order of preferences for those purses. If no order preference is selected by the consumer, then a default set of preferences may be used. A default set of preferences may include preferences pre-selected by the consumer account issuer. Processing may occur to determine the merchant or purses available to fill the purchase request and analyzed for compatibility such as payment options for example.

The present invention may provide for the exchange of value from one purse type to another purse type, as discussed hereinabove. Such value exchange functions may be programmatic, or may be dynamic via a rules-based system. By way of non-limiting example, the rules used in the present invention may allow consumers to convert value exchange products from one form to another, such as cash to reward points, coupon to cash, points to cash, or cash to subscription (such as magazine subscriptions), for example. Additionally, the present invention may provide for transfer of value products from one member's account to another member's account, and further may enable enrollment of non-members that have been sent a value product (i.e. cash, coupon, gift certificates, and the like). The invention may provide consumers with the ability to send money, receive money, refer other consumers for membership, access account information and payment services from various access devices, including Web browsers and wireless access devices such as personal digital assistants and cell phones, and spend cash value directly from the user account at any location which accepts payment from the consumer's account issuer (such as VISA® or MasterCard®).

In an embodiment of the present invention, the invention may provide member account management services, including account creation, updates, and reporting, as well as real-time access to member accounts. Members may access and review on-line account statements—including all transaction activity for all product/purse types. Additionally, members may set up multiple child accounts under one parent account—the parent account controlling the funding of child accounts.

In an embodiment of the present invention, the invention may support multiple value purses per individual account. Each purse may support a type of value exchange, such as electronic cash, micro-payments, loyalty points, or electronic coupons. Multiple purses of the same product type may be managed on an individual account (i.e., multiple gift certificates, dozens of coupons, several cash purses, etc.). Purse value may be reloaded through another purse (i.e., cash, coupon, gift certificate) or through traditional payment transactions such as credit card. The flow and interaction of value processing as described hereinabove will be described hereinbelow using two exemplary embodiments, from which it will be apparent to those of ordinary skill in the art that other embodiments may be similarly employed. In particular, promotion tracking and gift certificate tracking will be described hereinbelow.

Figure 5B:
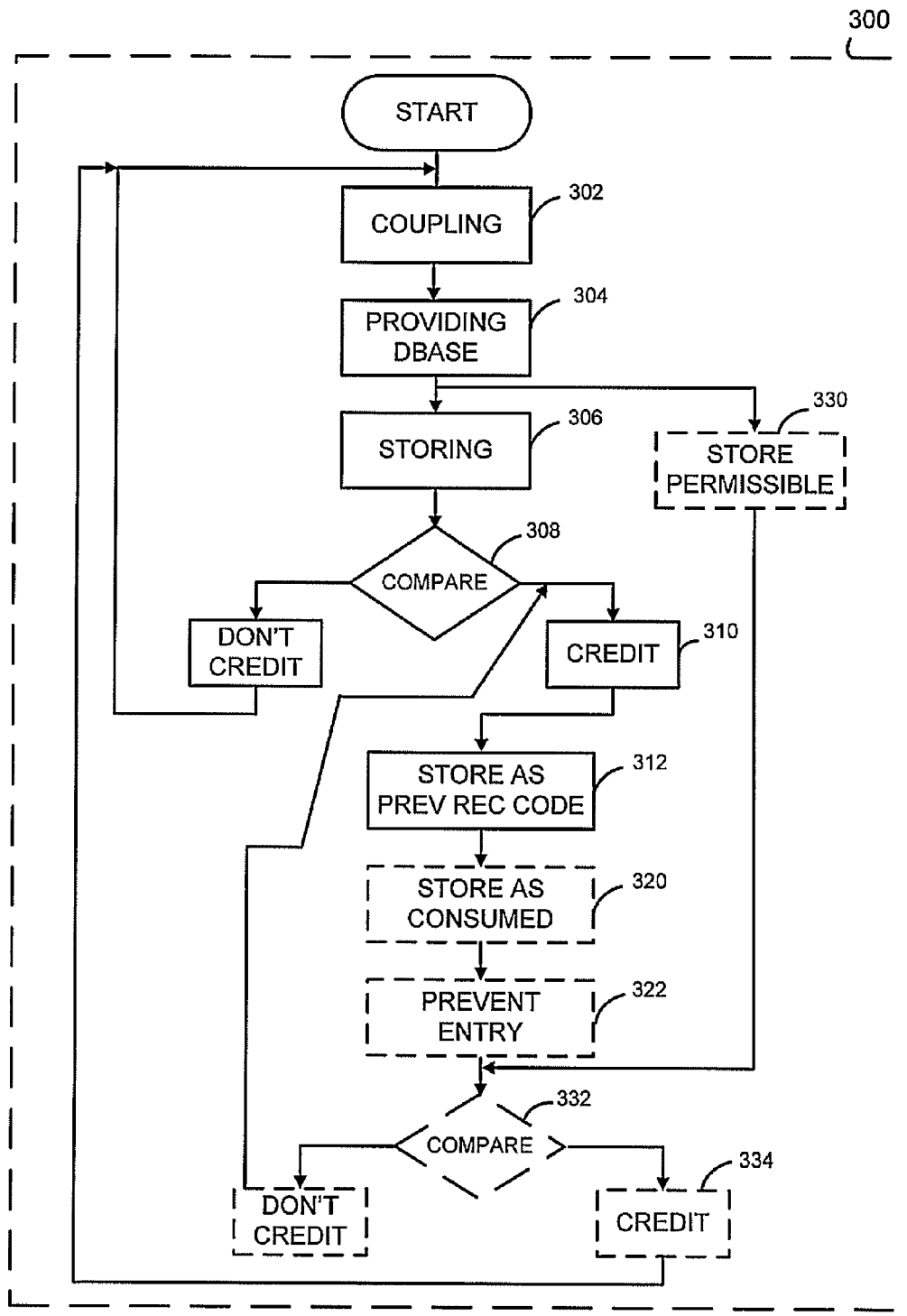
FIG. 5B illustrates a flow diagram of a method for tracking promotion of at least one group of products each of which bears a code that uniquely identifies each product in the group.

FIG. 5B is a flow diagram illustrating a method 300 for tracking promotion of at least one group of products, each of which bears a code that uniquely identifies each product in the group. The method 300 may include communicatively coupling 302 a remote station to a user station, providing a database 304 at the remote station, storing in the database 306 ones of the uniquely identifying codes that have been previously received, comparing 308 each new candidate code received from a given user station against the previously received codes stored in the database, crediting 310 an account of a user associated with the given user station with a non-zero promotional credit only if such new candidate code received from the given user station was not previously stored in the database, and storing 312 such new candidate code in the database as a previously received code if such new candidate code was not previously stored in the database. The method may also include storing 320 the previously received code as a consumed code, and preventing 322 entry of the consumed code as a previously received code by a subsequent user. The method may also include storing 330 at least one permissible new candidate code provided by a provider of the products in the group, and comparing 332 each new candidate code against the at least one permissible new candidate code. Crediting 334 of the non-zero promotional credit if the new candidate code doesn't match one of the at least one permissible new candidate codes may be then prevented at step 310.

Figure 5C:
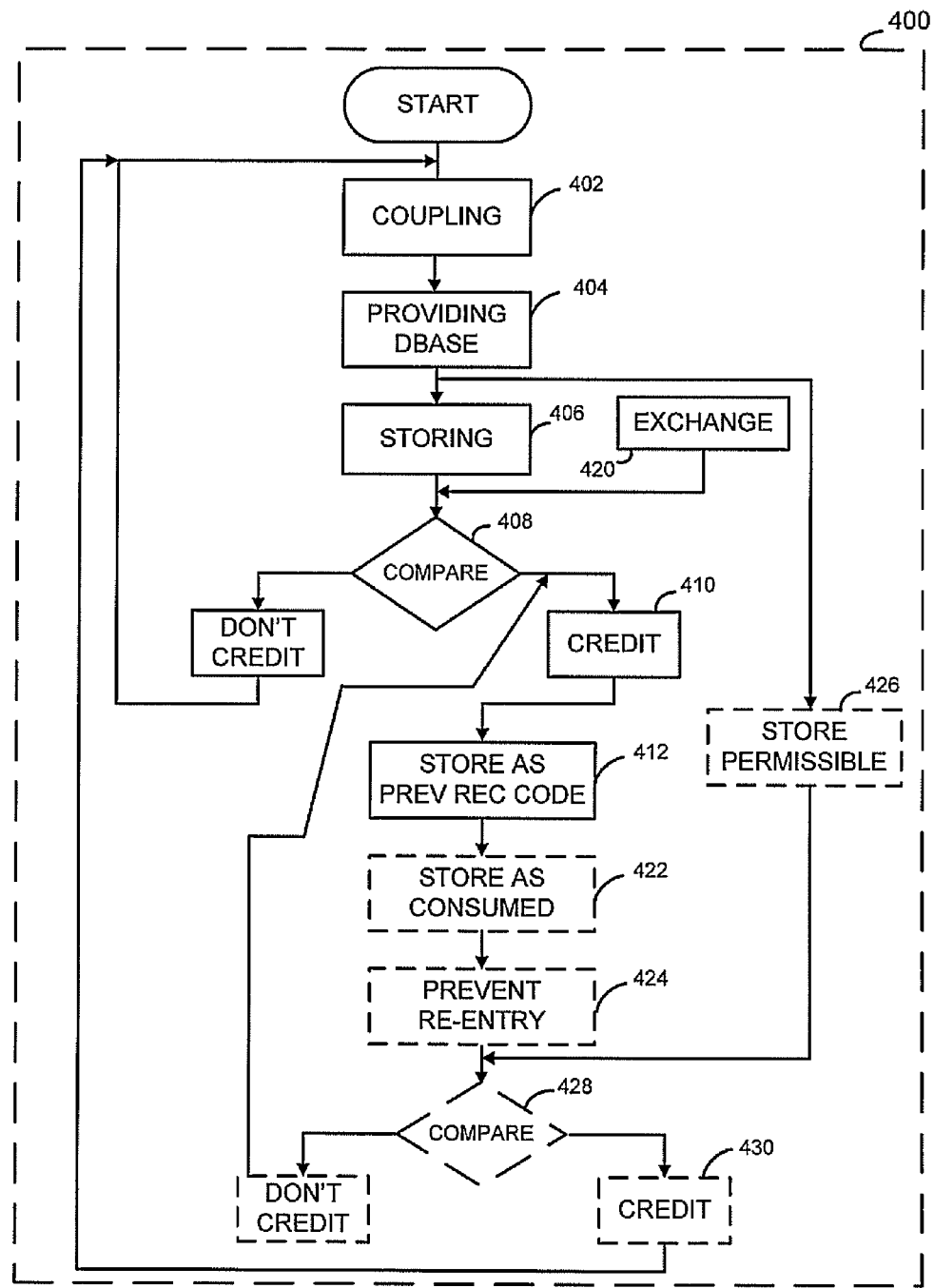
FIG. 5C illustrates a flow diagram of a method for tracking a group of gift certificates each of which bears a code that uniquely identifies each gift certificate in the group.

FIG. 5C is a flow diagram illustrating a method 400 for tracking a group of gift certificates each of which bears a code that uniquely identifies each gift certificate in the group. The method 400 may include communicatively coupling 402 a remote station to a user station, providing a database 404 at the remote station, storing in the database 406 ones of the gift certificate codes that have been previously received from one or more user stations, comparing each new candidate code 408 received from a given user station against the previously received codes stored in the database, crediting an account 410 of a user associated with the given user station with a non-zero gift certificate credit only if such new candidate code received from the given user station was not previously stored in the database, and storing 412 such new candidate code in the database as a previously received code if such new candidate code was not previously stored in the database. The crediting may be performed to a retailer's account, and the non-zero gift certificate credit may be equivalent to a purchase value for the gift certificate by a third party, as discussed hereinabove with respect to FIG. 4C. The method may also include exchanging 420, by the retailer, of at least one product of value equivalent to the gift certificate for the gift certificate, prior to the comparing 408. The method may also include storing 422 the previously received code as a consumed code, and preventing 424 entry of the consumed code as a previously received code by a subsequent user. The method may also include storing at least one permissible new candidate code 426 provided by a provider of the gift certificates in the group, and comparing each new candidate code 428 against the at least one permissible new candidate code. Crediting 430 of the non-zero gift certificate credit if the new candidate code doesn't match one of the at least one permissible new candidate codes may be then prevented at step 410.

In order to facilitate transactions the present invention may provide a number of processing modes. These distinct and complementary transaction processing modes may be used in conducting value exchange (payment) transactions. By way of non-limiting example only, numerous processing modes may be utilized, such as pass-through, direct, peer-to-peer negotiation, local negotiation and stand-in.

In any processing mode, an account identifier may be provided for all processing modes. For example, in the pass-through mode, the account identifier may be the card number, checking account number, private label card number, or other account identifier as required by the consumer account issuer and the associated processing network for the transaction type being requested. For example, other modes may utilize a consumer account which may be identified using one of the access methods stored for the account. These may include, but are not limited to account ID, external account ID, card number, username and password. As further explained herein, account access methods may be defined in the transaction request as well-formed authentication blocks, such as within a document.

The pass-through processing mode may be used in instances wherein there may be no account on file, or wherein the requester (seller) does not choose to use the account on file as a means of identifying the end-user (consumer). Pass-through processing may be used for simple and efficient processing of credit cards, private label cards, and electronic checks, for example. The pass-through model may use the trusted connection to the peer host system as the only means of security. No account-level (payment instrument in this case) authentication may be performed, unless specified by the requestor. In these cases, account authentication may be conducted using third party fraud services, such as eFalcon for credit card, or TeleCheck and Certegy for electronic checks, for example.

In the direct mode, the requestor may have direct knowledge of the purse or financial instrument to be acted on, and may know the name of the purse. The requestor may send the purse name, the transaction type, and data relevant to the transaction type on the transaction request. The direct mode may be used to operate on more than one purse or financial instrument at a time. Multiple direct mode requests may be contained in a single transaction request. In an exemplary embodiment, each direct mode request in the overall transaction must be fulfilled or the entire transaction may be declined. The direct mode may be the most efficient of the processing modes. The direct mode also eliminates any uncertainty as to which purse or financial instrument will be used for the transaction.

In the peer-to-peer mode, the requester may either wish to perform the purse selection on their server, or have implemented client-side software permitting the end user to select which purse(s) or financial instrument(s) is/are to be used for the associated transaction or transactions. The peer-to-peer model may be complemented by the direct model. Once the requesting peer has determined which purse(s) or financial instrument(s) to use for the subsequent transaction, the direct model may be used to perform one or more direct adjustments to the selected purse(s) or financial instrument(s).

In the peer-to-peer mode, the requester may send a transaction that requests a list of purses and financial instruments associated with the end-user's account. This list may be qualified or unqualified. A qualified request may include a "purse filter" that may include varying levels of specificity. Purses may be filtered by purse type and purse instance variables, for example. Examples of purse types include coupon, stored value, reward, token, and subscription. Examples of purse instance variables include purse name, financial instrument type (i.e., Visa®, MasterCard®, Amex®, etc.), purse expiration date, and the like. Purse filters preferably include logic elements such that scalar purse attributes may be qualified through the filter.

As an example, to request only non-expired coupons, the following logic may be applied:

```
<PURSE FILTER>
    <RULE>
        <TYPE=Coupon>
        <STATUS=Active>
    </RULE>
</PURSE FILTER>
```

As another example, the requestor may wish to see any coupons, stored value, and credit cards associated with the account. The following logic may be employed:

```
<PURSE FILTER>
    <RULE>
        <TYPE=Coupon>
        <STATUS=Active>
    </RULE>
    <RULE>
        <TYPE=Stored Value>
        <STATUS=Active>
        <AMOUNT>$2.00>
    </RULE>
    <RULE>
        <TYPE=Credit Card>
        <PRODUCT=Visa>
    </RULE>
</PURSE FILTER>
```

In one embodiment of the present invention, the corresponding response logic document may appear as follows:

```
<PURSES>
<PURSE ID=2314567>
    <TYPE=Coupon>
```

-continued

```
    <NAME=McDonalds Lunchtime Deal>
    <STATUS=Active>
    <BALANCE=2.00>
    <CURRENCY=USD>
    <EXPIRES=02/01/2001>
</PURSE>
<PURSE ID=1234567>
    <TYPE=Stored Value>
    <NAME=Speedpass Cash>
    <STATUS=Active>
    <BALANCE=3.25>
    <CURRENCY=USD>
</PURSE>
</PURSES>
```

The requestor may interrogate this information and may perform a direct mode transaction, as may be appropriate to complete their needs.

The peer-to-peer mode may be less efficient than the direct mode, but may allow for a high-degree of interaction with the end-user through the seller-side interface. Examples of seller-side interfaces that could benefit from using this processing mode include, but are not limited to, point-of-sale ("POS") terminals or web browsers.

In a local negotiation mode, the requestor may send a generalized request to the host and may let the host determine, through server-side (local) logic, which purse(s) or financial instrument(s) will be used to successfully fulfill the transaction request. The local negotiation model assumes that the local logic has been "built in" to the purse(s) and/or financial instrument(s). The local model may be complemented by logic, such as value chaining logic, as further described herein.

There may be several features of the local mode. First, the consumer (as the account holder) may have the ability to set the preference of the order in which the purses of that consumer are used to fund a value exchange transaction. Purses may include any combination of financial instruments and value-based purses, such as stored value, discounts, coupons and points, for example. Second, the merchant (client) may define filters that are used to identify which types of purses (financial instruments and other purse types) are used to fund a value exchange transaction. As an example, a merchant may not accept online debit cards or coupons at a location, or may accept them but only for a particular type of transaction. Further, the consumer account issuer may define the default preference order for consumer accounts for the value chains. This default may be used to set the consumer's value chaining preference when the account may be initialized. This may be an important feature since many consumers will not change order preference. This gives the issuer the ability to influence the initial purse (financial instrument) in the value chain, which typically will be the issuer's own financial instrument (e.g., credit card).

Value chaining logic may provide a configurable "value chain" element for each account. Value chains may define the order for use of the purse(s) and financial instrument(s) associated with the account. Value chains may be pre-established at the issuer level, as the default, and may be over-ridden by account-level value chains. One value chain may be permitted per account (either using the issuer's default value chain or one that may be customized by the account holder). A value chain may be composed of multiple elements, wherein each element in the value chain may be a combination of purse type and, optionally, the purse product type (such as the credit card type, "Visa"). As an example, for a credit card, the purse type may be "Credit Card" and the purse's product type may be "Visa."

According to an aspect of the present invention, purse types such as coupons, tokens, discounts, and rewards may be defined (chained) by their purse type. Financial instruments will preferably be defined using both their purse type (Credit Card) and their product type (Visa®), MasterCard®, Amex®), Discover®, etc.).

Value chaining logic may provide the end user (account holder) the maximum control over the use of the many forms of value (purses and financial instruments) that exist on an account. The account holder may optimize the account to use free value (such as coupons, rewards, and discounts) before using funded value (such as credit cards and electronic checks). While merchants may have some control over which products they will (or can) accept at the point-of-sale, they may not have the option to demand a specific payment order. Allowing the merchant to control payment order may violate certain association rules, such as NACHA (direct debit) and Visa®/MasterCard® association rules. The merchant may qualify a local negotiation request by sending a filter of purses and financial instruments that may be accepted. In this way, the value chain may be pre-filtered to eliminate unacceptable forms of payment, before the value chaining process may be executed to fulfill the payment request.

Another feature of value chaining may be the ability to utilize multiple purses to fund a single value exchange transaction (e.g., payment for goods or services). As an example, the consumer may have specified that coupons, discounts, and rewards be used first, then stored value (cash), then a preferred credit card to fund purchases. To continue the example, the consumer has a coupon good for $10 on qualifying purchases at the merchant location. The value chaining logic may be able to use the $10 coupon to reduce the purchase amount before using the credit card to fund the remaining purchase amount.

Value chaining may provide the merchant with control of whether more than one alternative form of payment may be used within a single value exchange transaction, beyond the financial instrument. This ensures that the consumer may not use a coupon and a discount within a single value exchange transaction if so desired.

In one embodiment of the present invention utilizing the local negotiation mode, the value exchange transaction process may include the following steps:
1. A transaction may be submitted from the merchant or merchant's agent (such as the network). The transaction may be requesting a payment for goods or services for a particular merchant location. If the client of sale (merchant) is not specified on the request, the default client for the issuer may be used. Next, the consumer account may be interrogated for all purses (financial instruments and other types) used as the total potential pool of qualifying purses.
2. The consumer's order preference (value chain specification) may be retrieved from the account. If no preference is defined, then the account issuer's default order preference may be retrieved and used for this value exchange transaction.
3. The client of sale's (merchant's) purse filter may be retrieved. If there is no client of sale specified on this transaction, then the purse filter may be retrieved for the default client for the consumer account's issuer.
4. The consumer's purses may be filtered using the client's purse filter rules to eliminate any purses that do not qualify for this value exchange transaction. If multiple financial instruments match a single instance in the filtering hierarchy, all such instruments may be included, and may be included in the order that they are encountered. If there are any financial instruments that are not ordered (matched to the debit hierarchy), they may be appended to the end of the value chain list after the other instruments, in the order that they are encountered.

At this point in the transaction process, all of the potential purses may have been filtered (based on the client's filtering preferences) and ordered (based on the consumer's ordering preferences). Next, the value chaining logic may be applied to the value exchange (debit) request. The first purse may be inspected to determine if it qualifies for the value exchange transaction depending on the specific rules and data elements contained within the purse. For example, a coupon may not qualify if it does not meet certain date or minimum purchase requirements. If the purse does apply, it may be redeemed for the qualifying purchase.

If the purse fulfills the entire amount on the value exchange request, then the transaction may be completed. However, if the purse only meets a partial amount of the value exchange request, then the next purse in the value chain may be retrieved and the process may be repeated until the entire value exchange request amount is fulfilled. In the case where purses in the value exchange request were inspected, and potentially used, and the entire amount in the value exchange request has not been fulfilled, then the transaction may be ended and a "declined" response may be returned to the transaction originator.

Stand-in processing mode may be activated when the payment processing system has reached its maximum computing capacity. This capacity may be a mixture of capacity thresholds present within each software, hardware, and network component in the system. For example, a system client (such as a consumer account issuer) may contract for a certain peak processing volume. Because system capacity may be shared with other clients, any individual client (merchant or seller) who exceeds a contracted volume may impact system processing for other clients.

In the stand-in processing (STIP) mode, the transaction processing host system may be either unable to respond to the transaction request, or may be doing so in a diminished capacity. The purpose of STIP may be two-fold: 1) to provide a high level of authorizations when the host system may be unavailable; and 2) to provide an orderly "relief-valve" for periods of high transactions volumes, wherein a portion of transactions may be more efficiently authorized using stand-in logic.

A stand-in authorization, which is an authorization on behalf of the issuer, may occur when the issuer may be unable to respond, or when the issuer delegates authorizations to a third-party processing system at its own risk (whether by dynamic stand-in authorization or by permanent stand-in authorization). Stand in processing may include the performance of authorization by a pre-determined processing system on behalf of the issuer. Similarly, alternate limits may include the authorization parameters being set by the issuer for the alternate processing system in case the primary processing system may be unable to respond (cf. alternate parameters, back-up parameters, down option limits, down option parameters, dynamic stand-in limits, dynamic stand-in parameters).

In an embodiment of the present invention, STIP may be distributed, in that each front-end processor may be able to act independently from other front-end processors, and from a central data repository. This configuration may be true for both information required for stand-in logic, for account or transaction data, and for outputs from the stand-in processing.

As capacity may be reached, the STIP may begin to decline low priority transactions and STIP may next begin to decline low priority/low utilization transaction types.

Complete STIP may occur in cases where database may be off-line. During normal operations, online transactions may be committed and the results may be written to the queue. One or more data warehouse subscribers may read messages from this queue and update the data warehouse tables. The latency in this process may run from a few seconds to a few minutes under normal operating conditions. The server may read messages from the queue to update relevant data in the STIP database. This may be the only source of data used to provide updates to the STIP database. To switch to STIP mode, the systems operator may change the system state to "stand-in", thereby causing the system state variable for "stand-in" operating mode to be published to the application servers and STIP servers, the application servers to switch to stand-in mode, the application servers to stop writing transactions to the queue, the application servers to begin writing transactions to the queue, the data warehouse subscribers (and other subscribers) to have the opportunity to process all messages in the queue, and the use of logic may to conduct transactions until the system is switched back to normal operating mode.

While in STIP mode, updates may not be written to the database, since the only source of updates may be the queue. While in STIP mode, some transactions thus may not be fully supported. It may be the responsibility of each service to implement its own STIP logic. Many service methods may simply decide to decline the transaction request, while some service methods may provide partial support for a request.

To switch from STIP back to normal operating mode, the systems operator may change the system state to "normal". Setting back to normal mode may set the data warehouse subscribers (and other subscribers) back on-line, may set the system state variable for "normal" operating mode to published to the application servers and STIP servers, may set the application servers to switch to normal mode, may set the application servers to stop writing transactions to the queue, may set the application servers to begin writing all transactions to the queue, and may set the application servers to begin reading transactions from the queue to replay the transactions to the system.

In an embodiment of the present invention, the STIP may be activated by analyzing the customer's risk score, the transaction amount, or some other variable, such as the number of transactions allowed in a day, for example. The logic may proceed as follows: customer's risk score>risk score limit, then decline the transaction; transaction amount>amount limit, then decline the transaction, or the number of transactions allowed per day for an account has been exceeded, then decline the transaction.

Interface with the system of the present invention may be facilitated using software, such as the Value Exchange Markup Language (VEXML™), for example. This software may be included within gateway 25, or may be separate therefrom. A systematic protocol may be utilized and certain data formats set to interface with the system of the present invention. Further, this protocol may contain information of import for subscribers to implement some or all of the supported transactions from either the client or the server system perspective. The software may be designed to provide a simple protocol, such a XML-based, between entities engaged in payment and value exchange transactions, such as over the Internet. Various attributes may be targeted in the design, such as ease of integration and implementation, for example.

Figure 6:
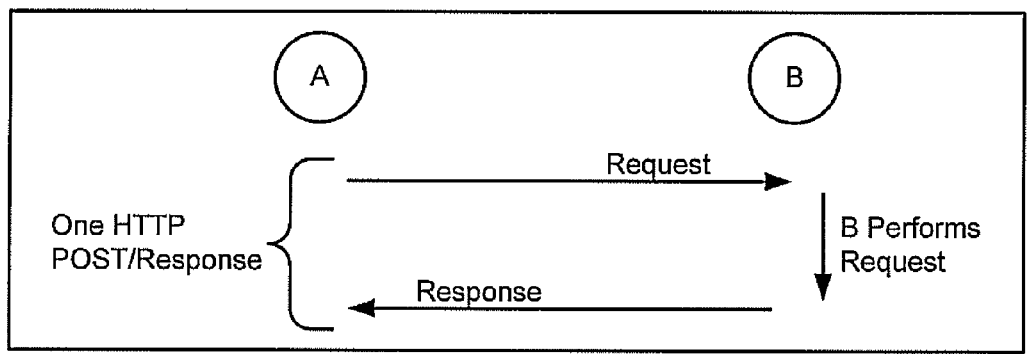
FIG. 6 illustrates the Response/Request Model in accordance with one embodiment of the present invention.

The interface may be a web server designed to handle a HTTP request, for example. The interface may also require components to handle the requests and update the data stores. The interface may be hardware independent. The interface may require requests be made as XML documents and that the documents adhere to the naming conventions expected. The communications protocol for the present invention may be HTTP and may necessitate a client make an HTTP post request to a well-known IP address. Further, the application level protocol may be XML. HTTP requests may be XML documents. HTTP responses may also be XML documents. The communication strategy may be HTTP request and response, and the system of the present invention may be implemented to provide a response indicating success or failure of the HTTP request. Transactions may thus take place using this request/response model. This model allows for simplicity in implementation from the client/requestor perspective because the operations required are strictly described. FIG. 6 illustrates the protocol steps involved in an embodiment of the request/response model as form of interaction between A and B.

The request/response model transaction may, in an exemplary embodiment, contain the following steps:

A initiates a connection, such as a HTTP/1.x connection, with B on a predetermined URL that represents B's address.

A uses the connection to send the message, such as a VEXML™ message, as a POST operation.

A waits for a response to the message to return in the stream.

B has a server that dispatches the request to the resource specified by the URL used in Step 1.

B's resource identified in Step 4 reads the message and maps the request to the appropriate handler for that request.

B's handler for the request performs the work that the request specifies and formats a message as a response.

B sends the response to A through the connection established in Step 1.

A reads the response and returns it to the process that initiated the request.

The above process may be then repeated for further request/response cycles.

In order to facilitate the processing identified above, a message, such as a VEXML™ message, may be divided into two distinct parts carried in the parent envelope element. These parts may be identified as a login and request/response data. The login may contain authentication information and addressing necessary to validate the user and properly transfer the message to the appropriate location. The request/response may contain a specific request, the information to be passed, and the data that may be expected as the response. The following example shows the document structure for a request:

```
<VEXML>
    <Login>
        Login specific information here...
    </Login>
    <Request>
        Request specific information here...
    </Request>
</VEXML>
```

The following shows an example of the document structure for a response:

```
<VEXML>
    <Response>
        Response specific information here...
    </Response>
</VEXML>
```

As may be seen above, the response structure need not contain a login element because the response may travel in the same path, such as a HTTP request, that the request traveled.

According to an aspect of the present invention an envelope, such as the VEXML™ envelope, may be the root of the message structure, containing the other elements. The following example shows a fully specified VEXML™ element.

<VEXML version="1.0"
payload D="1234567.4567.5678@test.iloyalty.net"
timestamp="20003031T1839090800">

A VEXML™ element contains the following attributes:

| Attribute | Definition |
|---|---|
| Version | Specifies the version of the VEXML ™ protocol. |
| PayloadID | A unique number with respect to space and time, used for logging purposes to identify messages that might have been lost or had problems. The recommended implementation is: datetime.process id.random number@hostname |
| Timestamp | The date and time the message was sent, in ISO 8601 format. (yyyyMMddThhmmssSS i.e. 20000215T18300000) |

The login block may contain information which may be used to authenticate the source of the message. The same login element may be used regardless of which specific request may be contained in the body of the VEXML™ message. The following example shows a login element:

```
<Login>
    <Issuer>
        <IssuerName>Issuer</IssuerName>
        <User>
            <UserName>IssuerUserName</UserName>
            <Pswd>IssuerPassword</Pswd>
        </User>
        <Client>
            <ClientName>Client</ClientName>
            <User>
        <UserName>IssuerUserName</UserName>
            <Pswd>IssuerPassword</Pswd>
            </User>
        </Client>
    </Issuer>
</Login>
```

The above example shows the user element under both the client and issuer elements. It should be noted that the user element need only be included in one or the other and not necessarily both elements. If the user element is included at the issuer level, the request may be allowed to update any information associated with that issuer. If the user element is included at the client level, the request may be allowed to update information associated with that client. If the user element is included at both levels, the issuer user information may be used.

The login element may be required only once with each envelope. Multiple requests may then be sent in each envelope. If authentication has been done at the issuer level, the request element may allow for a client element, which will override the client element in the login node. In this case, the client element may be optional on the login node.

Requests may be sent by clients to request operations. Multiple requests may be acceptable. Though the request element may contain virtually any type of data, including XML data, the requests may be defined in a specific language, such as defined in VEXML™, to be examined.

The subscription API may use a requesvresponse model protocol over HTTP. Clients connecting to the hosted services may be provided with a URL for the posting of requests. Transactions may take place using the request/response model described above. This model thus allows for simplicity in implementation from the client/requestor perspective because the operations required may be strictly described, as discussed hereinabove.

Figure 7:
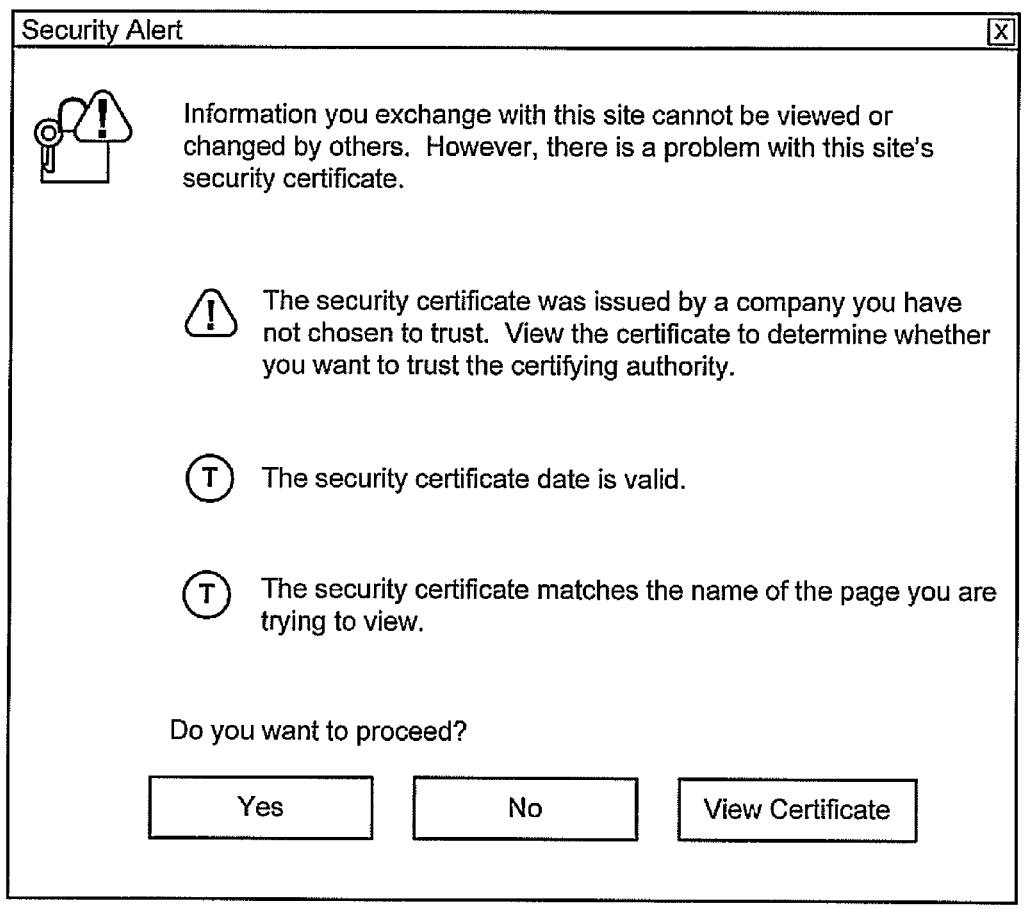
FIG. 7 illustrates a screen print in accordance with one embodiment of the security alert warning screen of the present invention.
Figure 8:
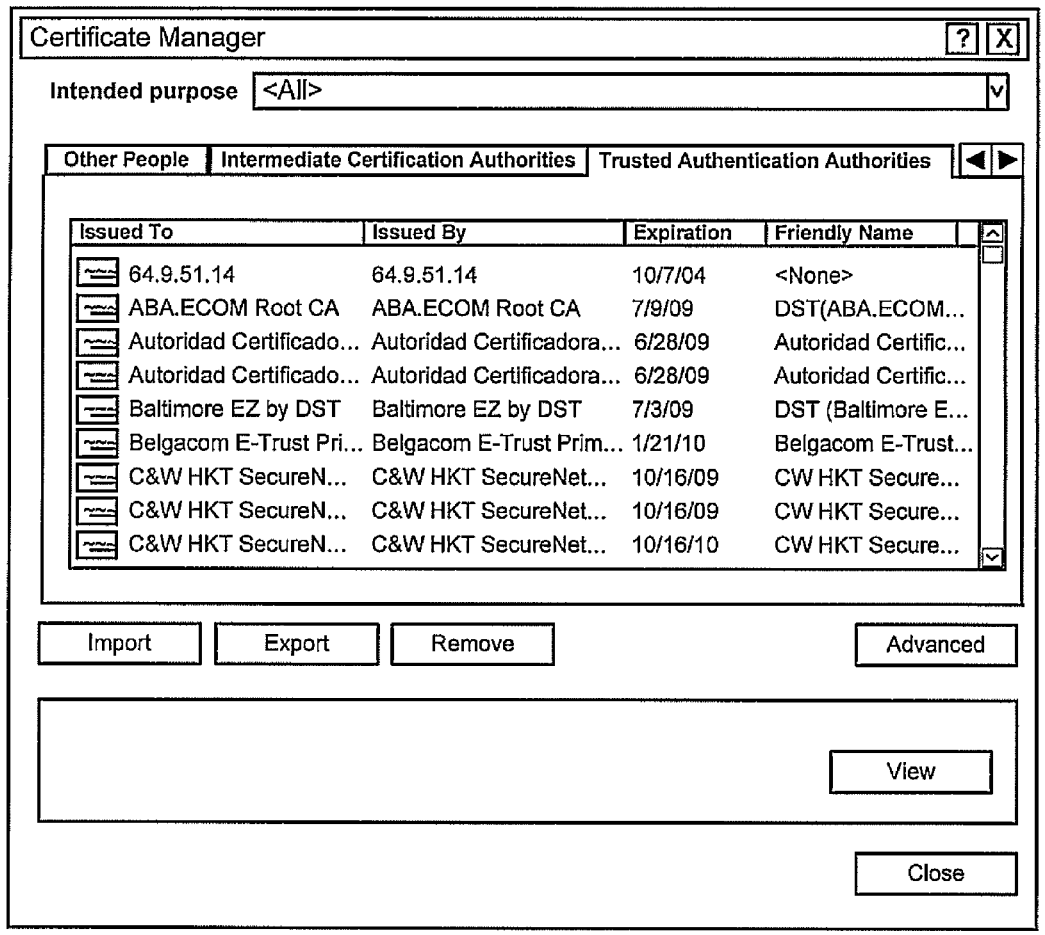
FIG. 8 illustrates a screen print in accordance with one embodiment of the test certificate of the present invention.

Connecting to the system of the present invention may be accomplished by obtaining a server certificate. The server certificate used on the system's testing web servers may be self-issued and self-signed, and may not be trusted by default clients and browsers. Warnings, such as the one illustrated in FIG. 7, may be presented when visiting the site programmatically, or manually via a web browser. The following instructions are representative, and apply to inventor-issued and signed certificates which may be accessed from Internet Explorer:

From the client used to initiate your testing, browse to https://64.9.51.14/.
Select View Certificate.
Select Install Certificate.
Select Next.
Ensure that "Automatically select the certificate store based on the type of certificate" has been selected.
Select Next.
Ensure that "Trusted Root CA" has been chosen as the store by Internet Explorer.
Select Finish.
When prompted, "Do you want to ADD . . . ", select Yes.
A Dialog box will say, "The import was successful."
Select OK.
Next, from Tools, Internet Options, Content, Certificates, under the "Trusted Root Certificate Authorities" tab will appear on the test certificate, as illustrated in FIG. 8. Follow up https://POSTS from this client machine to any directory off of this Web server (either via browsing or programmatically) will no longer present the warning dialog box.

In order to promote a more complete understanding of the invention, the following description of a specific exemplary embodiment of the system and method of the present invention is herein provided. The exemplary site may be an embodiment for on-line communities. Using this embodiment, stored value and digital promotion infrastructure may be provided directly to on-line communities, to is on-line community builders, and to community infrastructure providers. The exemplary site product suite may provide basic infrastructure needed to define and operate one or more value systems for an individual community, including value bank, transaction, and exchange services. Further the suite may provide individual communities with the ability to subscribe to a community network, and to exchange shared value systems with other communities within the network, and may provide individual communities, or community networks, the ability to exchange non-shared value with other communities or community networks and external value systems (e.g., credit card payments, private-label retail loyalty systems, and digital currency providers). These component services may be managed by the community manager, by the community infrastructure provider, or by the exemplary site as a managed service.

The community value system of the exemplary site may thus provide basic infrastructure needed to define and operate one or more value systems for an individual community, including, but not limited to, a set of configurable value products used to create the basic value systems used by the community. Further, community transactions may provide transaction level support for exchange of value among the community, community businesses, and community members. The community value bank may provide basic services to support member account management, merchant account management, and financial reconciliation and settlement. Access to these services may be provided through a secure web-based interface to the exemplary site.

The community may be based on a shared value system which may be point-based or based on virtual or real currency. The value system may be defined by the community manager by selecting from one of the configurable value products. The value system may provide the community, community businesses, and community members with a common medium and method of exchange. A community may support more than one value system (e.g., loyalty points, promotions and cash). Community members may be automatically enabled for each community defined value system and thereby allowed to participate in value exchange transactions using one of the available value exchange products, including, but not limited to, stored value, sweepstakes, gift certificates, coupons and discounts. Additionally, custom value exchange products may be created for communities. These products may be made available exclusively to the defining community, or may be made available to all communities.

The exemplary site embodiment of the present invention may provide sellers with the infrastructure to support traditional value exchange transactions, including, but not limited to, consumer to consumer transactions, and business to consumer transactions. Consumer to consumer transactions may be transactions in which individual community members transact directly with other community members, to exchange value. These transactions may be intended to provide the virtual equivalence and convenience of cash and check transactions, as well as barter. Business to consumer transactions may be transactions in which businesses within the community transact directly with community members. For example, a business may be created and distribute a coupon that provides community members with a 100-point discount towards any purchase from the business.

Figure 9:
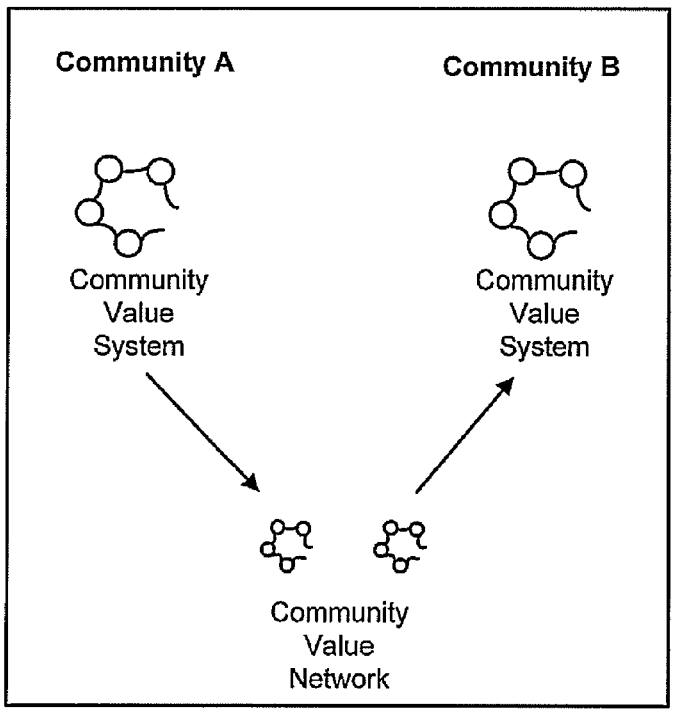
FIGS. 9-11 illustrate a particular embodiment of the present invention known as the Community Value Network.
Figure 10:
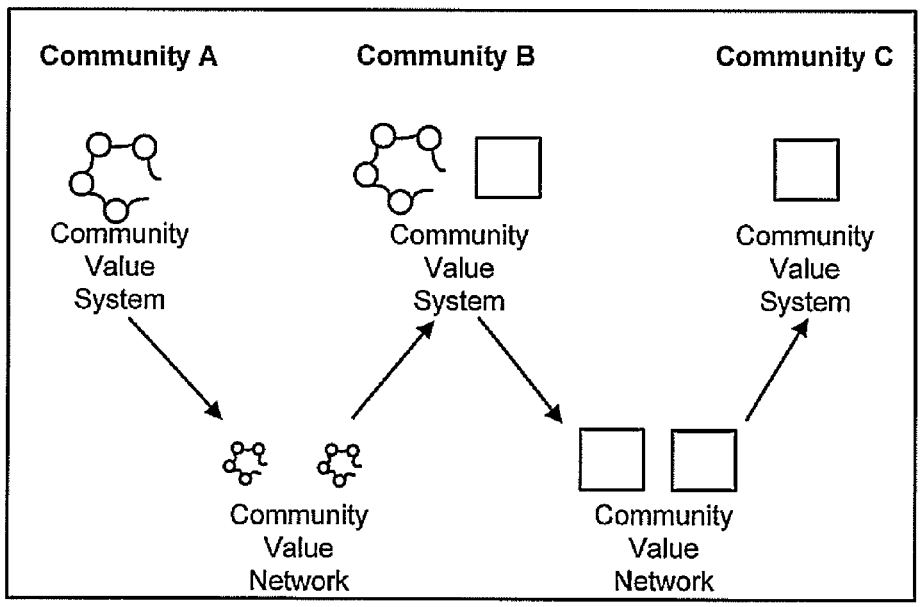

Other types of transactions may also be available and provided for, such as community to consumer transactions, and business to community transactions. Community to consumer transactions may allow the community managers to transact directly with the members or consumers, as a non-merchant. Business to community transactions may facilitate community businesses transactions with consumers through the community, rather than directly with the consumer. This form of transaction may use a publish-subscribe model, whereby the business may publish an offer to the community or a targeted audience of the community, and community members who are subscribers may receive and act on the business's published offers. A community value network may be created when two or more on-line communities elect to share a value system. Networks, therefore, may be an aggregation of communities. Reference may be made to FIGS. 9 and 10, which illustrate two working embodiments of community value networks. In FIG. 9, there is shown a community value network with a single shared value system. In FIG. 10, there is shown a community value network with multiple share value.

Figure 11:
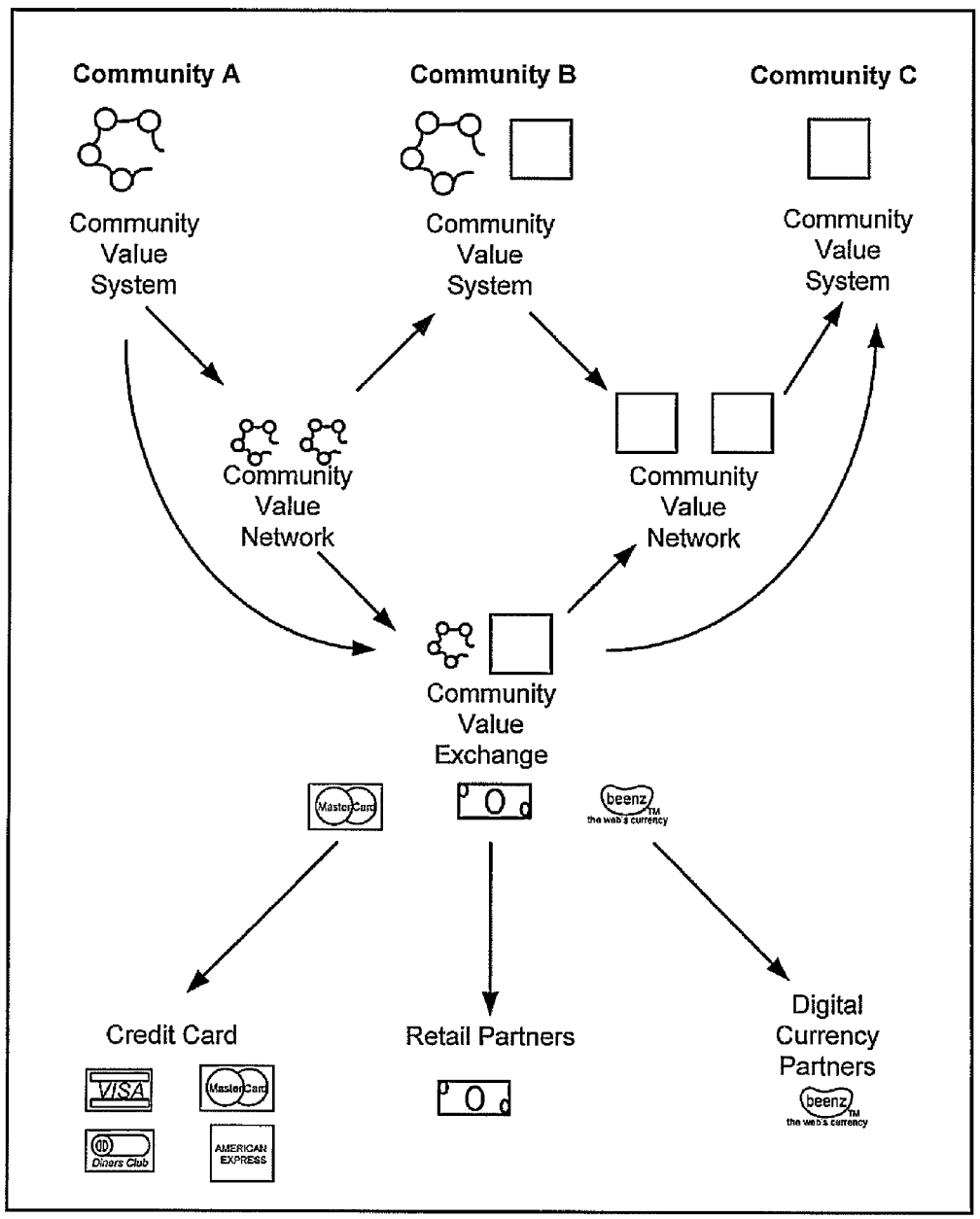

The community value exchange may enable the exchange of value among a community, community value network, and external value systems. Reference may be made to FIG. 11, which illustrates a community value exchange and its relationship to the community value system, the community value network, credit card issuers, retail partners, and digital currency partners.

Figure 12:
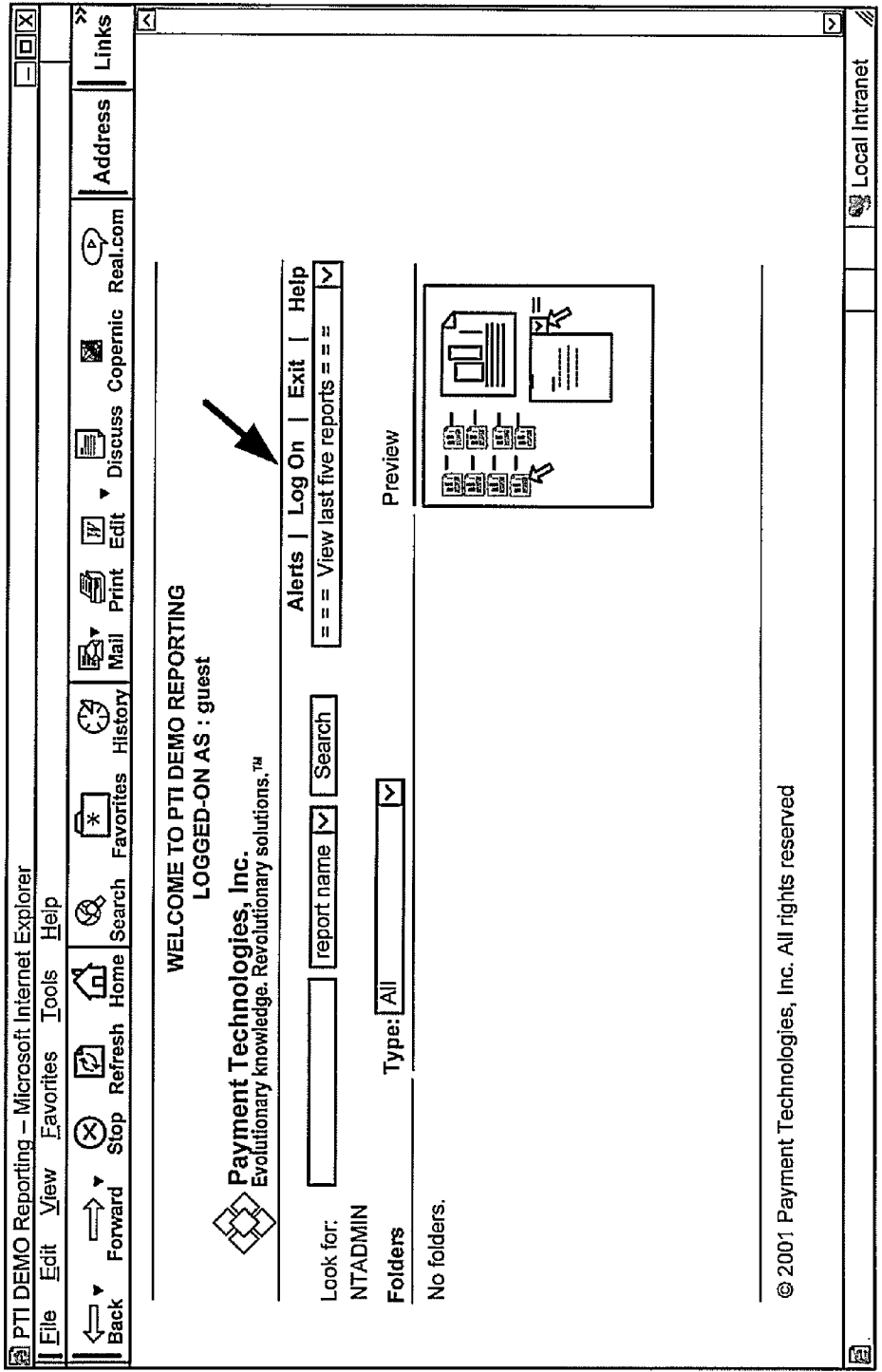
Figure 14:
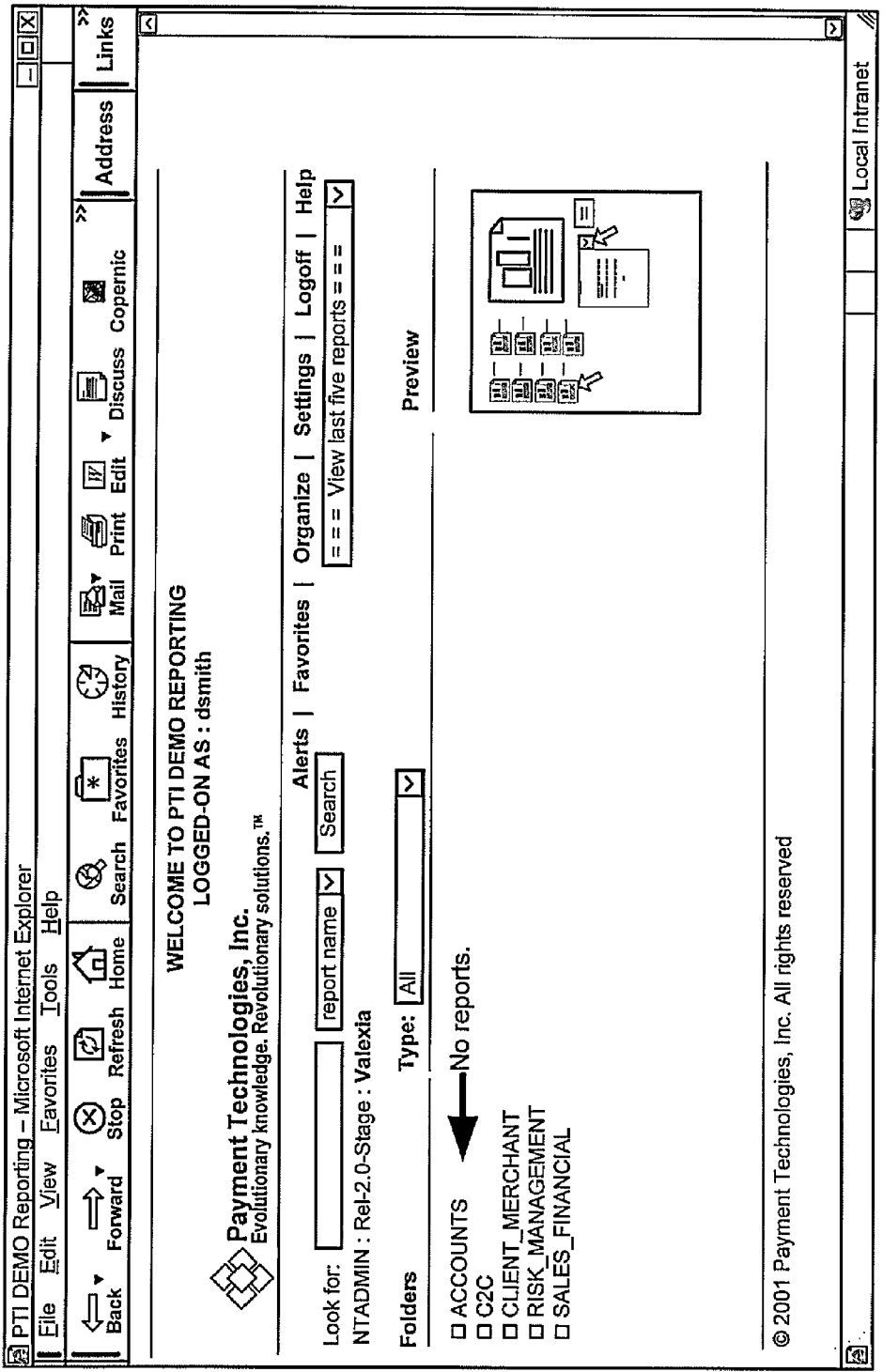
Figure 16:
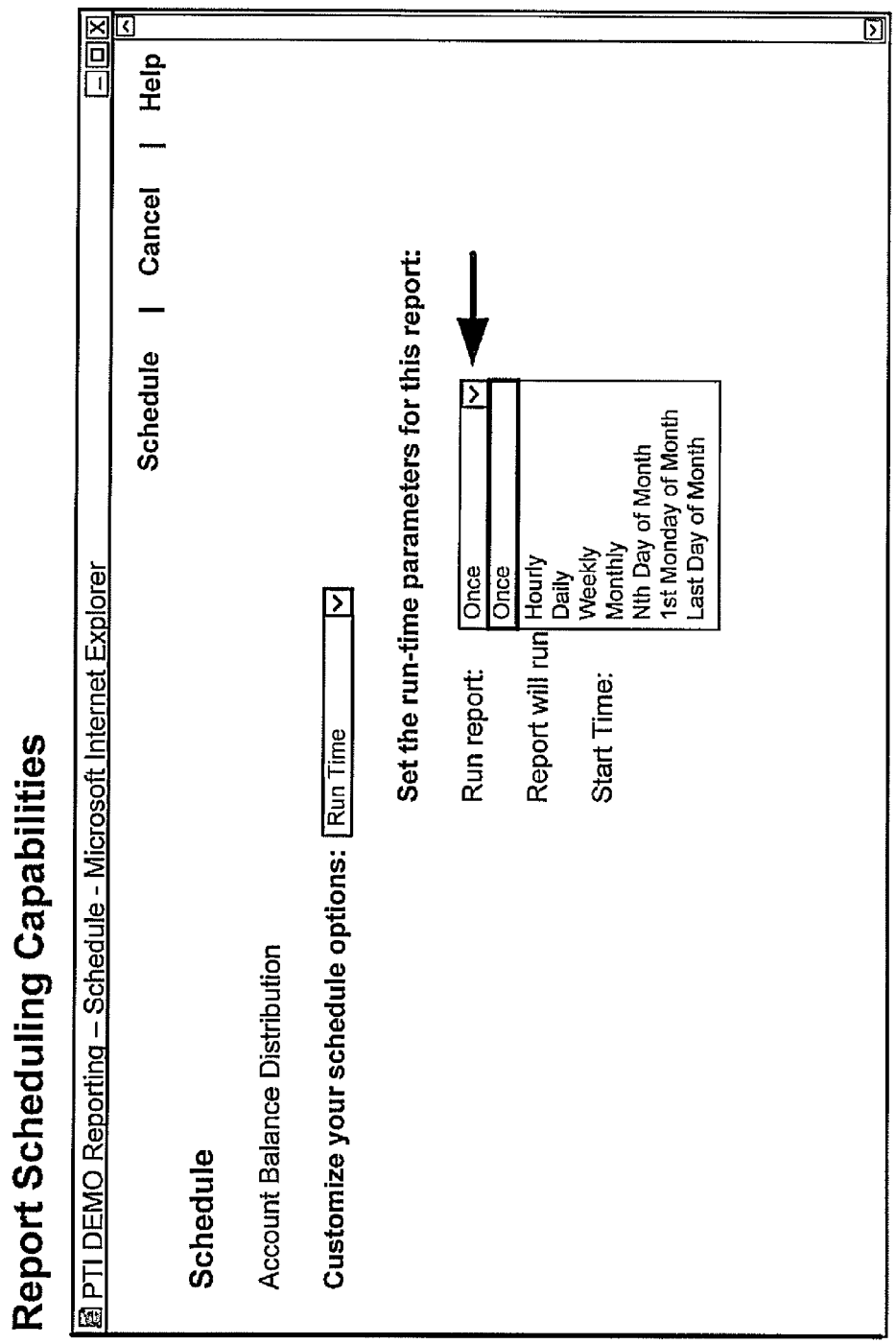

Referring now to FIGS. 12-23, there are shown screen prints in accordance with one embodiment of the reporting system function of the present invention. Referring particularly to FIG. 12, there is shown a screen shot of the entrance to web-based reporting functions. As is highlighted in FIG. 12, there may be a log-on feature associated with report generation and retrieval. After utilizing the screen depicted in FIG. 12, the entrance way, in the form of a log-on screen, is illustratively shown as FIG. 13. As may be seen in FIG. 13, a APS name, user name, password, and authentication may be entered to access the system. As may be seen in FIG. 14, there is shown a screen shot of the variety of reports that may be viewed according to an aspect of the present invention. As may be seen in FIG. 14, accounting reports, customer to customer, client merchant, risk management, and sales financial reports may generated. As may be seen in FIG. 15, account balances may be viewed and may provide data for a report. Reports may also be generated based on a schedule, as is shown in FIG. 16. For example, reports may be generated based on a one time generation, hourly, daily, or weekly, by way of non-limiting example only.

Figure 17:
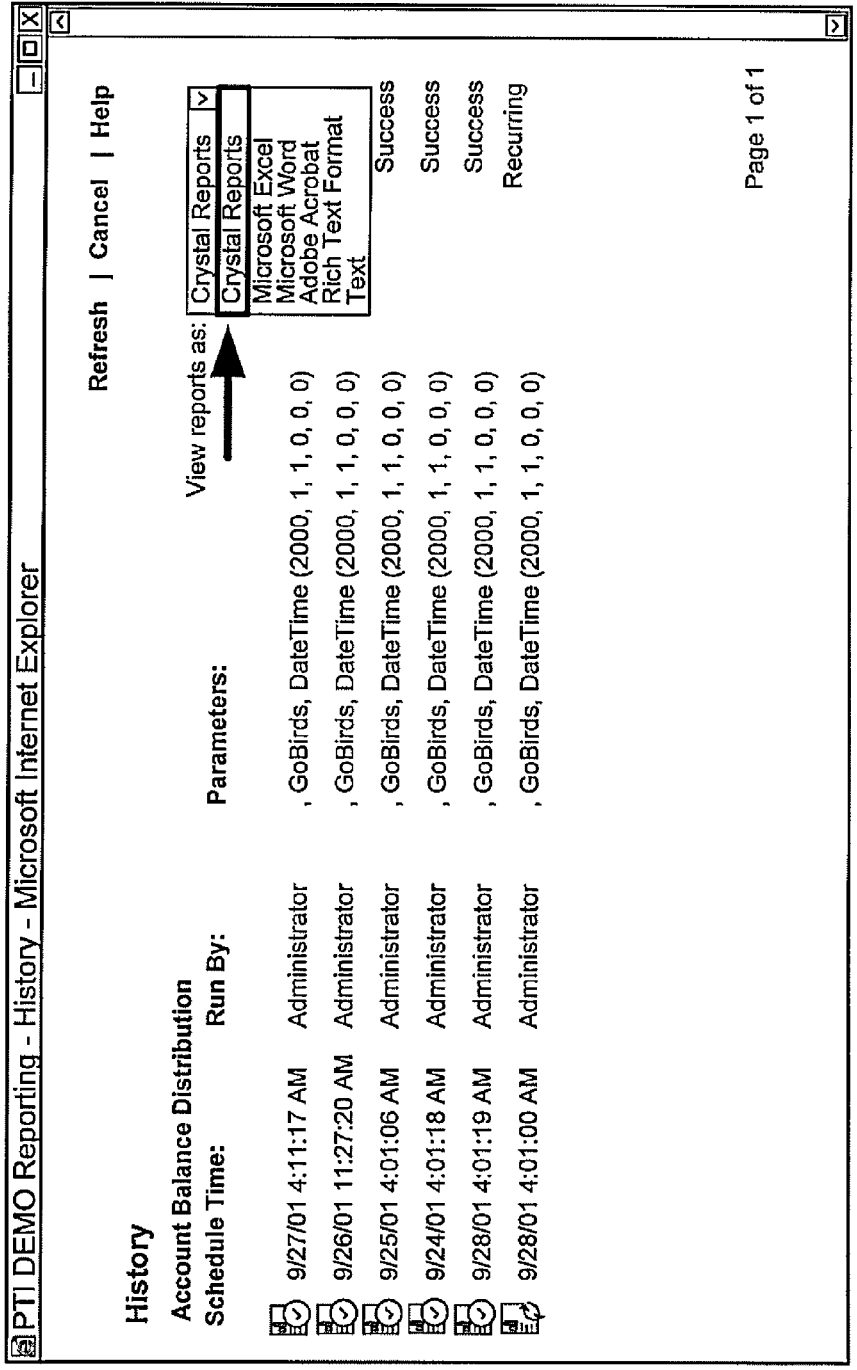
Figure 18:
Figure 19:
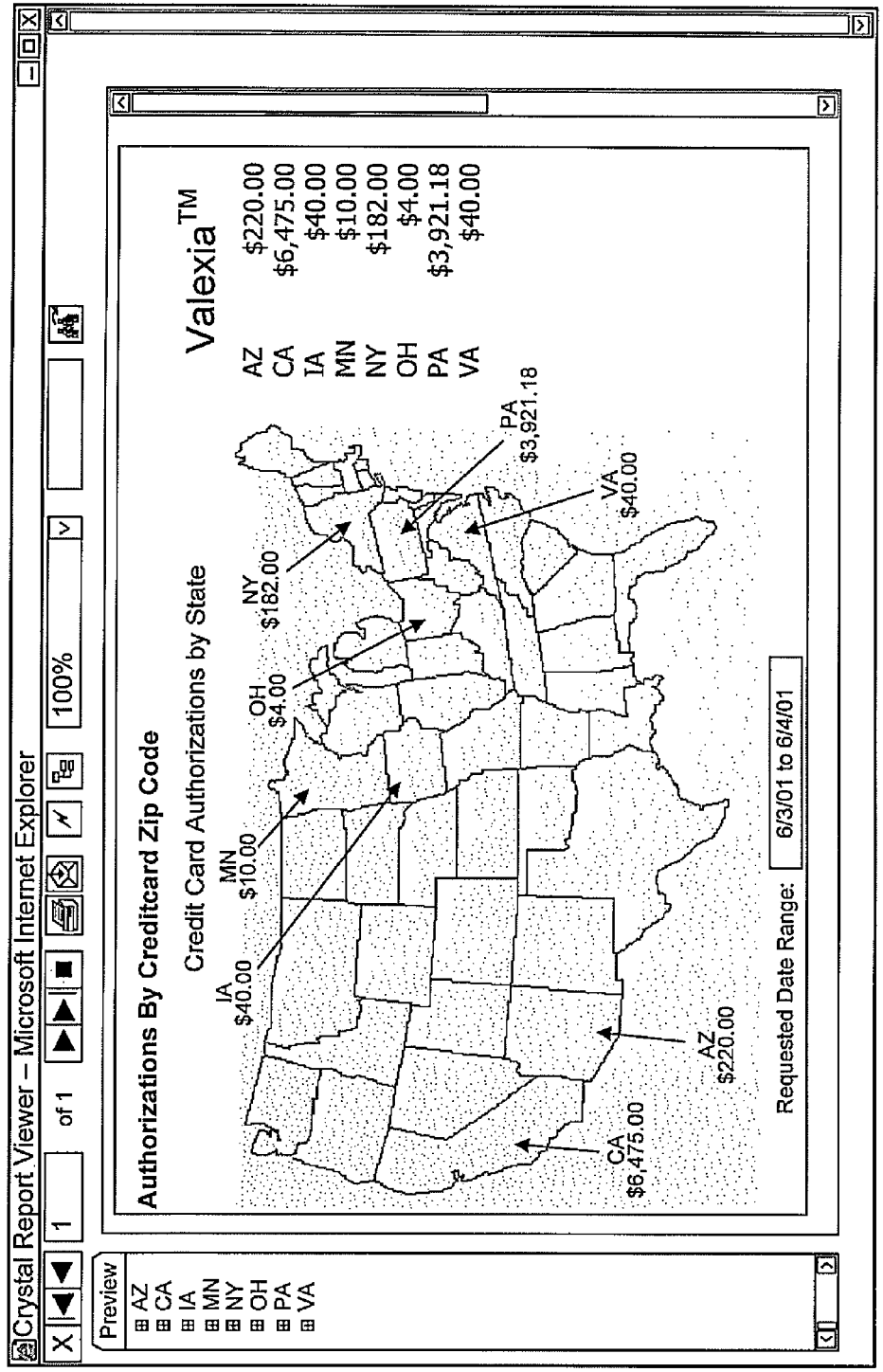
Figure 20:
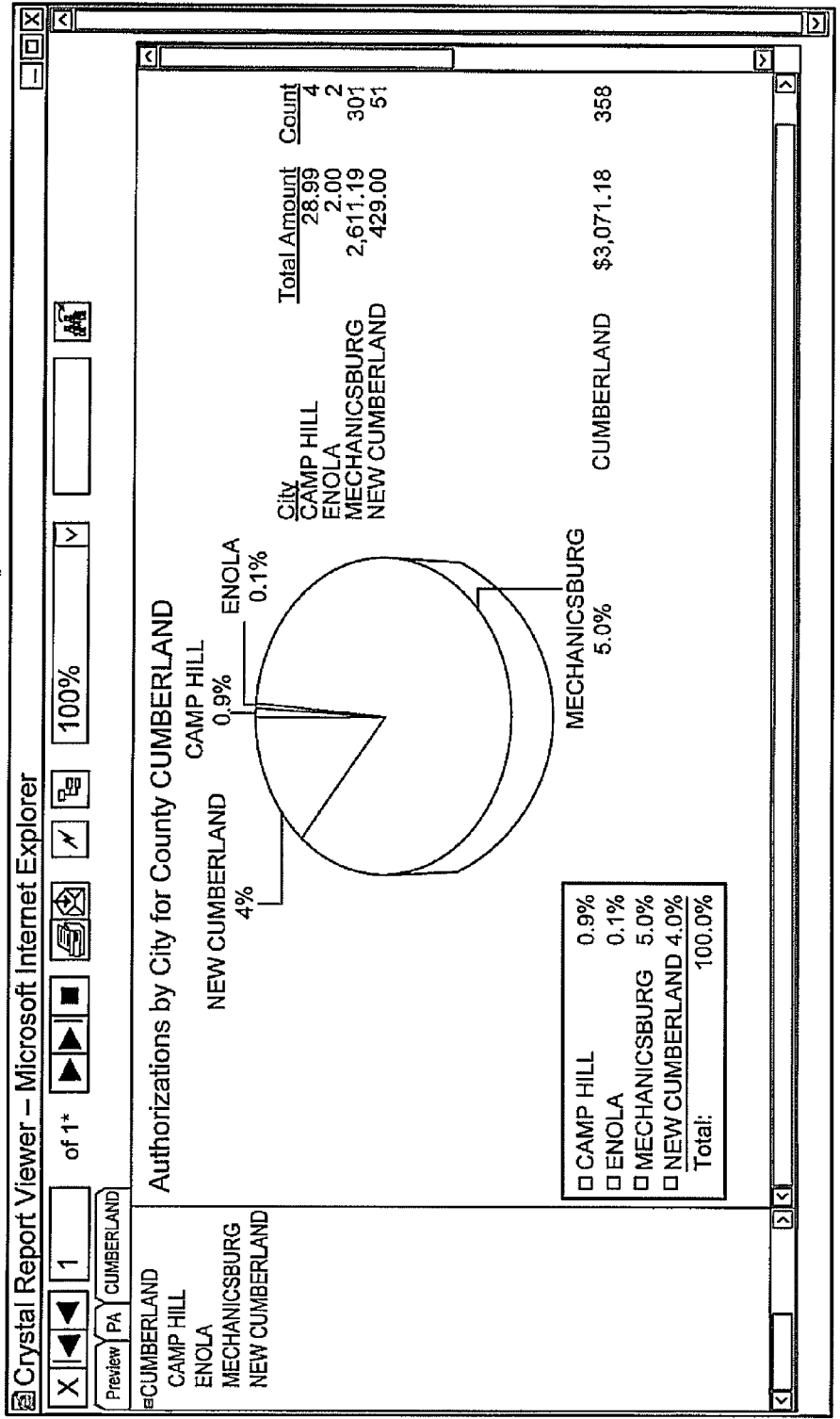

Referring now to FIG. 17, there is shown a feature for viewing and retrieving historical reports. As may be seen in FIG. 17, reports may be generated and the parameters for generation may be seen in the screen shot. Additionally, alerts may be created for certain parameters within the system of FIG. 1. As may be seen in FIG. 18, there is shown a screen shot itemizing two such alerts. In particular, merchants not meeting the minimum volume may cause an alert, for example. Further, reports may be generated to highlight regions from which users or purchasers may be located, such as from the United States, or world, for example. As is shown in FIG. 19, a depiction of dollar figures may be based on regions of the United States, using states as the delimitating value. Authorizations may also be viewed, as is shown in FIG. 20, for specific locations, such as a city, for example.

Figure 21:
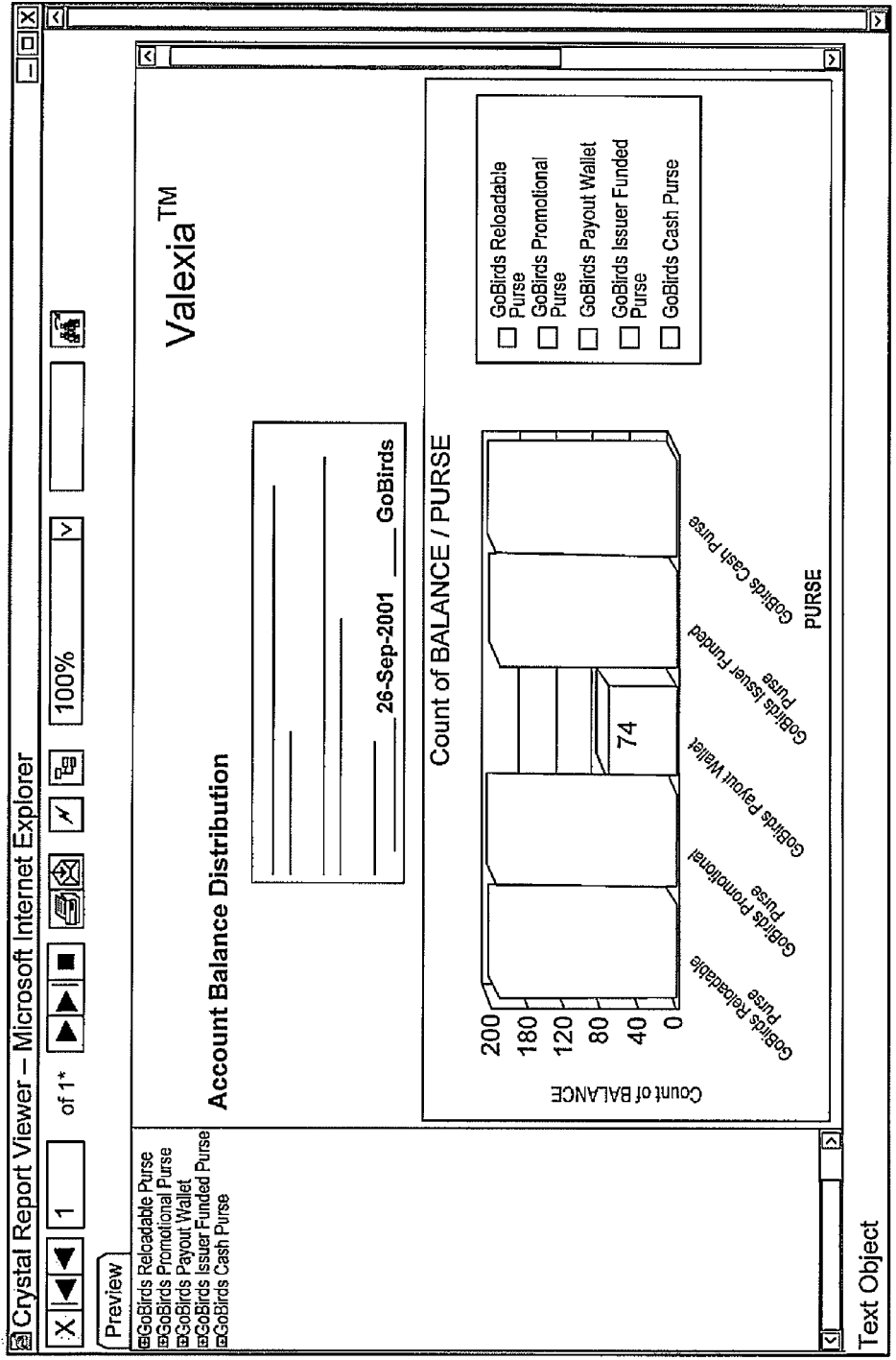

Referring now to FIG. 21, there is shown a screen shot of an account balance distribution according to an aspect of the present invention. As may be seen in FIG. 21, account balances may be reported based on identified parameters, such as issuer and date. Such an account balance may be identified based on promotional purse, reloadable purse, payouts, issuer, and cash, for example. As may be seen on FIG. 22, transaction detail reports may also be created. Such a report may include selecting a date range and enumerating the amount and reward associated with a given transaction. A daily financial report may also be generated, as illustrated in FIG. 23. A daily financial summary may be identified based on promotional purse, reloadable purse, payouts, issuer, and cash, for example.

Figure 24:
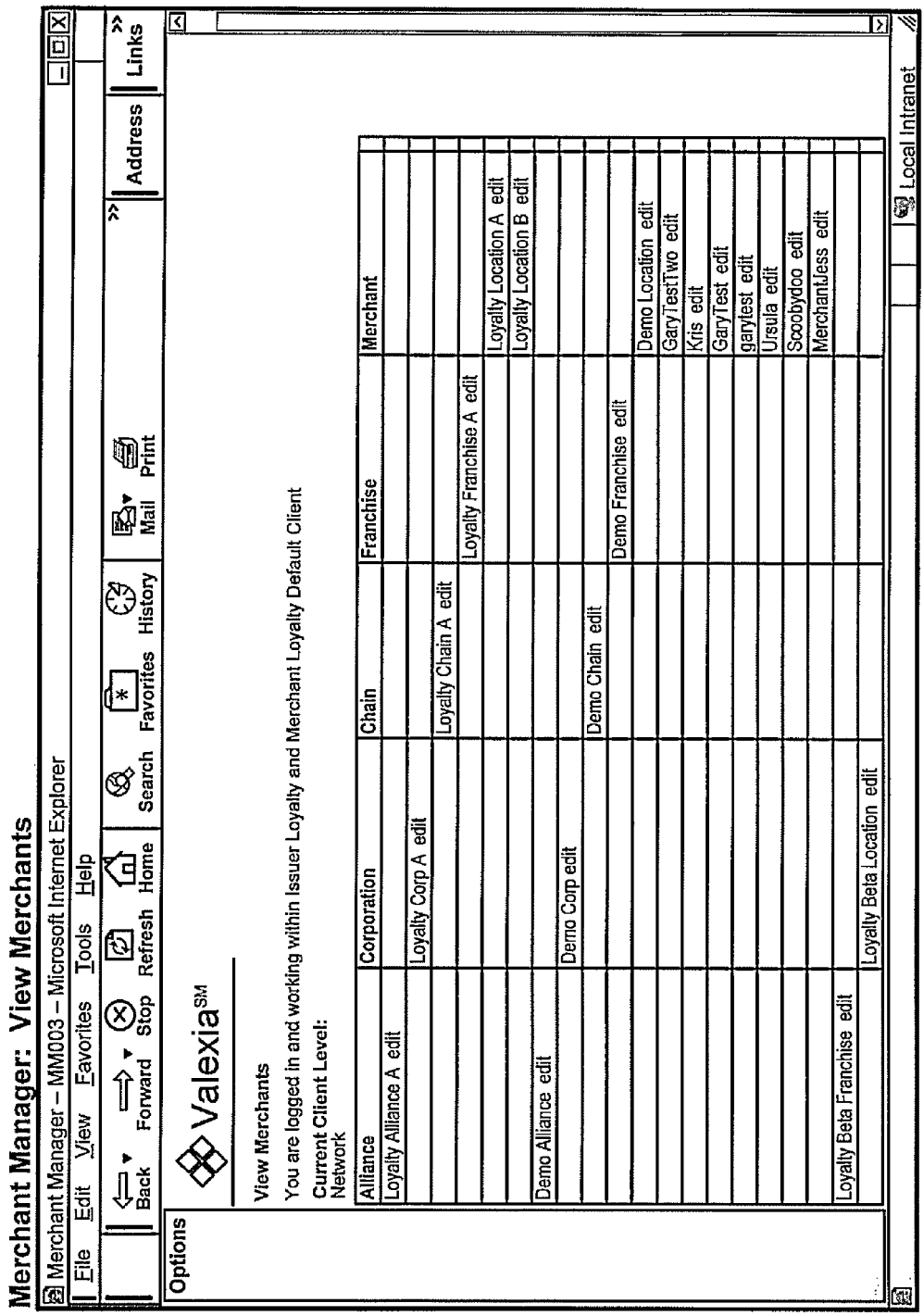
FIGS. 24-25 illustrate screen prints in accordance with one embodiment of the merchant manager function of the present invention.
Figure 25:
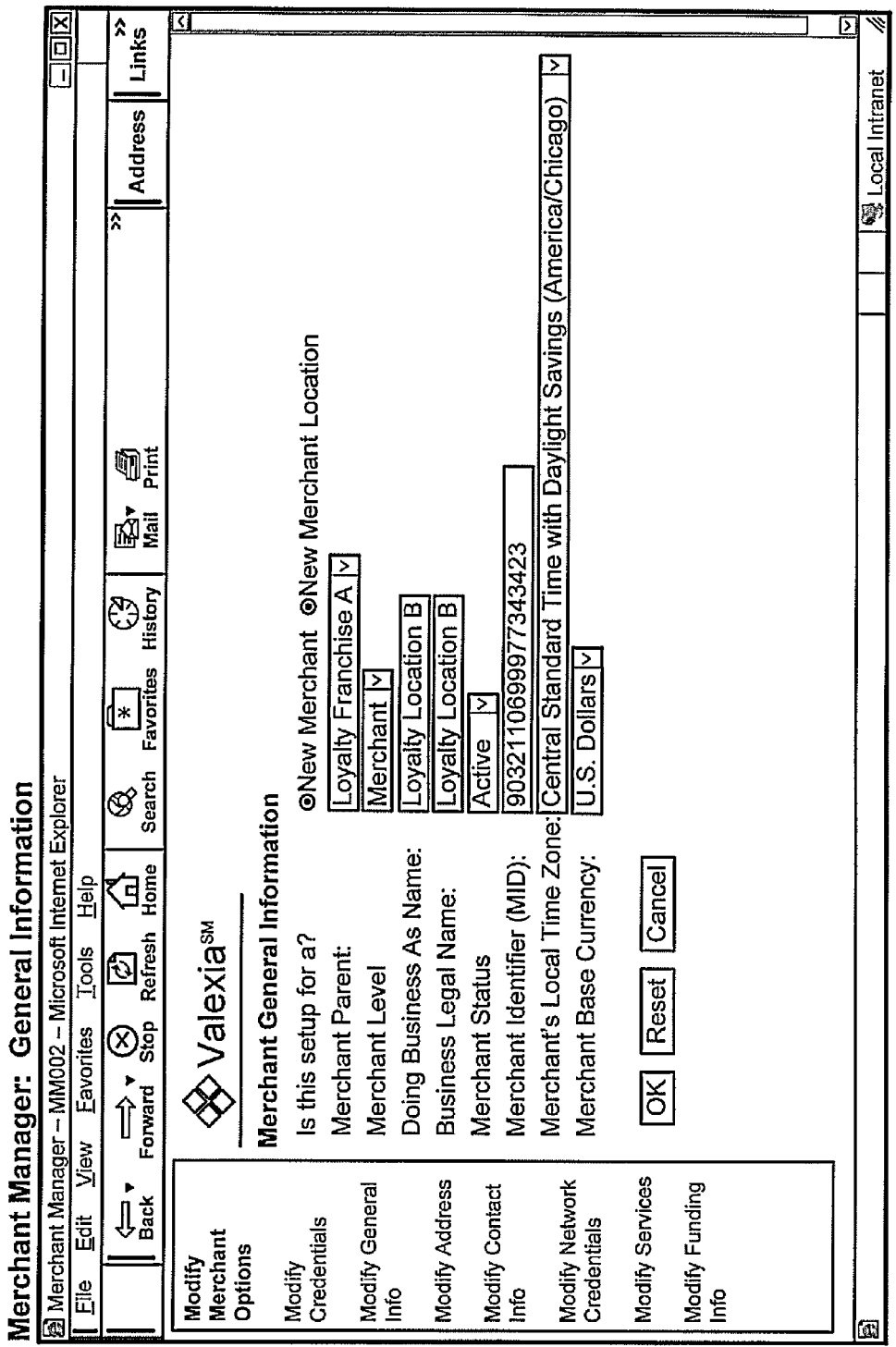

Referring now to FIGS. 24-25, there are shown screen prints in accordance with one embodiment of the merchant manager function of the present invention. Referring particularly to FIG. 24, there is shown a merchant chart identifying relationships between and among merchants, as well as identifying merchants by type, such as corporation, chain, and franchise, by way of non-limiting example only. Referring to FIG. 25, there is shown a merchant information screen shot associated with the present invention. As may be seen in FIG. 25, various features of the merchant may be enumerated and may be changed as needed. These features may include merchant parent, merchant level, business name, merchant identifier, and merchant currency, by way of non-limiting example only.

Figure 26:
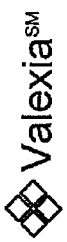
Figure 27:
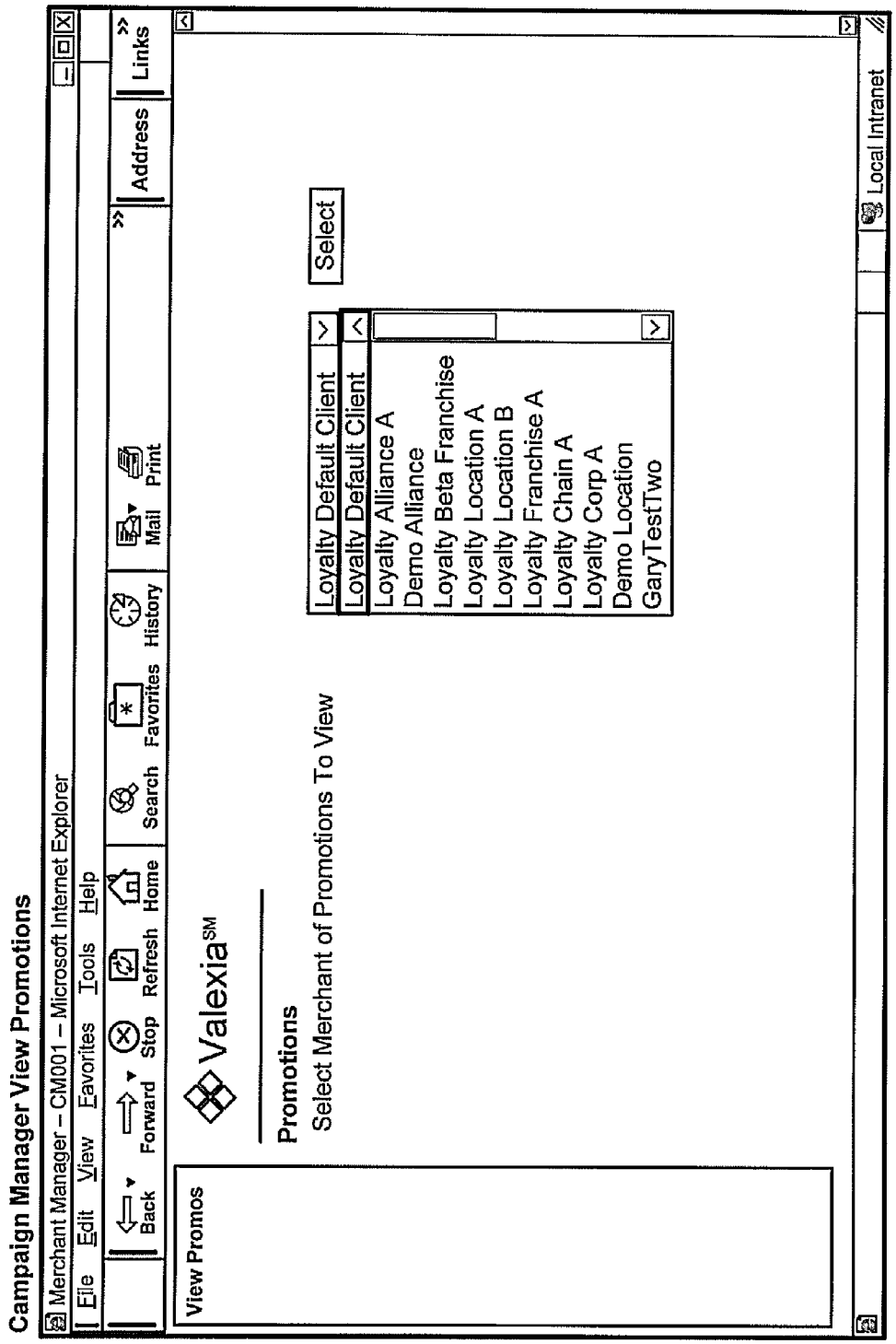
Figure 30:
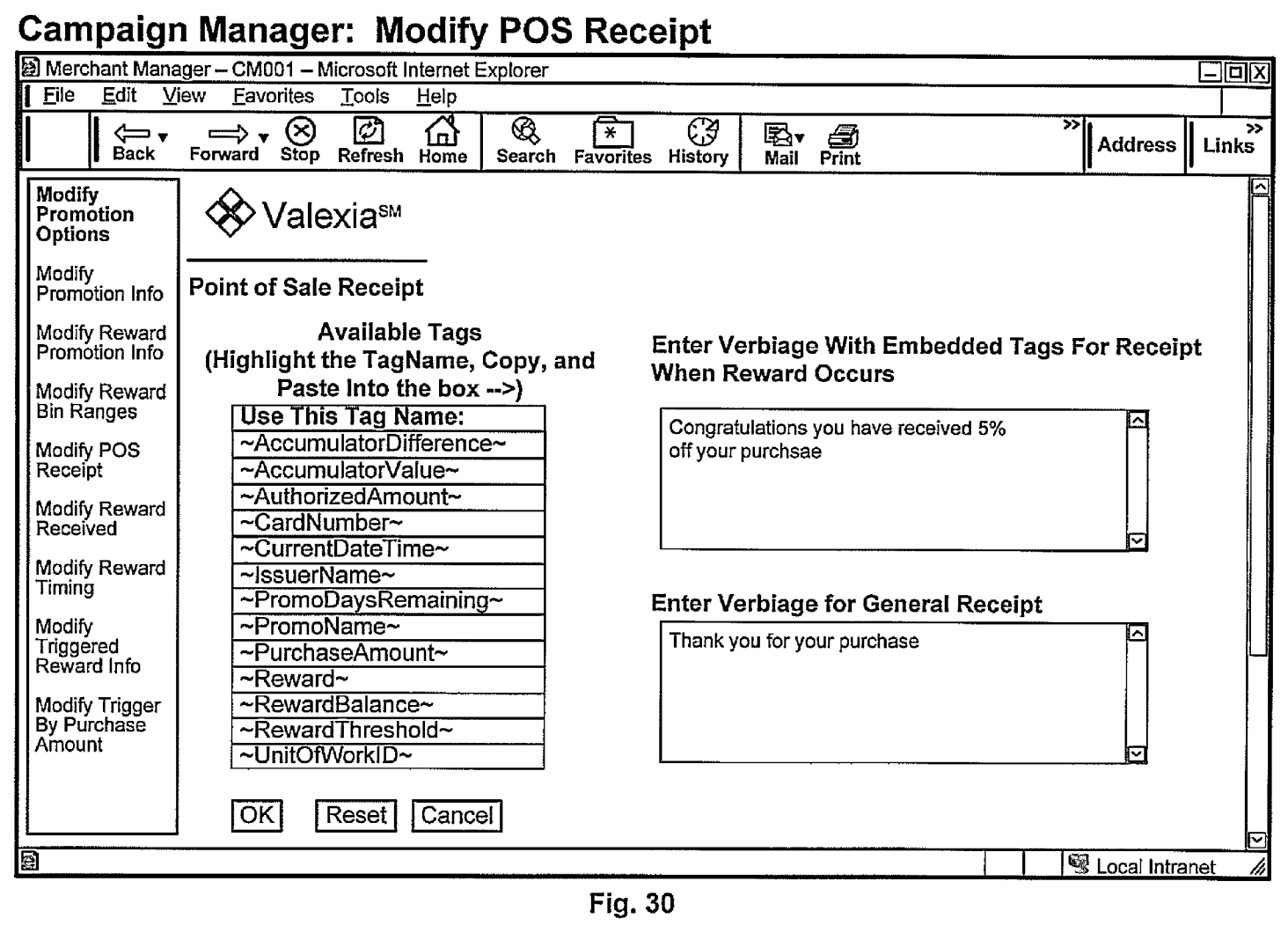
Figure 33:
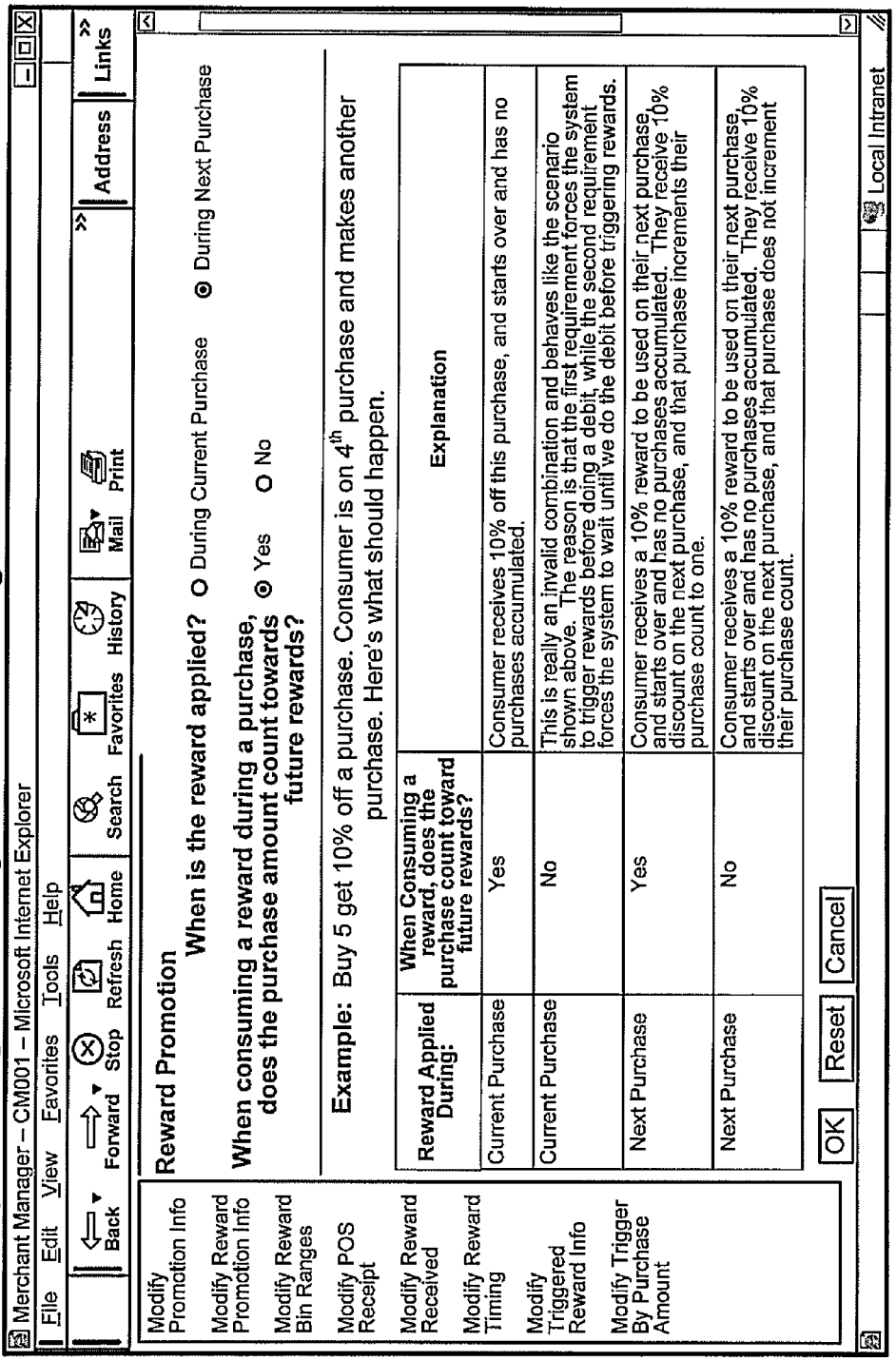

Referring now to FIGS. 26-33, there are shown screen prints in accordance with one embodiment of the promotional campaign management function of the present invention. In particular, FIG. 26 illustrates a promotion campaign management input screen shot. As may be seen in FIG. 26, the particulars of a campaign may be input, such as activation and expiration dates, merchant, and type of promotion, by way of non-limiting example only. Merchants may be selected, as may be seen in FIG. 27. A pull down menu may be employed to provide a selection mechanism for merchants of promotions. Multiple promotions may be monitored, as may be seen in FIG. 28.

Referring now to FIG. 29, there is shown a screen shot of a promotion modifying screen according to an aspect of the present invention. As may be seen in FIG. 30, point of sale receipt may be modified according to the current promotion. Further, a trigger amount may be modified, as may be seen in FIG. 31. Referring now to FIG. 32, there is shown a screen shot of rewards received by consumers. Further, in FIG. 33, there is shown a reward promotion evidencing the requirements for awarding a reward for a promotion.

Referring now to FIG. 34, there is shown a screen shot in accordance with one embodiment of the customer care function of the present invention. As may be seen in FIG. 34, account information may be displayed in a chart format, for example, depicting the date, type of transaction, and the amount of the transaction for a given consumer within specified starting and ending dates.

Those of ordinary skill in the art will recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A method, comprising:
    establishing, by at least one computer processor, an account, identified with an account holder, comprising a plurality of defined purses, wherein a value chaining logic is definable for both the account and each purse and the value chaining logic comprises a hierarchy for application of value contained in each of the plurality of defined purses to a transaction amount wherein further the hierarchy defines the application of value from one or more of the plurality of defined purses to fulfill a transaction;
    receiving, by the at least one computer processor, transaction information comprising a transaction request with an amount, from a merchant, and further comprising a code pertaining to one or more qualifying products which form at least a portion of a transaction initiated by the account holder at a point of sale;
    applying, by the at least one computer processor, the value chaining logic to the amount associated with the transaction request, wherein the value chaining logic is applied until the amount is fulfilled with value from the one or more of the plurality of defined purses as specified by the value chaining logic;
    performing, by the at least one computer processor, a comparison of the code from the transaction information against previously received codes;
    storing, electronically, the code in a database wherein the code becomes a previously received code upon storage;
    generating a credit to the account based each new candidate code, wherein the credit comprises a particular type non-zero value, wherein the non-zero value comprises one of electronic cash, micro-payments, loyalty points, or electronic coupons;
    storing the credit in one of the plurality of defined purses that is configured to store the particular type of non-zero value of which the credit is comprised; and
    notifying, electronically, the account holder of the credit.

2. The method of claim 1, further comprising:
    generating a certificate upon a pre-set amount of the non-zero value being accumulated in the account.

3. The method of claim 2, wherein the certificate is usable as a coupon, rebate, gift certificate, or refund.

4. The method of claim 2, further comprising:
    receiving a redemption of the certificate.

5. The method of claim 1, further comprising:
    receiving, from the account holder, a request to convert a portion of the non-zero value in the account from a first form to a second form.

6. The method of claim 1, further comprising:
    receiving, from the account holder, a request to transfer a portion of the non-zero value in one of the plurality of defined purses to a second purse of the plurality of defined purses.

7. The method of claim 1, further comprising:
    receiving, from an account holder, a request to transfer a portion of the non-zero value from the account to a second account associated that is identified with a different account holder.

8. A method, comprising:
    defining, at the request of an account holder, value chaining logic pertaining a plurality of defined purses, the plurality of defined purses comprising an account, wherein the value chaining logic comprises a hierarchy of use of credit, comprising a non-zero value, stored in each of the plurality of defined purses, such that the hierarchy defines the application of the credit from one or more of the plurality of defined purses to fulfill the specific transaction request and wherein further the logic is structured to use a free value type before a funded value type for application against an amount associated with a specific transaction request;
    accumulating the credit in each of the plurality of defined purses, wherein the credit is accumulated, at least in part, through purchases of one or more qualifying products or services and the credit comprises one of electronic cash, micro-payments, loyalty points, or electronic coupons and is each type of credit is accumulated in one of the plurality of defined purses that is configured to store a particular type credit;
    processing, by at least one computer processor, a transaction request, comprising a transaction amount, from a merchant, wherein the transaction request is initiated by the account holder;
    filtering, by the at one computer processor, the plurality of defined purses to remove purses with value types not accepted by the merchant based on input from the merchant;
    ordering, by the at least one computer processor, the plurality of defined purses based on the value chaining logic;
    defining a set of filtered and ordered purses based upon the preceding filtering and ordering steps to use to fulfill the transaction amount; and applying, by the at least one computer processor, the value chaining logic to the transaction amount by applying, from the set of filtered and ordered purses, the credit from each purse, in the order as specified by the value chaining logic, until the transaction amount is fulfilled.

9. The method of claim 8, wherein the free value type comprises coupons, rewards, and discounts and the funded value types comprise credit or cash.

10. The method of claim 8, further comprising:
receiving, from the account holder, a request to transfer a portion of the credit in one of the plurality of defined purses to a second purse of the plurality of defined purses.

11. The method of claim 8, further comprising:
receiving, from the account holder, a request to convert a portion of the credit in the account from a first form to a second form.

12. The method of claim 8, further comprising:
receiving, from an account holder, a request to transfer a portion of the credit from the account to a second account associated that is identified with a different account holder.

13. The method of claim 1, further comprising:
pre-filtering the value chaining logic, prior to receiving the transaction information, based on input from the merchant based on the initiating of the transaction at the point of sale, wherein the pre-filtering comprises elimination of payment forms which are unacceptable to the merchant.

14. The method of claim 8, further comprising:
wherein the filtering is performed prior to the processing of the transaction request.

* * * * *